United States Patent [19]

Krasieva et al.

[11] Patent Number: 5,734,498
[45] Date of Patent: Mar. 31, 1998

[54] ILLUMINATOR ELEMENTS FOR CONVENTIONAL LIGHT MICROSCOPES

[75] Inventors: Tatiana Krasieva; Bruce Tromberg; Alexander Dvornikov; Michael W. Berns, all of Irvine, Calif.

[73] Assignee: The Regents of the University of California, Alameda, Calif.

[21] Appl. No.: 239,683

[22] Filed: May 9, 1994

[51] Int. Cl.⁶ .................... G02B 21/06; G02B 21/00
[52] U.S. Cl. .................... 359/387; 359/368; 359/385
[58] Field of Search .................... 359/368, 385–389; 250/458.1, 459.1, 310, 216, 397, 483.1; 356/317, 23, 332

[56] References Cited

U.S. PATENT DOCUMENTS

| | | | |
|---|---|---|---|
| 2,273,235 | 2/1942 | Ardenne et al. | 250/311 |
| 2,298,947 | 10/1942 | Leverenz | 250/483.1 |
| 3,205,763 | 9/1965 | Bradley et al. | 356/332 |
| 3,600,064 | 8/1971 | Walz et al. | 359/803 |
| 4,621,911 | 11/1986 | Lanni et al. | 359/386 |
| 4,662,747 | 5/1987 | Isaacson et al. | 356/317 |
| 4,665,036 | 5/1987 | Dedden et al. | 359/387 |
| 4,806,004 | 2/1989 | Wayland | 359/385 |
| 4,947,034 | 8/1990 | Wickramasinghe et al. | 250/216 |
| 4,948,247 | 8/1990 | Lapeyre et al. | 356/23 |
| 5,148,307 | 9/1992 | Kopelman et al. | 359/385 |
| 5,260,826 | 11/1993 | Wu et al. | 358/368 |
| 5,394,268 | 2/1995 | Lanni et al. | 359/386 |
| 5,491,343 | 2/1996 | Brooker | 250/458.1 |

FOREIGN PATENT DOCUMENTS 2126778  8/1982  United Kingdom.

*Primary Examiner*—Thong Nguyen
*Attorney, Agent, or Firm*—Fuess & Davidenas

[57] ABSTRACT

An inexpensive, simple and easy-to-use illuminator element—consisting of chromophores, particularly fluorophores, and/or light-scattering bodies in a stable, typically a polymer plastic, matrix—completely replaces an infinite set of condensers for a optical microscope, and works equally well with microscope objective lenses of any and all numerical apertures. Illuminator elements of a fluorescent type are employed in combination with a primary source of light that is external to the illuminator element itself, and that is preferably but a simple incandescent light bulb. Nonetheless to be energized with spectrally impure light, each illuminator element produces spectrally pure light(s) of a predetermined color or colors, including a pseudo-white light. Sets of illuminator elements permit the ready production of colored light(s) of any desired spectral characteristics from primary light sources that are no more sophisticated, nor any more expensive, than common electric light bulbs. An illuminator element substantially eliminates most image artifacts while supporting imaging of a quality comparable to the best images obtainable with highest quality condensers correctly matched to the numerical aperture of a microscope's objective lens. Illumination fully comparable to Koehler illumination is obtained virtually effortlessly simply by placing an illuminator element near, and normally directly upon, a specimen that is typically mounted upon a microscope slide.

110 Claims, 24 Drawing Sheets
(8 of 24 Drawing(s) in Color)

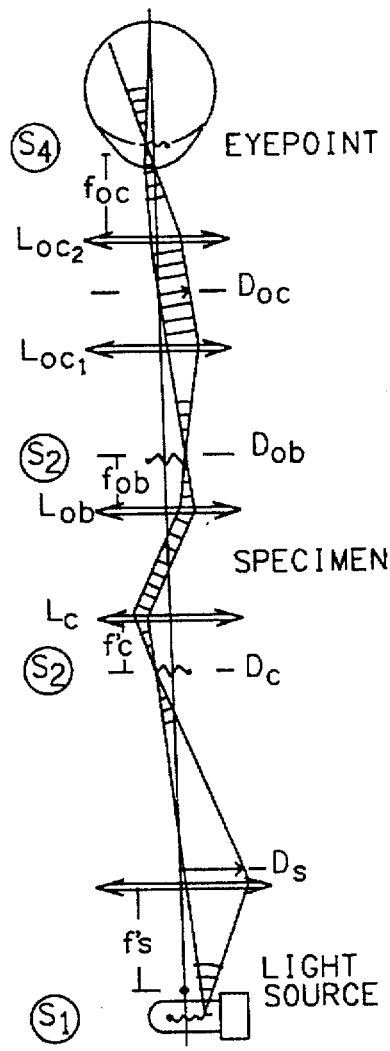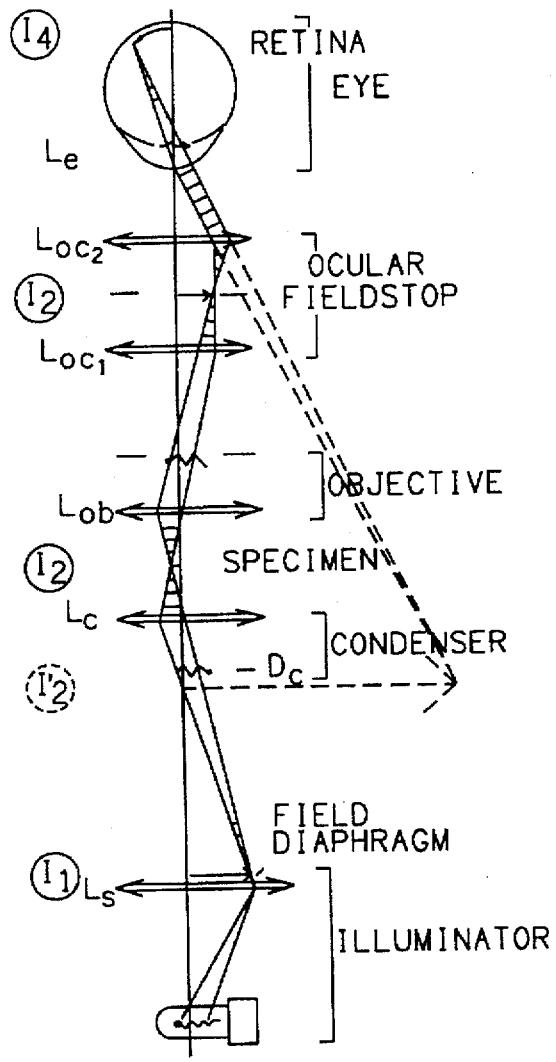

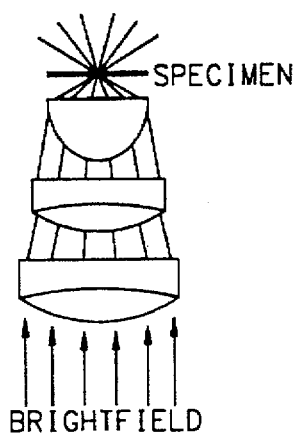
FIG. 7a
PRIOR ART
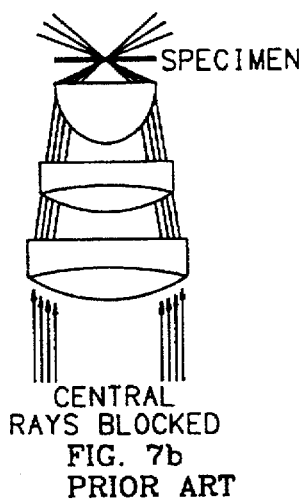
FIG. 7b
PRIOR ART
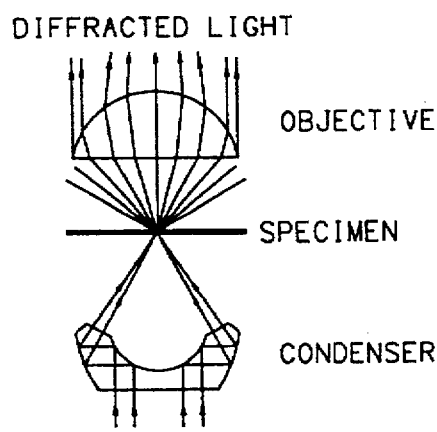
FIG. 7c
PRIOR ART
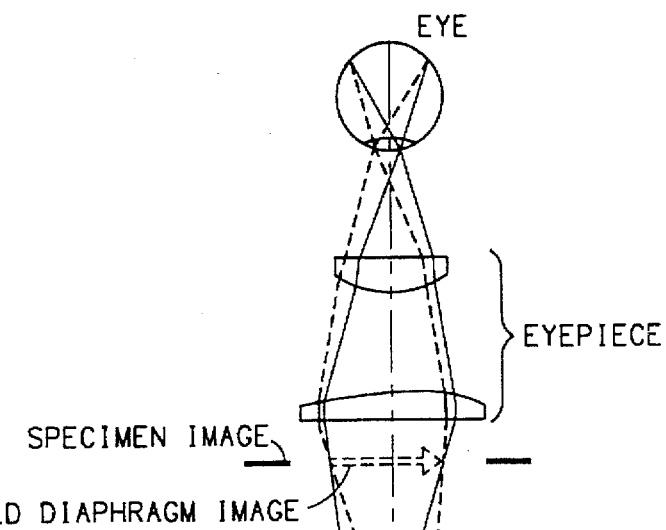
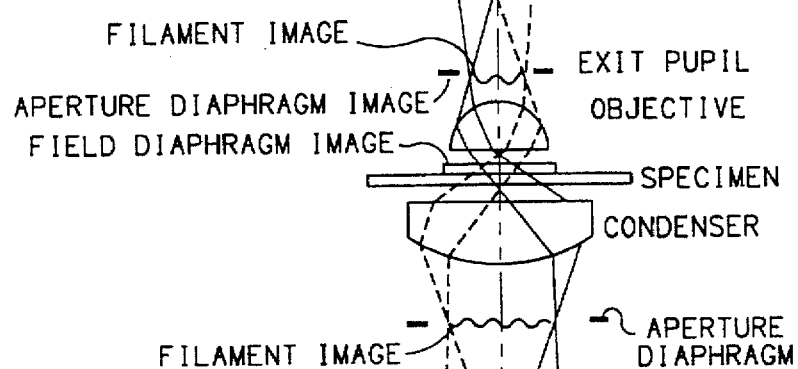
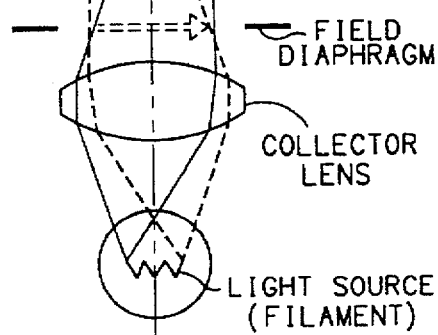
FIG. 8
PRIOR ART

FLASHLIGHT

HOLDING APPLIANCE

ILLUMINATOR

HOLDING APPLIANCE

FLASHLIGHT

IRIS

TABLE OF KNOWN FLUOROCHROMES/FLUOROPHORES
SUITABLE FOR USE IN CONSTRUCTION OF ONE EMBODIMENT OF
AN ILLLUMINATOR ELEMENT OF THE PRESENT INVENTION

| FLUOROCHROME | EXCITATION | EMISSION |
|---|---|---|
| 3-Hydroxypyrene 5,8,10-Tri Sulfonic acid | 403 | 513 |
| 5-Hydroxy Tryptamine | 380-415 | 520-530 |
| 5-Hydroxy Tryptamine (5-HT) | 400 | 530 |
| Acid Fuchsin | 540 | 630 |
| Acridine Orange (bound to DNA) | 502 | 526 |
| Acridine Red | 455-600 | 560-680 |
| Acridine Yellow | 470 | 550 |
| Acriflavin | 436 | 520 |
| AFA (Acriflavin Feulgen SITSA) | 355-425 | 460 |
| Alizarin Complexon | 530-560 | 580 |
| Alizarin Red | 530-560 | 580 |
| Allophycocyanin | 650 | 661 |
| ACMA | 430 | 474 |
| Aminoacticomycin D | 555 | 655 |
| Aminocoumarin | 350 | 445 |
| Anthroyl Stearate | 361-381 | 446 |
| Astrazon Brilliant Red 4G | 500 | 585 |
| Astrazon Orange R | 470 | 540 |
| Astrazon Red 6B | 520 | 595 |
| Astrazon Yellow 7 GLL | 450 | 480 |
| Atabrine | 436 | 490 |
| Auramine | 450-490 | 550 |
| Aurophoshine | 450-490 | 515 |
| Aurophosphine G | 450 | 580 |
| BAO 9 (Bisaminophenyloxadiazole) | 365 | 395 |
| BCECF | 505 | 530 |
| Berberine Sulphate | 430 | 550 |
| Bisbenzamide | 360 | 600-610 |
| BOBO 1 | 462 | 481 |
| Blancophor FFG Solution | 390 | 470 |
| Blancohor SV | 370 | 435 |
| Bodipy Fl | 503 | 512 |
| BOPRO 1 | 462 | 481 |
| Brilliant Sulphoflavin FF | 430 | 520 |
| Calcien Blue | 370 | 435 |
| Calcium Green | 505 | 532 |
| Calcofluor RW Solution | 370 | 440 |
| Calcofluor White | 440 | 500-520 |
| Calcophor White ABT Solution | 380 | 475 |
| Calcophor White Standard Solution | 365 | 435 |
| Cascade Blue | 400 | 425 |
| Catecholamine | 410 | 470 |
| Chinacrine | 450-490 | 515 |
| Coriphosphine O | 460 | 575 |
| Coumarin-Phalloidin | 387 | 470 |
| CY3.18 | 554 | 568 |
| CY5.18 | 649 | 666 |
| CY7 | 710 | 805 |
| 1-Dimethyl Amino Naphaline 5 Sulphonic Acid | 340 | 525 |

FIGURE 17a

TABLE OF KNOWN FLUOROCHROMES/FLUOROPHORES
SUITABLE FOR USE IN CONSTRUCTION OF ONE EMBODIMENT OF
AN ILLLUMINATOR ELEMENT OF THE PRESENT INVENTION

| FLUOROCHROME | EXCITATION | EMISSION |
|---|---|---|
| Dansa (Diamino Naphtyl Sulphonic Acid) | 340-380 | 430 |
| Dansyl NH-Ch3 in water | 340 | 578 |
| DAPI | 350 | 470 |
| Diamino Phenyl Oxydiazle (DAO) | 280 | 460 |
| Dimethylamino-5-Sulphonic acid | 310-370 | 520 |
| Diphenyl Brilliant Flavine 7GFF | 430 | 520 |
| Dopamine | 340 | 490-520 |
| Eosin | 525 | 545 |
| Erythrosin ITC | 530 | 558 |
| Ethidium Bromide | 510 | 595 |
| Euchrysin | 430 | 540 |
| FIF (Formaldehyde Induced Fluorescence) | 405 | 435 |
| Flazo Orange | 375-530 | 612 |
| Fluorescein Isothiocyanate (FITC) | 490 | 525 |
| Fluo 3 | 485 | 503 |
| Fura-2 | 340-380 | 512 |
| Genacryl Brilliant Red B | 520 | 590 |
| GEnacryl Brilliant Yellow 10GF | 430 | 485 |
| Genacryl Pink 3G | 470 | 583 |
| Genacryl Yellow 5GF | 430 | 475 |
| Gloxalic Acid | 405 | 460 |
| Granular Blue | 355 | 425 |
| Haematophorphyrin | 530-560 | 580 |
| Hoechst 33258 (bound to DNA) | 346 | 460 |
| Indo-1 | 350 | 405-482 |
| Intrawhite Cf Liquid | 360 | 430 |
| Leucophor PAF | 370 | 430 |
| Leucophor SF | 380 | 465 |
| Leucophor WS | 395 | 465 |
| Lissamine Rhodamine B200 (RD200) | 575 | 595 |
| Lucifer Yellow CH | 425 | 528 |
| Lucifer Yellow VS | 430 | 535 |
| Magdala Red | 524 | 600 |
| Maxilon Brilliant Flavin 10 GFF | 450 | 495 |
| Maxilon Brilliant Flavin 8 GFF | 460 | 495 |
| MPS (Methyl Green Pyronine Stilbene) | 364 | 395 |
| Mithramycin | 450 | 570 |
| NBD Amine | 450 | 530 |
| Nile Red | 515-530 | 525-605 |
| Nitrobenzoxadidole | 460-470 | 510-650 |
| Noradrenaline | 340 | 490-520 |
| Nuclear Fast Red | 289-530 | 580 |
| Nuclear Yellow | 365 | 495 |
| Nylosan Brilliant Flavin E8G | 460 | 510 |
| Pararosaniline (Feulgen) | 570 | 625 |
| Phorwite AR Solution | 360 | 430 |
| Phorwite BKL | 370 | 430 |
| Phorwite Rev | 380 | 430 |
| Phorwite RPA | 375 | 430 |
| Phospine 3R | 465 | 565 |

FIGURE 17b

TABLE OF KNOWN FLUOROCHROMES/FLUOROPHORES SUITABLE FOR USE IN CONSTRUCTION OF ONE EMBODIMENT OF AN ILLLUMINATOR ELEMENT OF THE PRESENT INVENTION

| FLUOROCHROME | EXCITATION | EMISSION |
|---|---|---|
| Phycoerythrin R | 480-565 | 578 |
| Pontochrome Blue Black | 535-553 | 605 |
| Primuline | 410 | 550 |
| Procion Yellow | 470 | 600 |
| Propidium Iodide | 536 | 617 |
| Pyronine | 410 | 540 |
| Pyronine B | 540-590 | 560-650 |
| Pyrozal Brilliant Flavin 7GF | 365 | 495 |
| Quinacrine Mustard | 423 | 503 |
| Rhodamine 123 | 511 | 534 |
| Rhodamine 5 GLD | 470 | 565 |
| Rhodamine 6G | 526 | 555 |
| Rhodamine B | 540 | 625 |
| Rhodamine B 200 | 523-557 | 595 |
| Rhodamine B Extra | 550 | 605 |
| Rhodamine BB | 540 | 580 |
| Rhodamine BG | 540 | 572 |
| Rhodamine WT | 530 | 555 |
| Rose Bengal | 540 | 550-600 |
| Serotonin | 365 | 520-540 |
| Sevron Brilliant Red 2B | 520 | 595 |
| Sevron Billiant Red 4G | 500 | 583 |
| Sevron Brilliant Red B | 530 | 590 |
| Sevron Orange | 400 | 530 |
| Sevron Yellow L | 430 | 490 |
| SITS (Primuline) | 395-425 | 450 |
| SITS (Stilbene Isothiosulphonic acid) | 365 | 460 |
| Stilbene | 335 | 440 |
| Snarf 1 | 563 | 639 |
| Sulpho Rhodamine B Can C | 520 | 595 |
| Sulpho Rhodamine G Extra | 470 | 570 |
| Tetracycline | 390 | 560 |
| TRITC (Tetramethyl Rhodamine Isothiocyanate) | 557 | 576 |
| Texas Red | 596 | 615 |
| Thiazine Red R | 510 | 580 |
| Thioflavin S | 430 | 550 |
| Thioflavin TCN | 350 | 460 |
| Thioflavin 5 | 430 | 550 |
| Thiolyte | 370-385 | 477-484 |
| Thiozol Orange | 453 | 480 |
| Tinopol CBS | 390 | 430 |
| TOTO 1 | 514 | 533 |
| TOTO 3 | 642 | 661 |
| True Blue | 365 | 420-430 |
| Ultralite | 656 | 678 |
| Uranine B | 420 | 520 |
| Uvitex SFC | 365 | 435 |
| Xylene Orange | 546 | 580 |
| XRITC | 582 | 601 |
| YO PRO 1 | 491 | 509 |

FIGURE 17c

TABLE OF THE PARAMETERS OF THE COLOR PHOTOMICROGRAPHS OF DRAWINGS FIGURES 20-25

| FIG. # | PRES. INV. OR PRIOR ART | OBJECTIVE MAG. | BR.F. OIL? | NUM. APERT. | CONDENSER NUM. APERT. | TRANS/ EPI | ILLUMINATOR # | TYPE | SPECIMEN | REMARKS |
|---|---|---|---|---|---|---|---|---|---|---|
| 20a | PA | 10x | BR.F. | .3 | .55 | TRANS | — | | YOUNG MOUSE, CROSS-SECTION, NON-STAINED | BLUE COL. COR. IRIS |
| 20b | PI | 10x | BR.F. | .3 | | TRANS | 6 | SCATTERER | | (NONE) |
| 20c | PI | 10x | BR.F. | .3 | | TRANS | 1 | DARKFIELD | | |
| 21a | PA | 10x | BR.F. | .3 | .55 | TRANS | — | | COLORED DIATOMS (STAINED) | BLUE. COL. COR. |
| 21b | PI | 10x | BR.F. | .3 | | EPI | 3 | "WHITE" FLUOR | | (NONE) |
| 21c | PI | 10x | BR.F. | .3 | | EPI | 5 | "GREEN" FLUOR | | (NONE) |
| 22a | PA | 40x | BR.F. | .75 | .55 | TRANS | — | | PTK MYOTIC STAINED CELLS | NDF |
| 22b | PI | 40x | BR.F. | .75 | | TRANS | 4 | SCATTERER+FLUOR | | (NONE) |
| 23a | PA | 100x | BR.F.-Y | 1.3 | .55 | TRANS | — | | STAINED PLASTIC SECTION RABBIT EYE | (NONE) |
| 23b | PA | 100x | BR.F.-Y | 1.3 | .9 | TRANS | — | | | (NONE) |
| 23c | PI | 100x | PH3-Y | 1.3 | | TRANS | 6 | SCATTERER | | (NONE) |
| 24a | PA | 100x | BR.F.-Y | 1.3 | .9 | TRANS | — | | STANDARD DIATOMS | (NONE) PINHOLE |
| 24b | PI | 100x | BR.F.-Y | 1.3 | | TRANS | 4 | SCATTERER+FLUOR | | |
| 25a | PA | 10x | BR.F. | .3 | .55 | TRANS | — | | STAINED PLASTIC SECTION PIG SKIN | (NONE) COVER SLIP DIRT |
| 25b | PA | 10x | BR.F. | .3 | .55 | TRANS | — | | | COVER SLIP DIRT |
| 25c | PI | 10x | BR.F. | .3 | | TRANS | 6 | SCATTERER | | |

FIGURE 18a

TABLE OF THE PARAMETERS OF CONSTRUCTION OF THE ILLUMINATORS USED TO PRODUCE THE COLOR PHOTOMICROGRAPHS OF DRAWINGS FIGURES 20-25

| ILLUMINATOR # TYPE | USED TO PRODUCE PHOTOMICROGRAPHS | ACTIVE INGREDIENTS | OPTICAL DENSITY/CM | ABSORBANCE IN NM |
|---|---|---|---|---|
| 1 DARKFIELD -FLUORESCENT | 20c | Coumarine 152<br>Rhodamine 110<br>Rhodamine 610 | 5.0<br>5.0<br>5.0 | 394<br>498<br>545 |
| 2 BRIGHTFIELD -FLUORESCENT | (none) | Coumarine 152<br>Rhodamine 110<br>Rhodamine 610 | 1.5<br>1.5<br>1.5 | 394<br>498<br>545 |
| 3 BRIGHTFIELD -FLUORESCENT | 21b | Coumarine 152<br>Rhodamine 110<br>Rhodamine 610 | .3<br>.3<br>.3 | 394<br>498<br>545 |
| 4 BRIGHTFIELD -FLUORESCENT SCATTERER | 22b, 24b | Coumarine 152<br>Rhodamine 110<br>Rhodamine 610<br>Titanium Dioxide | .3<br>.3<br>.3 | 394<br>498<br>545<br>n/a |
| 5 BRIGHTFIELD -FLUORESCENT | 21c | Rhodamine 6G | .3-.5 | 528 |
| 6 BRIGHTFIELD - SCATTERER | 20b, 23c, 25c | Titanium Dioxide | | n/a |

FIGURE 18b

TABLE OF THE COLORS OF THE COLOR PHOTOMICROGRAPHS OF DRAWINGS FIGURES 20-25

| FIG. # | PRES. INV. OR PRIOR ART | STRUCTURE COLOR(S) | BACKGROUND COLOR(S) | REMARKS ON ILLUMINATION SOURCE |
|---|---|---|---|---|
| 20a | PA | medium brown | chocolate | color spectrum of the prior art light source |
| 20b | PI | medium grey | light grey | brightfield illuminator (#6) w/light-reflecting bodies |
| 20c | PI | medium gold | light gold | darkfield illuminator (#1) |
| 21a | PA | green, brown | light green | color spectrum of the prior art light source |
| 21b | PI | green, brown | grey green | brightfield "white" color fluorescent illuminator (#3) |
| 21c | PI | green, red | orange | brightfield "green" color fluorescent illuminator (#5) |
| 22a | PA | purple | green | color spectrum of the prior art light source |
| 22b | PI | purple | light purple | brightfield scattering/fluorescent illuminator #4 |
| 23a | PA | dark green | yellow | color spectrum of the prior art light source |
| 23b | PA | medium green | yellow | color spectrum of the prior art light source |
| 23c | PI | dark green | yellow | brightfield illuminator (#6) w/light-reflecting bodies |
| 24a | PA | grey | pink | color spectrum of the prior art light source |
| 24b | PI | dark brown | light brown | brightfield scattering/fluorescent illuminator (#4) |
| 25a | PA | red | grey | color spectrum of the prior art light source |
| 25b | PA | red and grey | grey | color spectrum of the prior art light source |
| 25c | PI | red | grey | brightfield illuminator (#6) w/light-reflecting bodies |

FIGURE 19

FIG. 20a
PRIOR ART
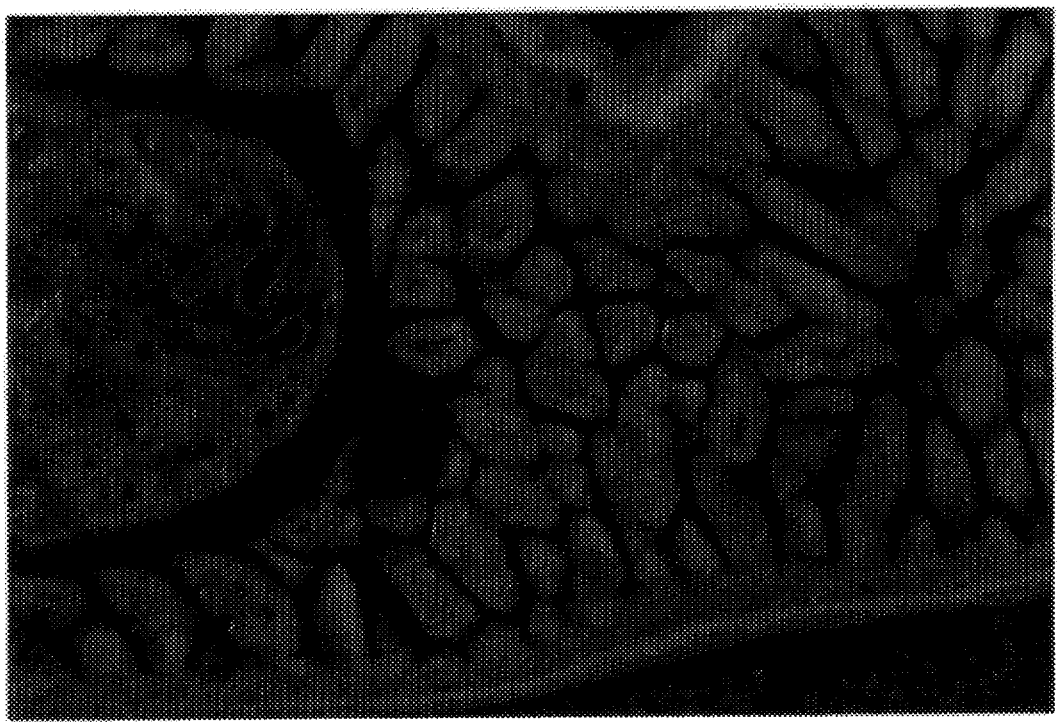
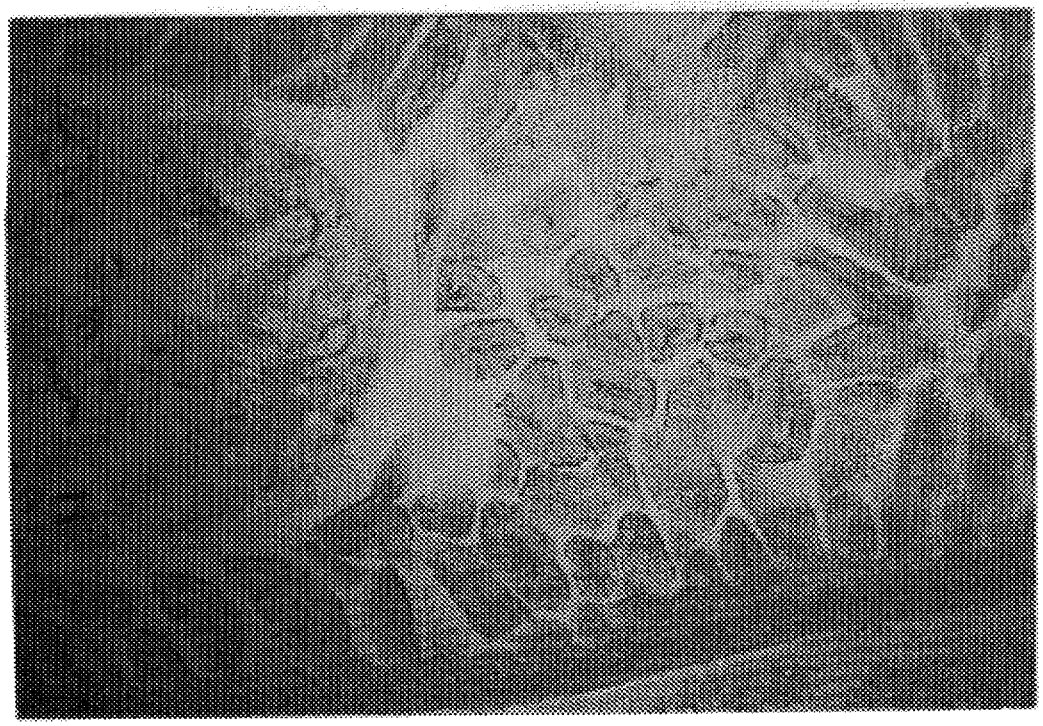
FIG. 20b

FIG. 20c
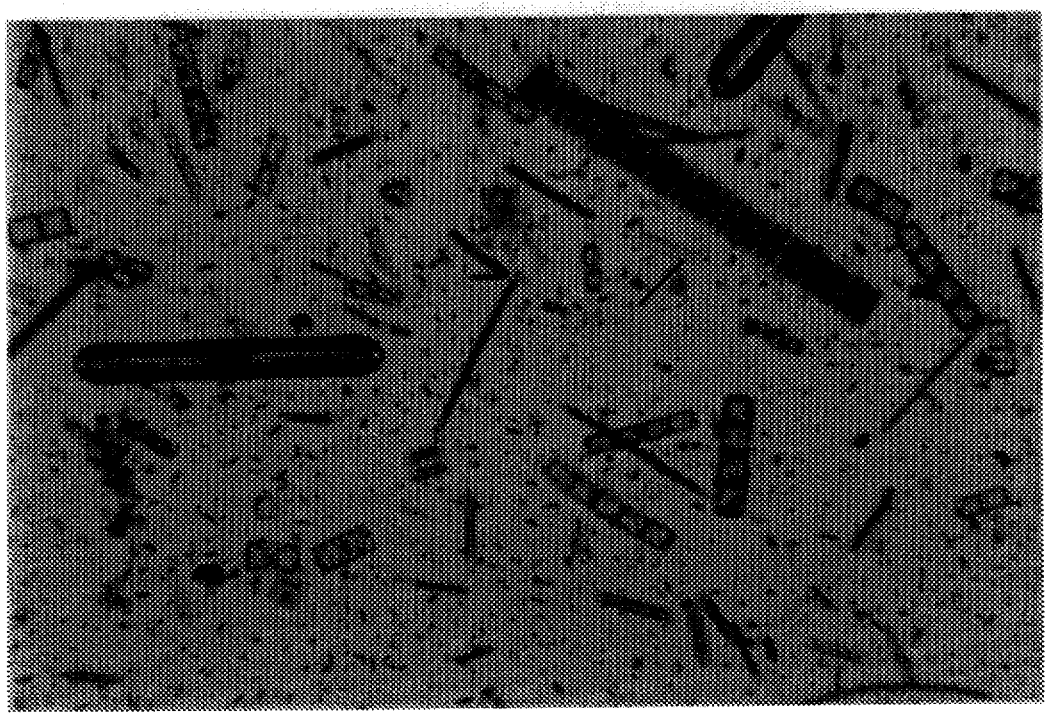
FIG. 21a
PRIOR ART

FIG. 21b
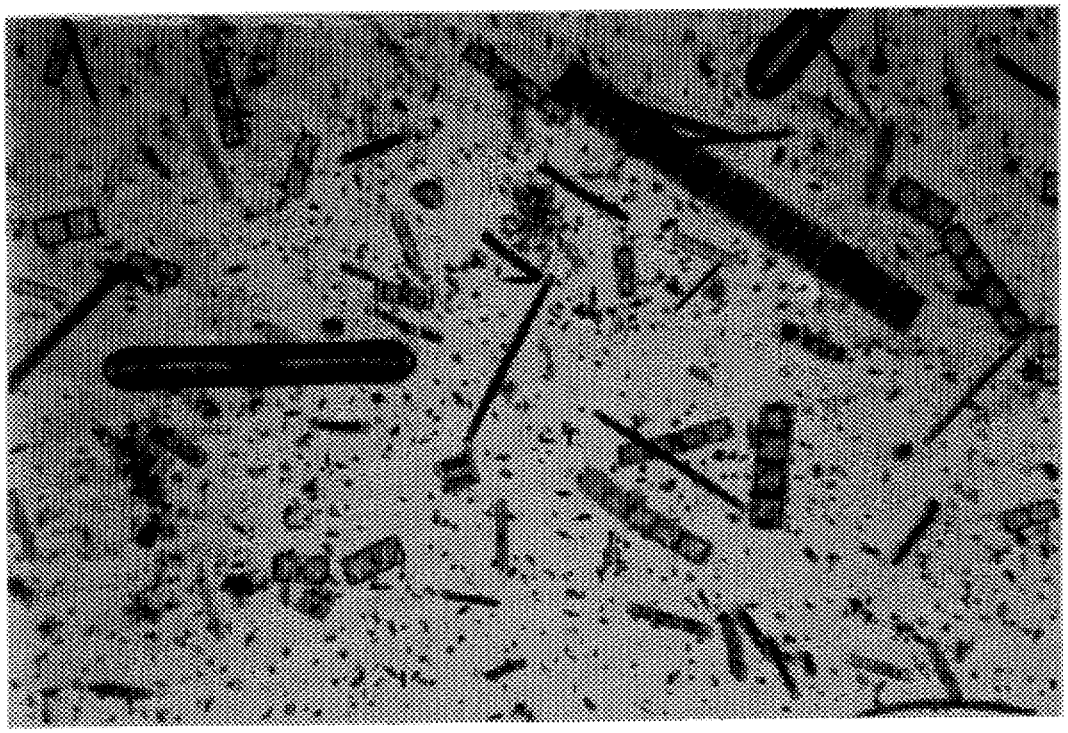
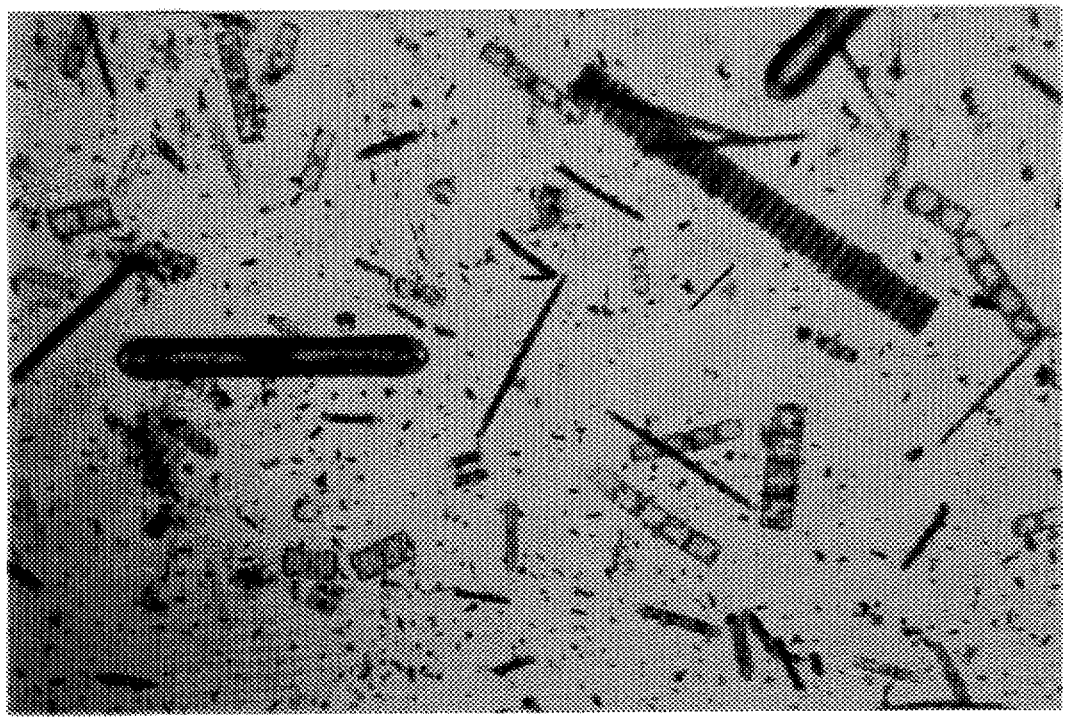
FIG. 21c

FIG. 22a
PRIOR ART
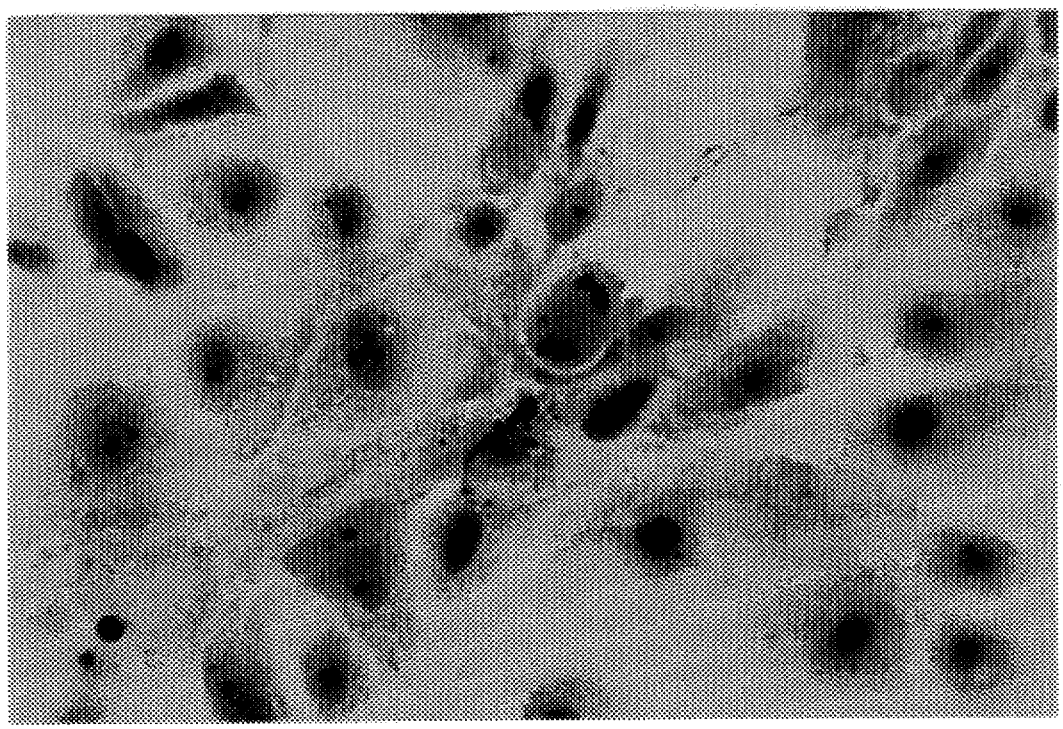
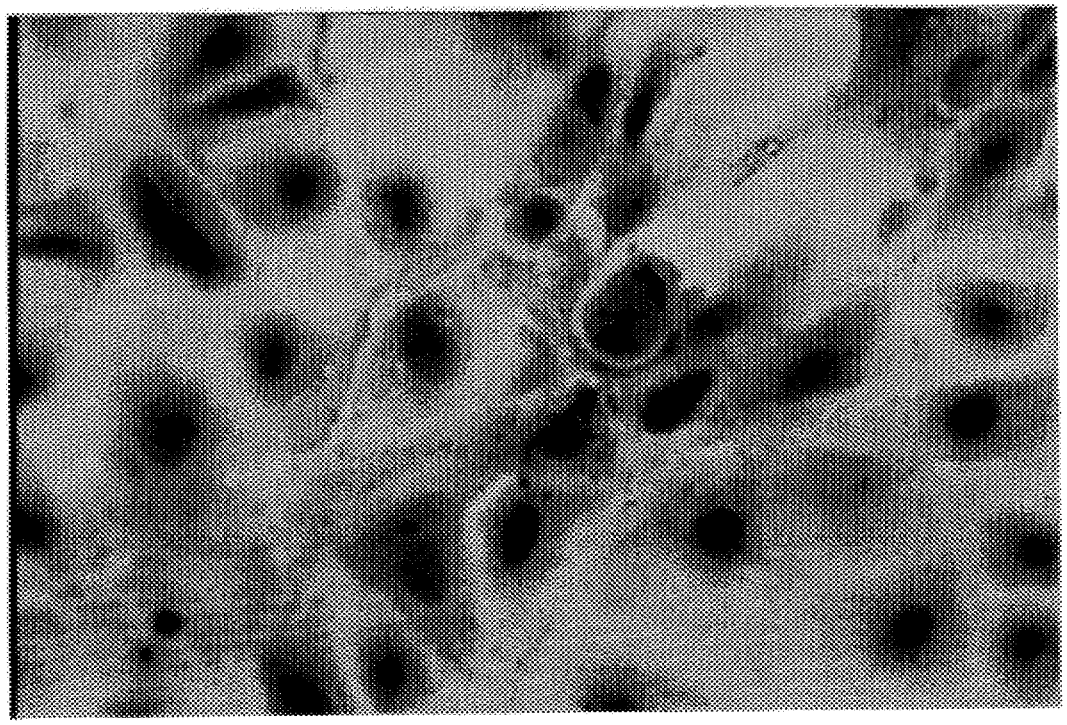
FIG. 22b

FIG. 24b
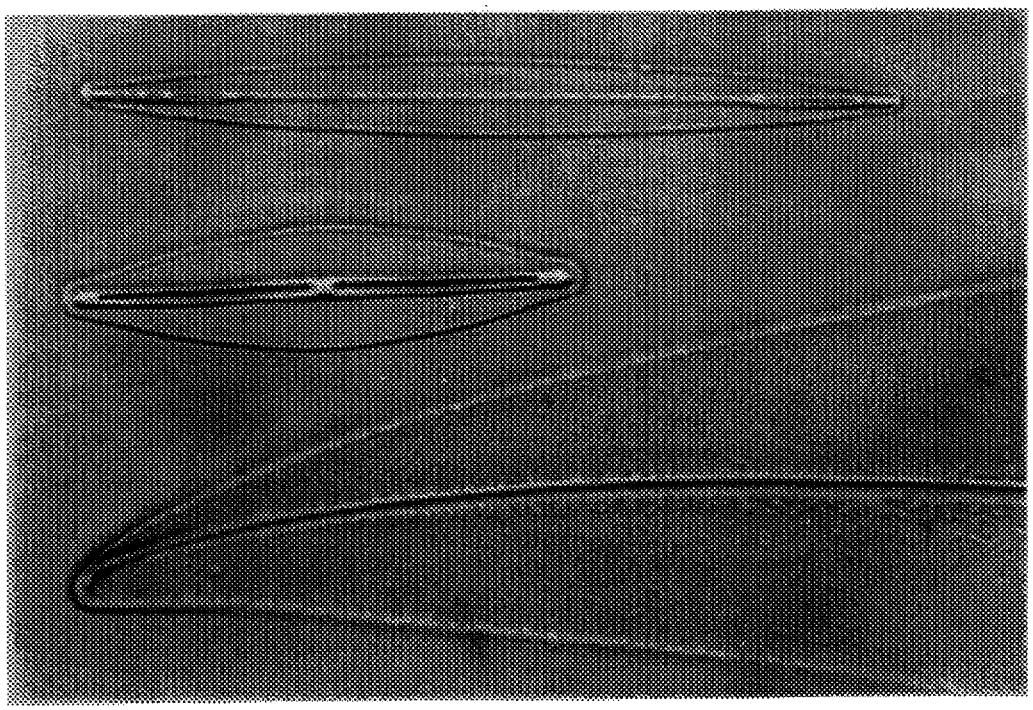
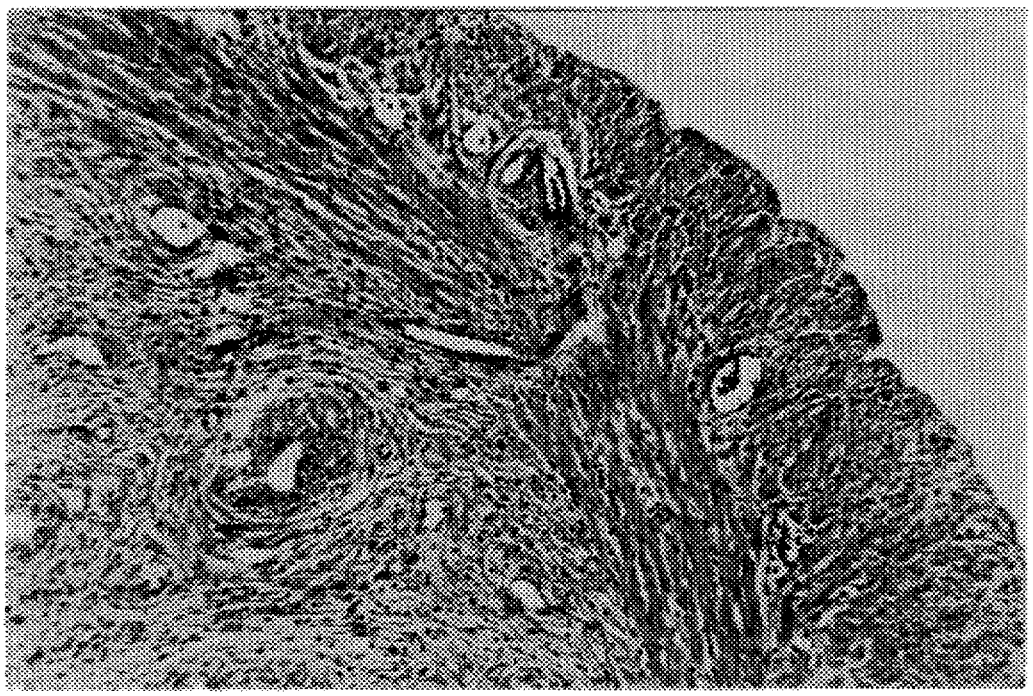
FIG. 25a
PRIOR ART

FIG. 25b
PRIOR ART
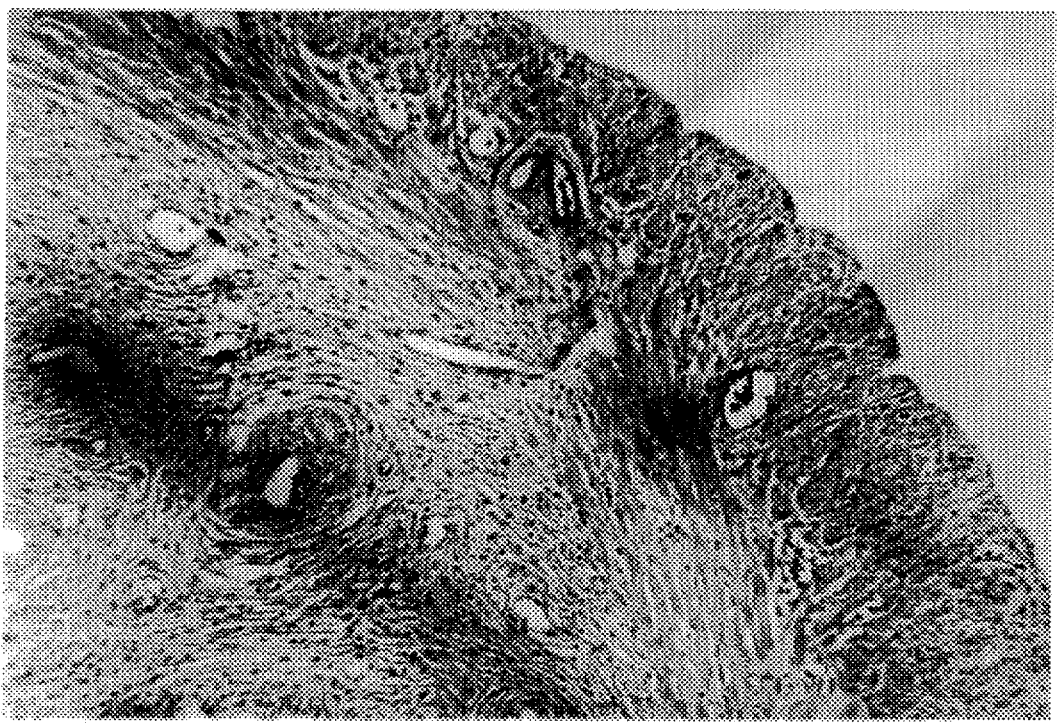
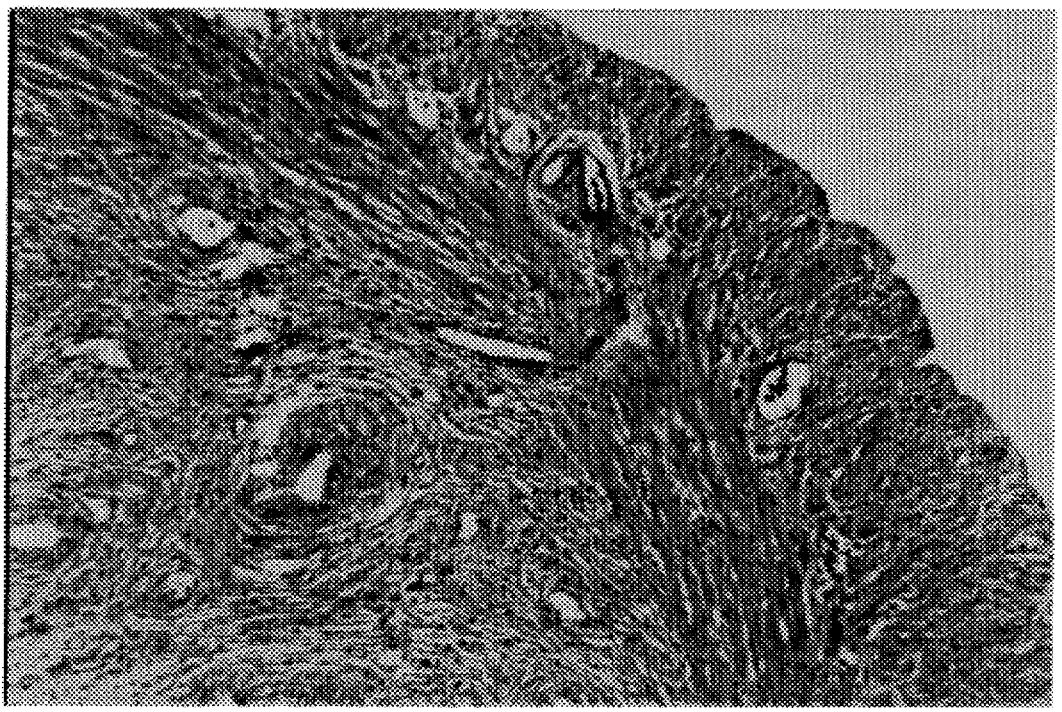
FIG. 25c

ILLUMINATOR ELEMENTS FOR CONVENTIONAL LIGHT MICROSCOPES

BACKGROUND OF THE INVENTION
1. Field of the Invention
2. Description of the Prior Art
   2.1 General Background
   2.2 Detail Background
      2.2.1 The Essential Optical Train of the Light Microscope
      2.2.2 Principles of Koehler Illumination
      2.2.3 Adjusting the Microscope for Koehler Illumination
         2.2.3.1 Alignment and Focus of a Prior Art Illuminator
      2.2.4 Darkfield Microscopy, Rheinberg Illumination and Optical Staining
      2.2.5 Color Temperature, and Prior Art Color Image Rendition Depending Upon the Combination of Film and Light Source
         2.2.5.1 Color Temperature and Compensation Filters
         2.2.5.2 Previous Colored Chemical Staining and Color Filters
   2.3 Summary of the Limitations of Prior Art Microscope Condensers and Light Sources
   2.4 Colored Light Illumination of Specimens in Prior Art Microscopy
      2.4.1 Desirability of Improving Upon the Limitations of Prior Art Microscopes and Microscopy re: Colored Light Illumination
   2.5 Previous Devices for Illuminating a Specimen Under Magnified Observation

SUMMARY OF THE INVENTION
1. Shape, Size and Appearance of the Illuminator Elements of the Present Invention
2. First Function of the Illuminator Elements of the Present Invention—Substantially Isotropic Illumination
3. Second Function of the Illuminator Elements of the Present Invention—Predetermined Color(s) Illumination
4. Construction of Certain Preferred Embodiments of the Illuminator Elements
   4.1 Illuminator Elements With Chromophores, Particularly Luminescent Chromophores, and More Particularly Fluorescent Fluorophores
   4.2 Illuminator Elements With Chromophores, Particularly Pigments, Accompanied by Scattering Bodies
   4.3 Illuminator Elements With Light-Scattering Bodies
   4.4 Brightfield and Darkfield Illuminator Elements
5. Spectrally-Engineered Light
6. Use and Utility of the Illuminator Elements
7. Variations of the Illuminator Elements

BRIEF DESCRIPTION OF THE DRAWINGS
Description of the Preferred Embodiment
1. Principles of Prior Art Illumination Relative to The Illuminator Elements of the Present Invention
2. Function and Usage of Illuminator Elements in Accordance With the Present Invention
   2.1 Isotropic Illumination
   2.1 The Production and Use of Isotropic Illumination During Microscopy
3. Genesis of the Illuminator Elements in Accordance With the Present Invention
4. Use of Illuminator Elements in Accordance with the Present Invention With, For Example, Both Transmission and Epi-Fluorescent Microscopes
5. General Construction of an Illuminator Element in Accordance with the Present Invention
6. Detail Construction of an Illuminator Element in Accordance with the Present Invention
7. Principles of Operation
8. Construction of the Preferred Embodiments
   8.1 Materials
   8.2 Preparation
   8.3 Cost of the Preferred Embodiments of the Illuminator Elements
   8.4 A Matched Illuminator and Specimen Stain
   8.5 Emission Spectra of the Preferred Embodiments of the Illuminators
   8.6 Brightfield and Darkfield Illuminator Elements
9. Comparison to Koehler Illumination
10. Performance, and Applications, of the Preferred Embodiment
11. Future Modifications

Figure 1:
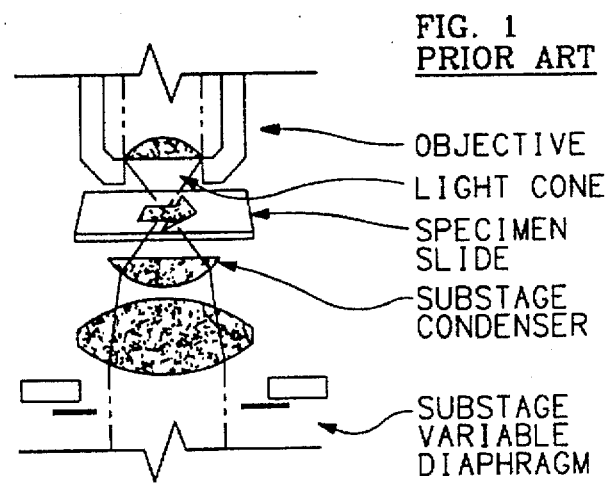

CLAIMS
ABSTRACT

BACKGROUND OF THE INVENTION

1. Field of the Invention

The present invention generally concerns light microscopes—particularly the illuminating light source and the condenser components of light microscopes—and the techniques of light microscopy—particularly the aligning of the microscope's illuminating light source, the focusing of the microscope's condenser onto the specimen, the setting of the aperture of the field diaphragm, and the matching the numerical aperture of the condenser to the numerical aperture of the objective.

The present invention particularly concerns certain improvements to light microscopes that completely eliminate the microscope's condenser, thereby obviating any necessity both for (i) aligning the illuminating light source and condenser, and (ii) matching the numerical aperture of the condenser to the numerical aperture of the objective lens. The same improvements also permit the use an inexpensive primary light source having an undistinguished, and commonly a yellowish, spectrum to produce artificial, engineered-spectrum, illuminating lights having any desired color or colors, including pseudo-white illuminating lights.

2. Description of the Prior Art 2.1 General Background

Well-designed and quality-built modern optical microscopes often fail to produce ideal images in actual use. The primary reasons for this are: 1) improper use of the illuminating light source, i.e. non-Koehler illumination, and 2) the use of a condenser-objective pair with mismatched numerical apertures.

Microscope image quality is a complex function of several variables including: the alignment of the illuminator, the focus of the condenser onto the specimen, the aperture of the field diaphragm, and the match between the numerical aperture of the condenser and the objective. Less than perfect adjustment of any of these parameters results in degradation of image intensity, resolution and/or contrast.

The quality of transmitted light microscopy is inordinately dependent on the correct, skilled, use of light sources and condensers. Yet this usage is highly complex, having a long and difficult learning curve. Even after the skill is learned the adjustment of the condenser and light source of an optical microscope is a labor intensive task.

There are few skills involved in the use of an optical microscope that serve to so completely reveal the expertise and experience of the person using the microscope as is the adjustment of the microscope's condenser. Many persons who profess expertise with microscopes, and who often genuinely believe that they are possessed of such expertise, are inept in forming the best possible image with an optical microscope; meaning that the best image that these people are able to form, usually after much labor, is often readily visually detectable, even by an untrained eye, to be inferior to the best possible image obtainable from an optimal adjustment of the microscope by a highly skilled microscopist.

When (i) the vast numbers of microscope users, and (ii) the exceedingly modest skills level of an average user in adjusting a microscope's condenser and light source, are both considered then it is immediately obvious that many hundreds of thousands of man-hours are spent looking at, and photographing, inferior microscopic images. It might be surmised that, to such degree as these images are sub-optimal due to improper adjustment of the microscope's light source and condenser, the images are nonetheless adequate. However, quality optical microscopes are very expensive machines, ranging in price to many tens of thousands of dollars U.S. ($10,000+ U.S.) circa 1994. Many investigators maintain that they require microscopes of the highest quality, and spend considerable amount of money on these microscopes in pursuit of better images. However, these same investigators are all too often lamentably ineffective in obtaining the best quality images with any standard microscope, regardless of cost. They are so ineffective principally because of (i) lack of the availability of a condenser having a particular numerical aperture as is optimal for a particular objective magnification, and/or (ii) lack of expertise in the delicate, complex and exacting task of adjusting the microscope's condenser and light source.

The (i) optimal condenser has a numerical aperture greater than or equal to the numerical aperture of the objective lens. Most microscopists make, and most microscopes are ultimately used to make, microscopic observations at differing magnifications by use of greater numbers of different objective lens having different numerical apertures than are the corresponding numbers of matching condensers available. This is because condensers are expensive, and only rare locations have extensive sets, let alone sets of multiple condensers each of which is of the highest quality. A variety of condensers offering different levels of correction for chromatic and spherical aberration are currently available. Usually, the simplest Abbe condenser costs several hundred United States dollars ($200+ U.S.), and the most sophisticated achromatic/aplanatic condensers having high numerical apertures cost several thousand United States dollars ($2,000+ U.S.), circa 1994.

The number of objective lenses used during the lifetime of a microscope in use in the biological sciences varies greatly from application to application. Certain limited-use microscopes suffice to be to be supported by three to five (3–5) objectives and one condenser. A more comprehensive microscope application, and set, might include six to eight (6–8) brightfield (br.f.) objectives (e.g.; 2.5X, 5X, 10X, 20X, 32X, 40X, 63X, 100X ), four to six (4–6) phase contrast objectives (e.g.; 10X Ph1, 20X Ph2, 32X Ph2, 40X Ph2, 63X Ph3, 100X Ph3). These objectives might normally be accompanied by four to five (4–5) condensers: a long-working distance condenser with a lower numerical aperture (e.g.; 0.33, 0.55) with brightfield of DIC and phase rings, a condenser with a higher numerical aperture (e.g.; 0.6 or 0.63), one with a highest numerical aperture (e.g.; 0.9 or 1.2 oil immersion), and one for darkfield illumination. The more extensive sets—mandated if imaging is to be optimal under all circumstances—are seldom found in the real world, nor can such expensive sets often be justified on the basis of cost effectiveness.

A diagram of the cone of illumination of a prior art microscope where the substage condenser and the diaphragm are properly adjusted so that the cone of illumination completely fills the aperture of the microscope objective is shown in FIG. 1. Likewise, a diagram more completely showing the image-forming ray paths that are traced from ends of lamp filament of a prior art microscope is contained in FIG. 2. Conjugate foci are the field diaphragm, specimen plane, intermediate image plane (entrance pupil of eyepiece) and, with the camera in place, the film plane.

Figure 3A:
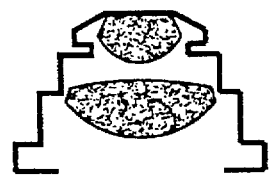
Figure 3B:
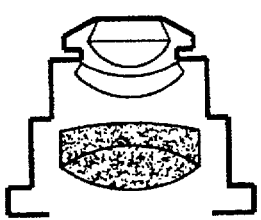
Figure 3C:
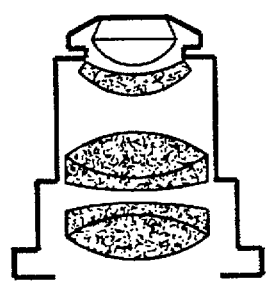
Figure 4A:
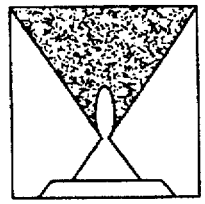
Figure 4B:
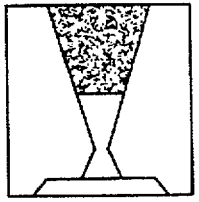
Figure 4C:
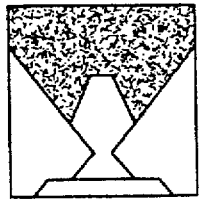

FIGS. 3a through 3c respectively shows prior art condensers of the abbe, aplanatic and aplanatic achromatic types. FIGS. 4a through 4c show the cones of light respectively transmitted by the prior art abbe, aplanatic and aplanatic achromatic condensers previously seen in FIGS. 3a through 3c.

Buying a more expensive microscope does virtually nothing to alleviate any (ii) lack of expertise, nor the difficult labors, that are necessary to adjust a microscope's condenser and light source to achieve optimal, Koehler, illumination. To understand (i) what Koehler illumination is, (ii) why it is difficult to achieve, and, ultimately, (iii) how the illumination to be provided by the present invention will compare to Koehler illumination, it is preliminarily necessary to discuss the optical train of existing light microscopes. This is done in the following section.

2.2 Detail Background

The following discussion, culminating in a detailed explanation of the adjustment, and the considerable sophistication and difficulties of the adjustment, of an optical microscope for Koehler illumination is taken from the book *Microscopes: Basics and Beyond*, Volume 1, by M. Abramowitz, available from Olympus Optical Corporation. The discussion is included in order that (i) Koehler illumination may be clearly understood and defined, (ii) existing techniques for the use of a microscope condenser may be definitively set forth, and (iii) the optical paths of the present invention, as later explained, may be rigorously compared with the optical paths of previous optical microscopes having a condenser.

2.2.1 The Essential Optical Train of the Light Microscope

The compound light microscope provides a two-dimensional magnified image of the specimen that permits resolving and measuring fine details of the specimen structure. The specimen can be positioned (oriented) and focused precisely, and the contrast and brightness of the image can be adjusted to bring out desired features of the specimen structure.

Mounted on a stable mechanical base, the optical components of the microscope can be rapidly exchanged and precisely centered, oriented, and focused. The base supports and couples the optical components and the specimen, on axis, into an optical train.

The optical train of a microscope usually consists of: (1) the illuminator, including the light source and collector; (2) the condenser; (3) the specimen, including the slide and coverslip; (4) the objective lens; (5) the ocular, or eyepiece; and (6) the camera, or observer's eye.

In addition, a conditioning device is often inserted between the illuminator and the condenser and a complementary filtering devices together modify the image contrast as functions of spatial frequency, phase, polarization, wavelength, etc.

Whether or not specific devices are inserted to condition the entrant waves and to filter the image-forming waves, some conditioning and filtering naturally takes place in any microscope.

Therefore, the sequence of components in the optical train of the light microscope may be considered to be: (1) the illuminator, (2) the conditioner, (3) the condenser, (4) the specimen, (5) the objective lens; (6) the image filter, (7) the ocular, and (8) the receiver.

Some of these components act as imaging elements, while most also have filtering or transforming functions. The components that form images in the microscope optical train are: the collector and the illuminator, the condenser lens, the objective lens, the ocular and the refractive elements of the eye, or the lens on the camera.

As their names imply, some of these components are not commonly thought of as imaging components. Nevertheless their properties are important in determining the final quality of the microscope image.

2.2.2 Principles of Koehler Illumination

The condenser in the light microscope was initially developed (as the name implies) for collecting ample light to illuminate the specimen. While many individuals still view this as the main function of the condenser, in fact the illuminating system" plays a far more important role in microscopy than is commonly recognized. The role of the illuminating system is indeed so important that one can quickly spot the degree of sophistication of the user of a microscope by the way the condenser and illuminator are adjusted.

One can achieve a superb image by properly aligning the axes, and adjusting the foci and diaphragm openings in the light source and the condenser. On the other hand, by poorly adjusting the optical train that illuminates the specimen, one can use a $2000 objective lens and produce an image that is worse than that produced by a $200 objective lens used skillfully. Of course, a more expensive, better-corrected objective lens can provide an image that is vastly better than a lower-priced lens if the illuminating system is adjusted well. One can equip modern research microscopes with condensers that are well corrected for aberrations (e.g., aplanatic achromats). In addition to selecting a superior-quality condenser, it is important to use the condenser under the specified optical conditions; either dry or oil-immersed; with proper distance between the condenser and the field diaphragm; and fully adjusted for Koehler illumination, with the aperture uniformly and fully illuminated.

In adjusting the illuminating system, or the light waves that illuminate the specimen in a microscope, Koehler illumination (Koehler, 1893; Dempster, 1944) provides several advantages.

First, the field is homogeneously bright. Second, the working numerical aperture of the condenser and the size of the illuminated field can be regulated independently. Third, the specimen can be illuminated by a converging set of plane wave fronts, each arising from separate points of the light source imaged in the condenser aperture. Fourth, this gives rise to the maximum lateral resolution and very fine optical sectioning, which yields maximum axial resolution. Fifth, the front focal plane of the condenser becomes conjugate with the rear focal plane of the objective lens, a condition needed for optimal contrast enhancement of the finer specimen details. Sixth, flare, arising from the microscope optics and their barrels, is reduced without any vignetting.

Many of these benefits, insofar as they are pertinent (the second and fifth elements will not prove to be so pertinent), will also be seen to be realized by the illuminator elements of the present invention—even though such illuminator elements are vastly different than the condensers that they replace.

For Koehler illumination, the various lenses of the microscope are arranged as shown in FIGS. 5 and 6 and are focused as follows.

First, the collector lens ($L_s$) focuses an image of the light source onto the condenser iris diaphragm ($D_c$). Second, the condenser lens ($L_c$) focuses an image of the field diaphragm ($D_s$) in the plane of the specimen. Third, the objective lens, the ocular, and the refractive elements of the eye (or camera) together focus an image of the specimen onto the retina of the observer's eye (or the camera image plane).

These adjustments give rise to the two sets of optical paths and the image planes represented in FIGS. 5 and 6. Together, the two sets of optical paths and the image planes characterize Koehler illumination.

Each set of optical paths and image planes will now be examined in turn, starting with FIG. 5.

As shown in FIG. 5, the collector lens of the illuminator produces an enlarged inverted image ($S2$) of the light source ($S_1$) onto the condenser iris diaphragm.

Then the condenser and the objective lens together form an image ($S_3$) of $S_2$) onto the rear focal plane of the objective lens in the following manner.

The condenser of the microscope is designed so that its iris diaphragm is located at the front focal plane ($F^1$) of the condenser lens. See FIG. 5. Therefore, light emanating from a point in the plane of the condenser iris emerges from the condenser as parallel rays, or as a plane wave.

A shown in FIG. 5, this plane wave traverses the specimen space and enters the objective lens. The objective lens converts the plane wave to a spherical wave. The spherical wave converges to the rear focal plane of the objective lens ($S_3$).

Thus, each point at the rear focal plane of the objective lens is conjugate with a corresponding point in the plane of the condenser iris diaphragm, and the condenser and objective lenses together form an inverted real image—$S_3$—of $S_2$ at the rear focal plane of the objective lens. See FIG. 5.

The rear focal plane of the objective lens or, to a close approximation, its back aperture ($D_{ob}$) is in turn focused by the ocular (see FIG. 5), which forms a small inverted image ($S_4$) at $D_{ob}$ ($\approx S_3$) at the eye point.

The eye point is located just beyond the rear focus ($F_{oc}$) of the ocular; it is where the pupil of the eye is placed.

In this manner, a series of planes containing $S_1$, $S_2$, and $S_3$ are successively focused and relayed to the eye point by the lenses $L_s$, $L_c$, plus $L_{ob}$, and $L_{oc}$. At the eye point, these images are all superimposed in the same plane and appear as the Ramsden disk.

For each lens (or lens group), the image and its source can be interchanged and each image and its source lie in conjugate planes. This means that a source of light, an image, or an object placed in any one of the four planes ($S_1$–$S_4$) would also be focused to the other three planes.

Therefore, in Koehler illumination, the following four structures lie in conjugate planes: the light source, the condenser iris diaphragm, the rear focal plane of the objective lens, and the eye point. These four lie in the aperture planes of the light microscope.

Simultaneously, another set of conditions represented in FIG. 6 is fulfilled in Koehler illumination.

As shown in FIG. 6, the condenser lens ($L_c$) produces a small inverted image of the field diaphragm onto the plane of the specimen. The field diaphragm is located at $I_1$, and the specimen at $I_2$.

The specimen is then focused by the objective lens ($L_{ob}$, see FIG. 6), which produces a magnified inverted image ($I_3$) of the specimen. $I_3$ appears in the intermediate image plane containing the field stop ($D_{oc}$) in the ocular.

Next, as shown in FIG. 6, the lenses of the ocular ($L_{oc}$) and the refractive elements of the eye ($L_e$) together form an image ($I_4$) on the retina $I_4$ is inverted relative to $I_3$.

Therefore, in Koehler illumination, the following four structures also lie in conjugate planes: the field diaphragm, the specimen, the ocular field stop, and the retina. These four conjugate planes are the field planes.

In Koehler illumination, then, we have two sets of conjugate planes: the aperture planes $S_1$–$S_4$, and the field planes $I_1$–$I_4$.

The two sets of conjugate planes are related to each other in an important fashion as follows.

As shown in FIG. 5, the spherical wave fronts converge, and the rays focus, onto the aperture planes ($S_1$–$S_4$). As shown in FIG. 6 the wave front converge and focus onto the field planes ($I_1$–$I_4$).

On the other hand, the wave fronts shown in FIG. 5 are planar, or nearly so, as they traverse the field planes. Likewise, the wave fronts shown in FIG. 6 are also planar, or nearly so, as they traverse the aperture planes.

Therefore, spherical waves in one set of conjugate planes become (nearly) plane waves in the other set of conjugate planes, and vice versa. Rays that are focused in one set of conjugate planes are (nearly) parallel rays in the other.

The two sets of conjugate planes are thus reciprocally related to each other.

This reciprocal relationship explains how the various diaphragms and stops in a microscope affect the cone angle of illumination and the size, brightness, and uniformity of the microscope field (see the next section 2.2.3). Whatever changes can be made to the beam of light in the field planes (i.e., by manipulating apertures or angles of the light path or by inserting conditioners) also can be made in the aperture planes by changing the angle or opening for the beam. The relationship is reciprocal.

More fundamentally, the reciprocal relationship between the two sets of conjugate planes explains how the light waves illuminating the specimen and diffracted by the specimen relate to each other. These relationships in turn explain the function and adjustments of the devices that condition the entrant wave and filter the specimen image.

All of these parameters together determine (or affect) the resolution, contrast, and fidelity of the microscope image.

2.2.3 Adjusting the Microscope for Koehler Illumination

This section will consider, in turn, three practical matters: How does one align the microscope for Koehler illumination? How does one focus the lenses to obtain Koehler illumination. Finally, how does one adjust the field and aperture diaphragms in Koehler illumination?

In translating the principles of Koehler illumination into practice, it should be noted that the lenses in a microscope are not, in fact, corrected to be free of all aberrations. Rather, each lens group is corrected to fit a given task at a specific location under specified conditions of focus in the optical train.

Although these design features constrain how selection and positioning of the lenses in the microscope, residual lens aberrations can be taken advantage of in critically aligning the lenses for Koehler illumination.

The goal is to align all of the optical components on axis, to focus the lenses correctly for Koehler illumination, and to adjust the diaphragms appropriately. The prior art illuminator will be considered first.

2.2.3.1 Alignment and Focus of a Prior Art Illuminator

Misalignment of a prior art illuminator can give rise to an unevenly illuminated field of view or an unevenly lit aperture. An unevenly illuminated field can be particularly troublesome in video microscopy where image contrast is enhanced electronically; unevenness of the field is accentuated together with the contrast of the specimen.

Although an unevenly illuminated aperture will not necessarily affect field uniformity, it can critically affect the quality of the image. Therefore, the light source and the whole illuminator need to be properly aligned, as well as correctly focused, for Koehler illumination.

For various reasons, the collector lenses in a prior art illuminator are rarely corrected very well. This imperfection may be used to advantage to center the light source with respect to the collector lenses.

The following description assumes that the microscope is illuminated, via a substage mirror, from an external illuminator. In many modern microscopes, that is not the arrangement; rather, the illuminator is built into, or attached to, the microscope base. For such microscopes, the procedures for achieving Koehler illumination are somewhat different (as discussed later) from those described below.

The following exercises aid in developing familiarity with the associated procedures. These exercises will lead to a better understanding of the significance of the adjustments than simply adjusting a microscope equipped with a built-in illuminator. The reader will then be in a better position to spot and, where possible, to correct troubles in the adjustment and design of the microscope. The exercises follow.

Place a target, such as a plain stiff piece of paper, about 25 cm in front of the prior art illuminator. Close down the field diaphragm on the illuminator. After removing any ground-glass diffuser and color filters, focus the collector lens until a sharp image of the light source is projected onto the target.

Open and close the field diaphragm and carefully observe the projected image of the source. If a light area expands and contracts uniformly around the image, then the source and the collector lenses are aligned.

If the light area does not appear symmetrically around the central image, then the source and the collector are not aligned with each other. In that case, the source must be brought into alignment by adjusting the two centering screws that support it.

If a concave collector mirror is present (in the lamp house behind the source), it is also adjusted now. By turning the appropriate screws, the tilt and focus of the mirror are adjusted so that an inverted image of the source, formed by the mirror, lies next to, or meshed with, the direct image of the source. The two images together should form a relatively uniform, nearly square, image of the source.

Once the collector and source are aligned, the illuminator is placed 10–20 cm from the substage mirror of the microscope. With the field diaphragm closed down, the image of the source is focused onto the substage mirror. The whole illuminator (without recentering the lamp and mirror in the illuminator) is oriented until the image of the source is centered on the substage mirror.

The tilt of the substage mirror is then adjusted so that the image of the source is centered on the condenser iris diaphragm. (The image on the condenser iris can be seen by looking through the mirror.)

2.2.4 Darkfield Microscopy, Rheinberg Illumination and Optical Staining

The present invention will be seen to provide very strong support, albeit in an entirely new manner, for darkfield microscopy, Rheinberg illumination and optical staining. Darkfield microscopy, Rheinberg illumination and optical staining are discussed by the aforementioned Mortimer Abramowitz in another of his books: Contrast Methods in Microscopy—Transmitted Light, Volume 2, from the Olympus Corporation, Japan. The following discussion is drawn from the "Contrast Methods" section of that book.

Darkfield microscopy is based on the same principle by which the stars, invisible to the eye in the bright daytime sky, become visible at night because of the stark contrast between the faint light and the black sky. This principle is applied in darkfield (also called darkground) microscopy as a simple and popular method of making unstained objects clearly visible. Such objects are often barely seen in conventional brightfield microscopy.

Darkfield illumination requires the blocking out of the central light which ordinarily passes through or around (the surround) the specimen—and allowing only oblique rays to "strike" the specimen mounted on the microscope slide. See FIGS. 7a and 7b.

If no specimen is placed on the slide, especially an unstained, non-light absorbing specimen, the oblique rays cross the specimen and are diffracted or refracted so that these faint rays are able to enter the objective; the specimen can then be seen bright on an otherwise black background. As in the example of starlight described above, the visibility is greatly enhanced by the contrast between the brightly shining specimen and the dark surround.

What has happened in darkfield illumination is that all the ordinarily un-deviated rays of the zero'th order have been blocked; the oblique rays, now diffracted by the specimen and yielding first, second, and higher diffracted orders at the back focal plane of the objective, proceed onto the image plane where they interfere with one another to produce an image of the specimen. See FIG. 7c.

If one looks at the back of the objective, it appears filled with light. This diffracted faint light is reconstituted into the visible image at the plane of the eyepiece diaphragm with its contrast reversed, bright image on black background. Since darkfield microscopy eliminates the bright un-deviated light, this form of illumination is very wasteful of light and thus demands a high intensity illumination source. Microscope slides must be of the appropriate thickness, approximately one millimeter±0.1; and the slides must be scrupulously clean because every dirt speck will be mercilessly bright.

Several pieces of equipment are used to produce darkfield illumination. The simplest is a "spider stop" placed just under the bottom lens (front focal plane) of the substage condenser; the aperture diaphragm is opened wide to pass oblique rays. The central opaque stop (you can make one by mounting a coin on a clear glass disk) blocks out the central rays. This device works fairly well, even with the Abbe condenser, with the 10X objective up to the 40X with an N.A. of 0.65. The diameter of the opaque stop should be approximately 8 mm for the 10X objective of N.A. 0.25 to approximately 15 mm for objectives of N.A. 0.65.

For more precise work and blacker backgrounds, one may choose a condenser designed especially for darkfield, i.e., to transmit only oblique rays. There are several varieties dry darkfield condensers with air between the top of the condenser and the underside of the slide—and immersion darkfield condensers which require the use of a drop of immersion oil (some are designed to use water instead) establishing contact between the top of the condenser and the underside of the specimen slide.

The dry darkfield is useful for objectives with numerical apertures below 0.75; the immersion condenser can be used with objectives up to N.A. 1.4. The objectives with N.A. above 1.2 will require a reduction of their aperture since their N.A. may exceed the N.A. of the condenser, thus allowing direct light to enter the objective. For this reason, high N.A. objectives used for darkfield as well as brightfield are made with a built-in adjustable iris diaphragm. The immersion darkfield condenser has internal mirrored surfaces and passes rays of great obliquity free of chromatic aberration; it often gives best results and blackest background.

Darkfield objects are often quite spectacular to see (e.g. a drop of fresh blood in darkfield); objects of very low contrast in brightfield shine brilliantly in darkfield. Such illumination is best for revealing outlines, edges, and boundaries; darkfield illumination is less useful in revealing internal details.

A striking variation of low to medium power darkfield is known as Rheinberg illumination, first demonstrated by the British microscopist Julius Rheinberg nearly a hundred years ago. This method produces beautiful colored images of unstained objects. (cover photograph) in this form of illumination, the central opaque stop is replaced with a transparent, colored, circular stop inserted into a transparent ring of contrasting color. These stops are placed under the bottom lens of the condenser; the specimen is rendered in the color of the ring; the background is the color of the central spot. For example, a green central stop inside a red wing will show "red protozoa" swimming in a "green sea." (See Needham's "Practical Use of the Microscope" pages 281–285 for further information.)

Darkfield illumination and Rheinberg illumination are both examples of how images are affected by manipulating light at the substage condenser. When an image is made to appear in color without use of chemical stains, the technique is described as "optical staining." The present invention will be seen to provide superior support for optical staining.

2.2.5 Color Temperature, and Prior Art Color Image Rendition Depending Upon the Combination of Film and Light Source The present invention will be seen to offer remarkable control over color during micrography, photomicrography and color photomicrography.

The color of a light source or its difference when color photomicrography is performed is indicated by its "color temperature". This term arises from the concept that when a black iron bar is heated, or carbon (charcoal) is burnt, it progressively becomes red, yellow, white and blue with successive increases in temperature. In stead of an iron bar or charcoal, the measurement of "color temperature" uses a fictitious, ideal, substance called a "full radiator", and the radiation energy of this substance is used as a standard. The "color temperature" of a real-world light source is equal to the absolute temperature, in degrees Kelvin, of a radiating full radiator that would produce the same color light.

For example, the color temperature of the earth's blue sky is from 8000° K to 10000° K; the sun at noon from 5500° K to 6500° K; a twelve volt, fifty watt (12 V, 50 W) halogen lamp 3400° K (at 12 V); and a six volt, thirty watt (6 V, 30 W) tungsten lamp 2850° K (at 7.5 V).

There are two major types of color film for all purposes including color photomicrography. Daylight-type color film is balance for sunlight. Tungsten-type color film is balanced for artificial light. The selection of the film used is dependent (prior to the present invention) on the light source used. This selection is important. Photographs will appear excessively red if daylight film is used under incandescent light conditions. Similarly, when exposing a tungsten-type film with daylight a bluish photograph is obtained. The proper color temperature to expose daylight-type color film is typically 5500° K to 6000° K; to expose tungsten-type color film is typically 3200° K or 3400° K.

The present invention will be seen to offer great ease, and certainty, in matching the illuminating light to any color film of choice during color photomicroscopy.

2.2.5.1 Color Temperature and Compensation Filters

A typical color temperature of a halogen lamp illumination source as seen through a microscope is 3460° K (=289 nm) whereas the typical optimal color temperature to expose a daylight-type color film is 5500° K. The mis-match between film and source color temperature is corrected by insertion of a color compensation filter in the path of the illuminating light.

A type of color filer called a light-balancing filter is used to convert the color temperature of the microscope light source to the color temperature of the film being used. A Light Balancing-Day, or LBD, filter is used to adapt artificial illumination to daylight-type color film. A Light Balancing—Tungsten, or LBT, filter is used to adapt natural daylight illumination to tungsten-type color film.

Another type of filter, called a color-compensating filter, is used for the correction or compensation of color rendition problems —such as slight differences in color hue or fading in developed photographs. A color compensating filter is normally abbreviated "CC", and the color a particular filter is normally marked in capital letters upon its rim. Six different colors are available, each in six different degrees of density. If the color blue is to be reduced then a yellow, or CCY, color-compensating filter is used. If the color cyan (blue and green) is to be reduced then a red, or CCR, color-compensating filter is used. If the color green is to be reduced then a magenta, or CCM, color-compensating filter is used. If the color yellow (red and green) is to be reduced then a blue, or CCB, color-compensating filter is used. If the color red is to be reduced then a cyan, or CCC, color-compensating filter is used. If the color magenta (blue and red) is to be reduced then a green, or CCG, color-compensating filter is used.

2.2.5.2 Previous Colored Chemical Staining and Color Filters

Other types of filters exist. Color contrast filters are used to control the contrast within black-and-white photographs. The filter that enhances the contrast within a black-and-white photograph of a red/yellow specimen is green. The filter that enhances the contrast within a black-and-white photograph of a yellow/orange specimen is blue. The filter that enhances the contrast within a black-and-white photograph of a blue specimen is orange.

The most commonly used color contrast filter is green. This is because of two reasons. Objective aberrations are most effectively compensated near the green wavelength; loss of image clarity due to chromatic aberration being averted or at least improved by a green filter. Also, dyes such as hematoxylin and eosin absorb green light well, resulting in higher contrast when green light is used.

Color contrast filters were early, and are currently, used method of increasing contrast of stained specimens. The color contrast filters are placed in the light path. These filters may be made as gelatin squares (by the Eastman Kodak Company), or as glass or interference-type filters (by many independent optical supply houses, as well as microscope manufacturers).

For example, if a specimen is stained with a red stain, a green filter will darken the red areas thus increasing the contrast. On the other hand, a green filter would lighten any green stained area. Microscopists can secure a set of color filters which are valuable for observation and for black-white photomicrography (see the Kodak booklet "Photography Through the Microscope," pages 60–64). Green filters are particularly valuable for use with achromat and phase contrast objectives. Achromats are spherically corrected for green light phase contrast objectives are usually designed for manipulation of wave length assuming the use of green light since phase specimens usually are transparent and without inherent color.

Each of light-balancing filters, and color-compensating filters, will be seen to be substantially obviated, and supplanted, the microscopy illumination light sources of the present invention.

2.3 Summary of the Limitations of Prior Art Microscope Condensers and Light Sources One condenser, howsoever expensive, seldom suits all applications in which a microscope is used. The numerical aperture of the condenser should optimally be matched to the numerical aperture of each objective lens as may, from time to time, be used in the microscope. This normally requires that not just one, but several, expensive condensers are required in support of each microscope. The several condensers are collectively so expensive as to typically aggregate a significant percentage of the total cost of the microscope on which and with which they are used. Because only one condenser is in use at any one time on any one microscope the collective condensers represent, in aggregate, a costly resource that has a low average usage.

Moreover, the adjustment of even the correct condenser and its accompanying light source to realized Koehler illumination is difficult and time-consuming.

Accordingly, it would be exceedingly useful if some improvement to microscope imaging technology was to be able to alleviate the (i) expense and (ii) burden of selecting and adjusting a microscope's light source and condenser for optimal illumination, possibly by completely eliminating the condensers and/or the light source. With such an imaging technology improvement (i) the cost of the microscope could be substantially reduced by up to the cost of its condensers and/or light source, and (ii) the considerable recurring labor costs of condenser and light source alignment for Koehler illumination could be avoided.

The improved imaging technology would desirably produce images of comparable quality to best "conventional" condenser techniques. It would desirably be suitably versatile for use with all typical microscope systems.

Such a device might even suffice to yield better than average images since most users do not have condensers matched to all objectives. Moreover, even if a user has the proper condenser, the user may not know how to obtain Koehler illumination. Even if he of she does possess such knowledge, it is not invariably coupled with the motivation, care and dedication to required to realize Koehler illumination. Finally, even for those skilled users who do know how to adjust t(e microscope's condenser and light source, the effort and aggravation of doing so might be avoided.

2.4 Colored Light Illumination of Specimens in Prior Art Microscopy

Prior art microscopy is much concerned with staining, and selectively staining, specimens—including with fluorescent dyes —but is not much concerned with the complimentary procedure to coloring the specimens under observation— namely to observe the specimens in colored light(s).

There are hundreds, if not thousands, of different stains for specimens under microscopic examination. Although distinguished by their selective affinity for different portions of a specimen, stains also have different colors. The color spectrum of many stains are known, and are in all cases determinable. Sometimes the color spectrums have considerably narrow peaks, meaning that the colors are pure.

Quite commonly specimens that are stained are microscopically observed and photographed in white light. Although the broad spectrum of such white light may desirably serve to simultaneously illuminate those unstained (on lessor-stained) portions of the specimen that are in natural, or near natural, color(s), illumination with white light clearly fails to selectively highlight, as best as is possible, only the color stained portions, and nothing but these portions. For that, illumination with colored light is necessary.

Specimen illumination with colored light is occasionally performed. The colored illuminating light is produced by putting a color filter, or which filters there are the many kinds that are also associated with photography, in front of a white light source. There are several challenges, and some problems, presented by this straightforward procedure. First, the light is (i) desirably bright in the spectral region passed by the filter, while not being (ii) excessively over-bright in spectral regions that the filter may imperfectly filter out. The consideration (i) means that, for a narrow spectrum filter, a very bright, relatively expensive, and relatively-high-energy relatively-high-heat-producing light source is commonly used. The consideration (ii) means that the (bright) light source should not be so excessively strongly emitting in the yellow region of the spectrum as is, for example, a common incandescent light bulb. (It is also tiring to observe under yellow-tinged light.)

According to these considerations, the illumination light source for better grades of microscopes are commonly multi-hundred watt quartz-halogen light sources using special bulbs and costing several hundreds of dollars U.S. each, circa 1994. Regular use incurs the additional expense of frequent bulb replacement. Alternative, equally or more expensive, light sources are based on mercury or xenon. The typical wattage of the light sources is 50 to 100 watts. These light sources are not particularly efficient, and give off substantial heat which may be undesirable in certain laboratory settings. They produce ozone, which is deleterious to human health.

However, because these light sources are robustly packaged, commonly in metal housings of high quality as reflects their considerable cost, no great concern is currently registered, to the best knowledge of the inventors, that these sources are basically very expensive when considered simply as sources of light. After all, quality optical microscopes and associated equipments, and quality optical microscopy, are old arts that are commonly perceived to be expensive, and expensive light sources "fit right in".

Another, more subtle, problem with filtered light sources of any quality is their general inability to produce light of two or more separated spectral peaks (on the plot of intensity versus frequency) simultaneously. For example, if a single specimen contained separate bodies stained both red and blue (and possibly also green, etc.), and was desirably observed under each of a spectrally-narrow red, and a spectrally-narrow blue, light, then light of this characteristic could not normally be produced by filters at the same time. A filter that would pass red light only will not pass blue light, and vice-versa. Therefore light that is simultaneously red and blue (only) cannot be made from color filters in series.

(Dual-color illumination can be specially realized by multiple-bandpass dielectric filters commonly used for dual-wavelength fluorescent excitation. However, these dielectric filters are typically very expensive and are not available in a large range of configurations and sizes.)

If two filters are put in parallel, and the specimen simultaneously illuminated from two filtered sources, then the "noise" margin of light illumination outside the spectral regions of interest can be increased to the extent that two filters let through more extraneous (i.e., outside the spectral region of interest) light than does one filter. Alternatively, if the specimen is photographed first in one (e.g., red) light, and then in the other (e.g., blue) light in a double-exposure photograph, then the same limitation is present.

Most microscopists have subconsciously incorporated these limitations into their work. Many microscopists, especially those in the biological sciences, observe complex bodies from nature that have abundant structure (as well as, quite obviously, microscopic size). Microscopists are capable, though careful selective staining of specimens, to produce vivid palettes of false colors. Color photomicrographs should therefore be a riot of vivid primary colors. Alas, these photographs are rare. When a striking multi-color photomicrograph is rarely produced it is sometimes accorded the status of art, or may aspire to the cover of some journal for being of general interest, comprehension and/or appeal.

2.4.1 Desirability of Improving Upon the Limitations of Prior Art Microscopes and Microscopy re: Colored Light Illumination It has proven hard to see in "color" with existing optical microscopes at high magnifications. The well-know required corrections for chromatic aberrations in an optical train are only part of the problem. Another part of the problem is that the white, and colored, lights used to illuminate specimens, and stained specimens, for microscopic observation are none too good. The light(s) is (are) often unmatched (in the case of white light), or poorly matched with the specimen's natural colors, or stained colors. The light(s) would desirably be so matched because the contrast of observation would be improved if there was little, or no, extraneous light obscuring the image to that particular color light (those particular colored lights) that is (are) most useful to illuminate the specimen's feature(s) of interest.

It would obviously be of immense utility if a single specimen, for example a biological specimen, in which certain bodies are stained more predominantly a first color, and in which other closely-located or co-located bodies are stained more predominantly a second color, could be simultaneously observed (and/or photographed) in both a matched first-color, and a matched second-color, lights. Contrast, and lack of scattering from features of the specimen irrelevant to the observation, would both be expected to be improved.

2.5 Previous Devices for Illuminating a Specimen Under Magnified Observation

The present invention will soon be seen to replace the conventional condenser illumination stage of an optical microscope with a typically small, typically cylindrically- or cubically-shaped "illuminator" device typically having at least one flat, and typically polished, surface. This illuminator element is typically placed tight against the specimen under observation. It typically contains chromophores and/ or light-scattering bodies, and more typically contains light-scattering bodies in combination with several different types of luminescent chromophores in the form of fluorophores. Each of the different types of fluorophores emits an associated spectrum of fluorescent light. Each produced spectrum is typically a color of visible light in the range from ultraviolet (UV) to near infrared (NIR). The collective spectra is typically white light. The fluorescent light emissions are in response to illumination of the illuminator element's fluorophores. The emitted light is isotropic, serving admirably both to (i) illuminate the specimen, and (ii) fill the objective lens of the microscope. A quality wide field image is formed.

Accordingly, and although the purposes of previous devices will be seen to be considerably divergent from the purposes of the present invention, previous devices that serve to illuminate specimens that are under microscopic observation with induced emissions of light are of relevance to the present invention.

U.S. Pat. No. 3,600,064 for a PORTABLE MAGNIFIER WITH A RADIOLUMINESCENT LIGHT SOURCE concerns an extremely simple hand-held magnifier with a radioluminescent light source. Assigned to 3M Company, the seemingly reasonably useful may have been, by modern standards, unsuitably radioactive for consumer use because of incorporating tritium or Krypton-85 gas. Such a rudimentary device is of relevance to the present invention for showing one type of luminescence serving to illuminate a specimen under magnified observation.

Similarly, and progressing in a rough logical progression, U.S. Pat. No. 5,148,307 shows a NANOMETER DIMENSION IMAGING DEVICE including a source of (illumination) excitation and an active, electro-optic or chemiluminescent, material serving to produce light. This patent again shows us that it is known to illuminate a specimen under observation by a microscope (or by a lens) with light produced by luminescence—herein of yet another kind.

U.S. Pat. No. 3,205,763 for a LIGHT SOURCE ESPECIALLY USEFUL IN SPECTROGRAPHIC SYSTEMS shows a passing of light—again photoelectrically generated by electrons striking a phosphor—through the objective of a microscope so as to scan though a specimen under observation until the transmitted light is detected (by a photomultiplier in synchronization with the light scan). Somewhat similar to the British patent, the path of the same illuminating light in this U.S. Patent is bi-directionally through the objective lens of the microscope.

U.S. Pat. No. 2,273,235 for an ULTRAVIOLET OR ELECTRONIC MICROSCOPE shows the use of an improved luminescent screen in an ultraviolet or electron microscope. Illuminating (ultraviolet or electron) radiation passed though the specimen is projected upon the screen, which screen produces a visible image.

Likewise, British Patent No. 2,126,778 for IMPROVEMENTS RELATING TO SCANNING ELECTRON AND SCANNING OPTICAL MICROSCOPES shows that a luminescent device may be placed in the path of a scanning electron beam of a scanning electron microscope (SEM) in order to produce a scanning light beam that is focused on a specimen under optical observation, producing thereby a scanning optical microscope (SOM). The luminescent device thus serves to convert a (scanning) electron beam into a (scanning) light beam. This conversion necessarily transpires before the produced light is passed in an optical path through the specimen.

U.S. Pat. No. 2,298,947 for a LUMINESCENT LAMP shows a luminescent light source, or lamp, of high intrinsic brilliance.

These collective patents—although remote to the "illuminator" of the present invention—generally show that it is known to, under particular circumstances, use electrofluorescent (i.e., electron-induced), or radioluminescent, or phosphorescent, or chemiluminescent, or fluorescent light (i.e., light-induced) to illuminate a specimen that is otherwise under microscopic observation. Insofar as these luminescent light sources are physically distended, and not all are, then the luminescent light that they emit is isotropic over the area of emission, much in the manner that the emission of light from a common fluorescent light is isotropic over the area of the tubular phosphor. However, in the previous light sources the area over which the light was isotropic was not placed sufficiently closely to the specimen under observation so that the isotropy of the light was preserved where, and over the area at which, the specimen was observed. In other words, because isotropic illumination of the specimens was never intended in the previous devices, such isotropy as may have incidentally been present was substantially dissipated at, and over the area of, specimen illumination. The present invention will be seen to be concerned with where, and to what purpose, isotropic light (preferably but not exclusively fluorescent light) is generated for the illumination of a specimen under microscopic observation, as well as how such illuminating light is (preferably) to be generated.

SUMMARY OF THE INVENTION

The present invention contemplates illuminator elements for use with optical microscopes. Each and any individual illuminator element completely replaces an infinite set of condensers for a microscope, and works equally well with microscope objective lenses of any and all numerical apertures.

Furthermore, in certain (preferred) embodiments of the illuminator elements that are used in combination with a primary source of light that is external to the illuminator element itself, this external light source replaces the normal specimen illumination light source of the microscope.

Many illuminator elements may be related as a set where each different one of a number of related illuminator elements produces a precisely "spectrally-engineered" colored light(s) of a predetermined spectrum or spectra, including a spectra of a pseudo-white light. (A number of illuminator elements accordingly form a "set" for purposes totally unrelated a "set" of prior art condensers having differing numerical apertures.) Sets of such illuminator elements permit the ready production of light(s) of any desired spectral characteristics from primary light sources that are no more sophisticated, nor any more expensive, than ordinary household alternating current (a.c.), or flashlight direct current (d.c.), incandescent light bulbs.

1. Shape, Size and Appearance of the Illuminator Elements of the Present Invention In their most general form, illuminator elements in accordance with the present invention are used with optical microscopes that detect light radiation in the range from the near infrared (NIR) to the ultraviolet (UV). An illuminator element for these microscopes is typically a small and compact, unitary, and unchanging piece of material that is devoid of moving parts.

Illuminator elements may be, and are, formed in myriad shapes and volumes. It is necessary only that an illuminator element should be sized and shaped so as to be suitably positioned proximately to, and normally in contact or in partial contact with, a specimen that is located upon the specimen stage of an optical microscope. According to this requirement, illuminator elements commonly have a volume from a fraction to a few cubic centimeters ($cm^3$). They typically (but not necessarily) have the regular geometric shapes of polyhedrons (such as cubes, or parallelepipeds, or prisms), oblate spheroids, or, most commonly, cylinders or disks. So shaped and sized, illuminator elements commonly range in thickness from a thick film having a thickness of some fractions of a millimeter to three-dimensional bodies having a thickness of several tens of millimeters, and are more commonly about a centimeter in thickness. Each illuminator element typically has and presents an area of some fraction of a square centimeter to some few square centimeters ($cm^2$) upon each of its major face(s).

The illuminator elements, while undistinguished in either size or shape, may, in some embodiments, show fairly dramatic optical properties—even under normal ambient lighting. Some embodiments contain fluorescent compounds (as will be explained), and glow brightly like jewels. Other embodiments contain light-scattering bodies (as will also be explained), and commonly appear translucent in the manner of, for example, a milk white opal. Many, even most, embodiments contain both fluorescent compounds and light-scattering bodies, and show a diffuse, gentle, and typically colored glow.

2. First Function of the Illuminator Elements of the Present Invention—Substantially Isotropic Illumination All the variously shaped and sized illuminator elements of the present invention function as a substantially evenly-spatially-distributed, substantially randomly-spatially-distributed array of a great multiplicity of substantially-point-sized light sources. Each of the light sources produces light that is (i) substantially uncorrelated in time (phase) with the light of other point light sources, and (ii) without distinction as to direction, meaning isotropic. The light that is emitted from such an illuminator element is called "spatially isotropic light". "Spatially isotropic light" is defined as light that is emitted in all directions equally, and without distinction or preference.

A common example of a source of spatially isotropic light is the phosphor surface of a common fluorescent light tube. Spatially isotropic light, and light illumination, is sometimes called "distributed Lambertian" illumination after John Lambert, 1619–1683, English parliamentarian and investigator in optics.

An illuminator element in accordance with the present invention is positioned (i) closely proximate to a specimen under observation by a microscope (ii) on an opposite side of the specimen to that side whereat exists the microscope's objective lens. For all practical purposes the illuminator element bathes the specimen in a uniformly bright, directionally isotropic, light from nearly a full two pi ($2\pi$) steradians of solid angle. The specimen is thus "substantially isotopically illuminated", and, for the purpose of viewing along an optical axis through a microscope, the specimen is so substantially isotopically illuminated (to visible limits of human perception) by a homogeneously bright high-numerical-aperture light source.

3. Second Function of the Illuminator Elements of the Present Invention—Predetermined Color(s) of Illumination Moreover, in certain preferred embodiments of the invention, each individual illuminator element produces its isotropic illumination at virtually any desired, predetermined, spectral frequency or frequencies—i.e., at any desired color or colors.

The color or colors of a color illuminator element are, in an embodiment of a first type called a "fluorescent color illuminator element", derived from the emission of fluorescent light.

The particular color or colors at which an individual color illuminator elements of the first type serve to emit light is predetermined by choice of the particular fluorescent chemicals that are incorporated in the construction of each such illuminator element. Once predetermined, the chemically-determined fluorescent light emission is typically constant and invariant throughout an indefinitely long lifetime. The fluorescent chemicals within the color illuminator element are energized to emit fluorescent light at one or more predetermined frequencies by an absorption of energy, typically a radiant energy and more typically light energy.

This energy is received from a primary external (light) radiation source. This external radiation (light) source need have no predetermined, nor any constant, spectrum. Neither, within broad ranges, need it have a particularly high, nor a uniform, intensity of radiation (light) emission. It is sufficient only that primary radiation (light) source should supply radiation within a broad spectral bandwidth to the fluorescent, color, illuminator element. The external primary radiation (light) source may typically be a common incandescent light bulb—such as is used in a household lamp or a flashlight—having any of (i) a brightness, (ii) a yellowish spectral output, and/or (iii) spatial properties that were previously manifestly unsuitable for use in microscopy.

The color or colors of an illuminator element are, in an embodiment of a second type—called a color illuminator element with dye(s) and scattering bodies—derived from (i) selectively absorbed (i.e., conversely, selectively transmitted), and from (ii) scattered, light.

The color or colors of the second-type illuminator element are a consequence of its selective light absorption (selective light transmission). The color or colors at which an individual second-type illuminator element absorbs light (transmits light) is predetermined by the choice of chemical dyes that are incorporated in its construction. The chemically-determined light absorption (light transmission) is typically constant and invariant throughout an indefinitely long lifetime.

Dye-containing illuminator elements are illuminated, absorbing light at predetermined frequency(ies), by broad-spectrum radiant light energy developed in a primary external light source. This external light need have no predetermined, nor any constant, spectrum. It must, however, include at least the frequency(ies) that are transmitted by the chemical dye(s) that is (are) within the illuminator element, and it normally also includes frequencies that are absorbed by this dye (these dyes). Neither, within broad ranges, need the primary light source have a particularly high, nor uniform, intensity of light emission. It is sufficient only that primary light source should supply radiation containing the frequency(ies) that are transmitted by the chemical dye(s) in the illuminator element. The external primary light source is again typically a common incandescent light bulb having (i) the brightness, and (ii) the yellowish spectral output, and (iii) the spatial properties that render it manifestly unsuitable for microscopy.

The second-type illuminator element also incorporates light scattering bodies. These light-scattering bodies are typically minute agglomerations, suitably called microspheres. The light-scattering bodies (i) have a diameter on the order of the wavelength(s) of the primary external light radiation. They are (ii) made of a material having a high index of refraction. They are (iii) substantially evenly (iv) substantially randomly distributed (v) at a density that makes the scattering length of the light that they serve to scatter to be much, much smaller than the macroscopic dimensions of the illuminator element, and on the order of micrometers. An interaction between the primary external radiation, the absorbing dyes, and the light-scattering bodies causes the second-type illuminator element to produce an isotropic light the chromaticity of which is a function of the transmission characteristics of (i) the absorbing dye(s) and (ii) the spectral features of the primary external radiation source.

A third type of illuminator element contains only these light-scattering bodies (and no chromophores in the form of either fluorescent chemicals or dyes) and is so called. This type of illuminator element is a "color" illuminator element only in that it serves to render isotropic a primary external light radiation that is colored, and to assume the color(s) of this external light source, and not because it serves to impart color in of itself.

The light-scattering bodies within the third-type illuminator element are again typically of dimensions, or a dimension, on the order of the illuminating wavelength(s). They are again made of material having a high refractive index. The light-scattering bodies are dispersed in a substantially random, substantially even, spatial distribution within the body of the illuminator element. They are of such a density as causes myriad light reflections, with the scattering length being on the order of micrometers. The light-scattering bodies serve to spatially redistribute and randomize the external light source by multiple scattering occurring along a great number of essentially random paths.

Still another, fourth and major, type of illuminator element contains both fluorescent chemicals and light-scattering bodies, and is so called. The fluorescent chemicals are normally capable of reabsorbing, albeit with less than 100% efficiency, their own fluorescent light as well such light as is received from the external, primary, radiation source. Multiple absorptions and emissions produce a particularly pure and diffuse, isotropic, colored light output.

All the illuminator elements such as produce a particular color(s) of light may usefully be associated with certain, spectrally related, color dyes that are used to stain the specimen. The dye(s) used to stain the specimen are normally chosen so as to have a very pure, spectrally sharp, color (of reflection). Meanwhile, the spectrum of the illuminator element is correspondingly sharp, and overlaps the reflection spectrum of the dye(s). In microscopically observing a color-dyed specimen with this narrow-spectrum light the selectively color-dyed portions of the specimen will be optically isolated from the general (light) background at a tremendous "signal-to-noise", and will stand out exceedingly clearly.

A color illuminator element is not limited to emitting, to absorbing (transmitting), or to scattering at only one frequency, but can emit, absorb or scatter at several frequencies simultaneously—even while excited from but a single external primary radiation source. For example, one preferred emission-type illuminator element in accordance with the present invention produces narrow spectral bandwidth emission peaks at each of the red, blue and green primary colors: thus a pseudo-white light. In observing an unstained or neutrally-colored specimen, some microscopists prefer this pseudo-white light to broad-spectrum common incandescent "white" light, or daylight. However, if the specimen is, per chance, selectively stained red, blue and green (each in an associated receptor structure within the specimen), then observation under the pseudo-white light will be notably different than with regular, spread-spectrum, white light. Namely, the stained regions will appear very sharply contrasted and prominent (as would be expected).

4. Construction of Certain Preferred Embodiments of the Illuminator Elements

Each illuminator element of the present invention functions to emit or to scatter light isotropically and in all directions equally because (i) a multiplicity of (essentially) isotropically absorbing/emitting, absorbing/transmitting, and/or simply reflecting (essentially) molecular-size, light sources are (essentially) evenly spatially distributed within (ii) a stable matrix suitably sized and shaped so as to be positioned closely proximate to a specimen under observation by a microscope.

Typically the light sources are (i) fluorescent molecules, (ii) dye molecules and/or (iii) light-scattering particles in a size range on the order of the wavelength(s) of the light that they serve to emit, to absorb (transmit) and/or to scatter, and are more typically in a size range from 0.5 to 1.5 microns. The density of these light sources is sufficiently high so that the path of light between (i) emission, absorption, and re-emission, and/or between (ii) emission and scattering, and/or between (iii) successive scatterings (i.e., the scattering length) is very short, and on the order of micrometers.

The distribution of these multiple light sources within the matrix is typically random and homogeneous, although it is not necessary either. (When the distribution is not random, and/or when the density is not uniform, the directional isotropy of the light is not necessarily destroyed nor even degraded, but the intensity (amplitude) of the produced light will typically incur a gradient across the illuminator element.)

In its detail structure, an illuminator element of the present invention is based on a matrix that is stable for at least the period of microscopic observation, and that is more commonly solid and stable over an indefinitely long period. The matrix is typically made from translucent or transparent (at the light frequency or frequencies of interest) polymer plastic or glass. The matrix is more typically made from polymer plastic, and particularly from polymethylmethacrylate and poly-2-hydroxy ethylmethacrylate in proportion 3:1 by volume.

Of much greater interest, and much greater sophistication, than is the matrix—which is but the support mechanism for the producers of isotropic light—are the various substances and mechanisms by which the isotropic light illumination is produced, especially at a certain predetermined frequency or frequencies.

There are various ways to categorize the principle embodiments of the illuminator elements in accordance with the present invention. Moreover, various individual illuminator elements may be classified in multiple categories—howsoever the categories are variously defined. The following sub-sections 4.1–4.4 categorize the illuminator elements by (i) the chemicals contained therein, and by (ii) the density of such chemicals. In this categorization, a first major type of illuminator element produces spatially isotropic light illumination by action of great numbers of (i) chromophores, defined as a chemical group that gives rise to color in a molecule. In this categorization, another major type of illuminator element produces isotropic light illumination by action of great numbers of (ii) substantially-non-absorbing highly-reflective light-scattering bodies that collectively isotopically scatter light received from a primary external source thereof onto the specimen at low loss. In this categorization, still another type of illuminator element produces isotropic light illumination by (iii) a combination of chromophores and light-scattering bodies.

Both the chromophores and/or the light-scattering bodies collectively serve to randomize an excitation light—which is distinctly directional and non-isotropic—that is received from an external source. This external light is transformed into an essentially uniform distribution of plane waves arising from separate points that are distributed (i) essentially uniformly, (ii) essentially continuously, and (iii) essentially randomly in space. Such a distribution of plane waves constitutes one definition of "isotropic illumination", or of an "isotropic light source".

An illuminator element in accordance with the present invention does not normally have an equal index of refraction to any of the material of (i) a microscope slide, (ii) a specimen, (iii) a cover slip, or (iv) any oil or water in which the specimen may be contained. Accordingly, isotropic light illumination exiting the surfaces of the illuminator element is diffracted before impinging upon the specimen. Light rays arise within the illuminator element at greater than a critical angle to its surface will be internally reflected, and will not impinge upon the specimen at all. Accordingly, the specimen does not receive such precisely isotropic illumination as would only be produced by an illuminator element of infinite size, is best spoken of as being "substantially" isotopically illuminated over a broad angle. The definition of what constitutes "substantiality" is, however, quite simple: the specimen-illuminating light is so "substantially" isotropic that no shadows are visible through the microscope.

Moreover, the chromophores (within illuminator elements having such chromophores) serve to select and/or to transform in frequency the light received from the primary external source thereof.

Notably, the primary external light source may be derived from almost any crude source of light that is shined upon the illuminator element from almost any angle (save along the optical axis of the microscope). The primary external light source most particularly need not be the normal specimen illumination light source of the microscope (although this generally expensive source will suffice admirably). The primary external light source may be, for example, (i) a standard 110 v.a.c. incandescent light shielded so as to shine upon the illuminator element, or even (ii) a common pocket pen light, or flashlight.

With these general principles in mind, the following categories of illuminator elements in accordance with the present invention may be considered.

4.1 Illuminator Elements With Chromophores, Particularly Luminescent Chromophores, and More Particularly Fluorescent Fluorophores If chromophores are used in the illuminator element, then they may either be of (i) a chemical group having the aspect of a color light source (i.e., a light that is describable in terms of hue, brightness and saturation) or (ii) a chemical group having the aspect of a colored object (i.e., an object that is describable in terms of hue, lightness and saturation).

If the chromophores used are of the character of a chemical light source then they are, by definition, luminescent chromophores. The luminescent chromophores may be any of (i) radioluminescent, (ii) chemiluminescent, or, preferably, (iii) fluorescent. Fluorescent luminescent chromophores are equivalently called either fluorochromes or fluorophores.

In those embodiments of the present invention using fluorescent fluorophores (which are also called fluorescent chromophores, and fluorochromes), the fluorophores are excited with radiation from an external source thereof so as to emit a non-directional isotropic fluorescent light by which the specimen may be substantially isotopically illuminated. The emitted fluorescent light has a predetermined optical spectrum. One common emission spectrum preferably has but one, narrow, emission peak substantially at but one single frequency (i.e., one color). For example, the fluorophore rhodamine 125 produces the color green with a peak emission at an approximate wavelength of 524 nanometers.

Alternatively, a fluorophores of several different types may be used to emit, normally in response to the same excitation radiation, fluorescent light each at an associated optical spectrum. The composite emitted light spectra formed by the combination of the several optical emission spectrum of each different type fluorophore constitutes an artificially engineered—commonly a pseudo-white—light. The preferred pseudo-white light has only a few, typically three, spaced-apart emission peaks. It has been found that some microscopists prefer such a pseudo-white light for observations, as opposed to observing under the broadly smeared spectrum of normal sunlight or of artificial light.

One particularly effective pseudo-white light is comprised of equal intensities of green, blue and red light. The green light is made from rhodamine (both types 6G and 110) fluorophores emitting light within a sharp peak (on the plot of emission versus frequency) centered about 550 nanometers; the blue light from coumarin fluorophores emitting light within a sharp peak centered about 420 nanometers; and the red light from sulforhodamine fluorophores emitting light within a sharp peak centered about 610 nanometers. Clearly any desired colored light or lights as suit a particular microscopic observation can be made from particular fluorophores, of which there are many well-known and well-documented types.

The present invention also contemplates entire families of related illuminator elements, each of which elements emits a particular color or colors of light (including pseudo-white lights).

The chromophores that are of the character of a chemical light source, and particularly the fluorophores, may be, and preferably are, combined in the matrix with substantially highly-reflective light-scattering bodies. The light-scattering bodies are commonly made from a material having an index of refraction that differs greatly (i.e., >×2) from the index of refraction of the stable matrix in which the light-scattering bodies are contained, and are more commonly made from titanium dioxide. In use in combination with fluorophores, the light-scattering bodies collectively serve to aid in isotopically scattering the luminescent, fluorescent, light onto the specimen.

These same highly-reflective light-scattering bodies will soon be seen to have yet another, related, use in another, major, embodiment of the present invention yet to be discussed. Although the light-scattering bodies serve to scatter light, and to increase isotropy, in all applications, when the use of these bodies in various further embodiments of the invention is later considered and compared, it will be useful to then think about precisely just what light(s) the bodies are primarily serving to scatter, and not only that the bodies serve to scatter light.

4.2 Illuminator Elements With Chromophores, Particularly Pigments, Accompanied by Scattering Bodies Chromophores also include chemical groups having the aspect of a colored object, defined as an object describable in terms of hue, lightness and saturation. Those embodiments of illuminator elements in accordance with the present invention employing chromophores of this type—namely one or more colored chemicals, or pigments, that absorb some, and that reflect some, of light received from an external source of light—also incorporate scattering bodies.

Each colored chemical, or pigment, assumes, by the well known principles of color, the color(s) of only that frequency (those frequencies) of light that it serves to reflect. Just as with the tailoring of the emission spectrum or spectra of the luminescent chromophores (predominantly fluorescent fluorophores), the absorption spectrum, or spectra, of the colored chemical(s) or pigment(s) may also be tailored to a microscopy task at hand. A colored chemical may be chosen so as to absorb light of a predetermined optical spectrum, the transmitted light spectrum having a peak substantially at but a single color. Alternatively, several colored chemicals may chosen so as to absorb light at an associated number of different optical spectrums, with a composite transmitted light spectra being formed by a combination of all the plurality of spectrums. This composite spectra is commonly a pseudo-white light. Note that this spectrally superior light may be obtained, just as with the emitted fluorescent light, by illumination of the light source with a common broad-spectrum light source that is not itself of good spectral quality such as, for example, an incandescent light source. (Such intensity losses, and heating, as are experienced from the non-reflection of certain light frequencies are normally inconsequential.)

It will also be recognized by a practitioner of photochemistry and photochromism that the reflectivity versus frequency, or the color and the color intensity, of pigments can intentionally be controlled so as (i) to produce "soft" light, (ii) to take away, sharpen, or attenuate, some portion or portions of the spectrum (or spectra) of colored light(s) otherwise being produced by fluorophores, and/or (iii) to better accommodate (by selective attenuation) the use of an external primary light source that is not well-suited to the human eye, and that is typically excessively yellow.

The necessary scattering bodies of the illuminator element serve to scatter, diffuse and randomize the light transmitted by the colored chemicals, or pigments. Ultimately, and after multiple reflections, the transmitted light is randomized, and isotropic in nature when and where exiting the surfaces of the illuminator element.

4.3 Illuminator Elements With Light-Scattering Bodies

Finally—and as a major alternative embodiment of the invention to the use of chromophores (of either the color emissive or color reflective types)—an illuminator element of the present invention may consist of a great number of light-scattering bodies contained within a stable matrix.

In this embodiment the light-scattering bodies collectively serve to isotopically scatter light received from the external source thereof onto the specimen at low loss. By this light-scattering action a specimen may be indirectly, isotopically, illuminated by an external source of light that may itself be highly anisotropic. Such anisotropic light is not itself suitable for direct illumination of a specimen.

Just as in their previous application (in combination with chromophores), the light-scattering bodies are made from a material having an index of refraction that differs greatly from the index of refraction of the matrix within which the bodies are contained. The preferred material is titanium dioxide. "Light-scattering bodies" may be more exactingly defined as bodies having an index of refraction that differs from the index of refraction of the material, or matrix (commonly polymer plastic or glass) within which the bodies are contained. Titanium dioxide has, for example, an index of refraction more than twice that of glass (i.e., <x2).

4.4 Brightfield and Darkfield Illuminator Elements

Those embodiments of the present invention wherein the illuminator element contains fluorophores (and potentially also light-scattering bodies) may, and typically do, produce a substantially spatially uniform illumination (i.e., illumination without intensity variation detectable to the eye during microscopic observation), and, more particularly, produce a substantially uniform isotropic light illumination. The illumination so produced is substantially uniform even if the illuminator element is itself illuminated from, and by, a primary source of light that is disposed in some particular direction from the illuminator element, and that subtends but a few degrees of arc relative to the illuminator element. The fluorescent illuminator element so functions because of its many internal absorptions of light from the primary source, and because of the random directions in which the fluorescent light is emitted. Such a substantially uniform light output is called, as is the conventional terminology for condenser-based illumination, a "brightfield" illumination.

However, a fluorescent illuminator element in accordance with the present invention may also, and alternatively, be intentionally configured so as to provide "darkfield" illumination. In darkfield illumination relatively more light is produced at the periphery of the element—normally at an outer annulus of a cylindrically-shaped illuminator element—than is produced in a central region of the element—normally at a circular central region of the cylindrically-shaped illuminator element.

The fluorescent illuminator element so configured to produce darkfield illumination is loaded with fluorophores in a higher concentration than is the case for the brightfield illuminator element. The high-concentration of fluorophores establishes a very high optical density, resulting in a self-quenching of the emitted fluorescence. This self-quenching occurs more significantly towards the center of a cylindrically, or disk, shaped illuminator element, and less significantly towards the periphery of the same element. The emitted light—while still substantially isotropic in nature from all regions of the illuminator element—is more intense (brighter) at a progressively higher distances radially outward from the central axis of the cylindrical illuminator element. The illumination thus produced is a direct counterpart of the darkfield illumination previously produced only by use of several separate pieces of equipment.

5. Spectrally-Engineered Light

By this point it may be recognized that the illuminator elements of the present invention may contain any of (i) chromophores, whether fluorophores or pigments, and (ii) light-scattering bodies. To recapitulate, chromophores useable as the light source of the present invention may either color emissive—i.e., luminescent chromophores and principally fluorescent fluorophores—or color absorptive—i.e., pigments. The light-scattering bodies useable as the light-emitting elements of the present invention, on the other hand, essentially serve to scatter light of all frequencies, and have no intrinsic color themselves. They are "white".

One easy way to think about this dichotomy, and this hierarchy, of terms and of materials is to consider the light output of the illuminator element of the present invention. The spectrum (spectra) of this light output can either be "engineered" internally (by use of chromophores of either type), or, alternatively, the illuminator element can simply serve to make isotropic (by multiple scattering) that light which it receives from a primary external source. In the later case the frequency or frequencies of the illuminating light are substantially determined by the external source, and not by the illuminator element itself. In either case, it is clear that the illuminator element of the present invention is a "source" of randomized distributed isotropic light (although not invariably a self-energized, intrinsic, source).

By adjustment of the numbers and types of chromophores, particularly fluorophores, and also of the light-scattering bodies that are permissively within the illuminator elements, it is possible to make illuminator elements of different colors or of multi-colors, and of differing specific brightness (i.e., luminosity) when equivalently excited (by an external primary radiation source). Either part of this capacity of the illuminator elements of the present invention is called "spectrally-engineered light". Microscopists have traditionally paid much attention to (i) the staining of specimens, and (ii) the filtering of the light by which the specimens are observed, in order that the contrast, and the resolution (at narrow bandwidth), of microscopic observations and/or photomicrography may be improved. The present invention now permits that attention may be paid to the illumination spectrum (spectra) of the illuminator elements for the same purposes.

6. Use and Utility of the Illuminator Elements

An illuminator element of the present invention is not only a source of isotropic light, its close placement to the specimen serves to substantially isotopically illuminate the specimen over at least the area of observation, and normally over the entire specimen. Thus the illumination is not only isotropic—meaning that it proceeds from no preferred direction or directions, and instead proceeds equally from all directions in common—at the face of the illuminator element where it is produced, but is substantially isotropic upon the surface of the specimen where the illumination is used.

A illuminator element commonly has at least one flat face, which face is more commonly made optically flat. This flat face is commonly placed proximately to or, more commonly upon and in direct contact with, either a specimen, a microscope slide, or a coverslip. The specimen, commonly mounted upon a microscope slide, is also commonly flat (to the limits of being sectioned, if a sectioned specimen). Although two relatively flat surfaces are most commonly placed into direct contact, it should be understood that neither (i) flatness nor (ii) contact is required. It is sufficient simply that the illuminator element and its light-emitting surfaces, howsoever they be contoured, should be located sufficiently closely to the specimen so that at least the area of the specimen to be microscopically observed is nearly completely bathed in substantially isotropic light over a considerable solid angle that is preferably nearly two pi ($2\pi$) steradians (i.e., the solid angle subtended by a hemisphere at the centroid of a sphere).

The isotropic illumination from the illuminator element bathes the specimen in light from all directions of nearly an entire imaginary hemisphere, thus (i) illuminating the specimen without shadows, (ii) reducing glare from the microscope optics, (iii) eliminating projection of out-of-focus elements onto the image plane, and (iv) completely filling the objective lens of the microscope with a homogeneously bright field. This specimen illumination directly fulfills many of the requirements, and is analogous to satisfying certain remaining requirements, of Koehler illumination. It is not precise to say that the illumination provided by the illuminator element of the present invention is precisely Koehler illumination because Koehler dealt with the requirements of the different, traditional, illumination of a specimen by use of condensers.

However, an appreciation of the utility of the present invention may be gained when it is realized that the quality of microscopic images obtainable with illuminator elements of the present invention—all of which are commonly producible in quantity for only a few dollars each—may be favorably compared to the best images obtainable from entire sets of the best available condensers costing in the range of $1,000–$5,000 U.S. each condenser. Images produced both by condensers, and by use of illuminator elements of the present invention, are shown within certain drawings figures, derived from (color) photographs, of this specification. The quality of the magnified images realizable with any of the several different embodiments of illuminator elements in accordance with the present invention will be found to be, if inferior to the best condensers at all, only but very slightly so.

Moreover, it will be appreciated that there is no great skill or labor involved in simply placing the illuminator element of the present invention proximate to the specimen.

Moreover, it will be recalled that each illuminator element in accordance with the present invention produces a precisely predetermined light spectrum or spectra by which a specimen may be observed. The typically yellowish light of even a high-quality quartz-halogen microscope illuminator, or even the considerably worse and spectrally impure light of a common incandescent light bulb, may both be readily transformed by an appropriate illuminator element of the present invention into virtually any desired color or colors of light. This is called "spectrally-engineered light" in the present invention. Spectrally-engineered light can be extremely useful for resolution of a feature or features of the specimen under observation. An external light source may be in particular transformed into synthesized pseudo-white lights that are superbly matched to any of the human eye, video camera tubes, charge-coupled devices, or photographic film.

Moreover, it will be recalled that illuminator elements in accordance with the present invention can produce either brightfield or darkfield illumination.

7. Variations of the Illuminator elements

Illuminator elements in accordance with the present invention —based upon light-manipulating chemicals contained within a stable matrix—are commonly used to channel and transform light from an external light source. These illuminators devices can, however, use internal chemiluminescent or radioluminescent light sources.

Extending on the concept of an illuminator element that internally produces, and not merely transforms, light, an illuminator element may be constructed in the form of a more complex, non-unitary, element. Such an illuminator is commonly externally powered, normally by electricity, to produce the isotropic light alone and by itself. For example, an illuminator element could be based on an electrofluorescent light source—commonly an electrically or magnetically excited fluorescent light, or sheet light, or other electrically or magnetically powered source of isotropic light—that is placed so close to the specimen so as to bathe it in isotropic light.

Accordingly, it should be realized that, once the immense utility to microscopy of the (substantially) isotropic specimen illumination taught by the present invention is recognized, there are a great number of diverse ways to produce such illumination. All natures and types of sources of isotropic light are therefore within the scope of the present invention.

Moreover, isotropic illumination of a specimen at electromagnetic frequencies other than those of light radiation may sometimes be desirable, possible and appropriate for microscopes performing observations at, and in, these other electromagnetic frequencies. Accordingly, the present invention should be broadly perceived as a new approach to specimen illumination during (all types of) microscopy; namely to illuminate the specimen isotopically over nearly a hemisphere as opposed to directionally on-axis, and by a universal illuminator element as opposed to the use of a condenser matched to the numerical aperture of the microscope's objective lens.

These and other aspects and attributes of the present invention will become increasingly clear upon reference to the following drawings and accompanying specification.

BRIEF DESCRIPTION OF THE DRAWINGS

FIG. 1 is a diagram showing the cone of illumination of a prior art microscope where the substage condenser and the diaphragm are properly adjusted so that the cone of illumination completely fills the aperture of the microscope objective.

Figure 2:
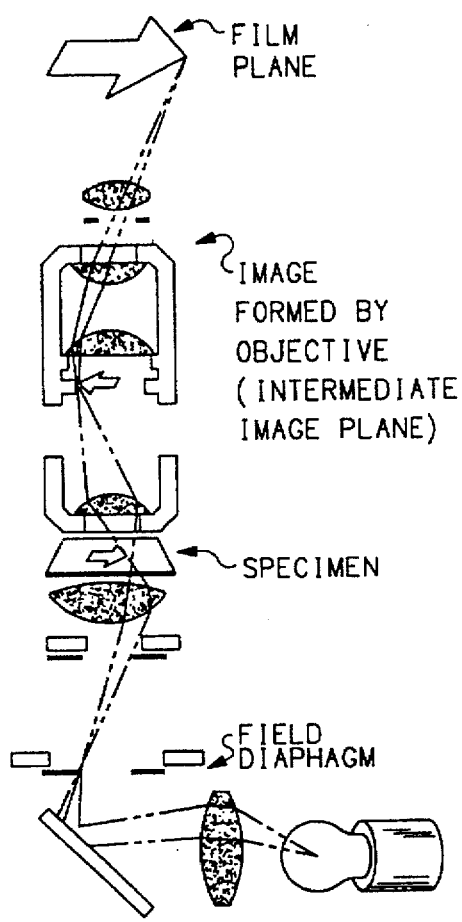

FIG. 2 is a diagram showing image-forming ray paths that are traced from ends of lamp filament of a prior art microscope where conjugate foci are at the field diaphragm, specimen plane, intermediate image plane (entrance pupil of eyepiece) and, with a camera in place, the film plane.

FIG. 3, consisting of FIGS. 3a through 3c, shows prior art condensers respectively of the abbe, aplanatic and aplanatic achromatic types.

FIG. 4, consisting of FIGS. 4a through 4c, shows the cones of light respectively transmitted by the prior are abbe, aplanatic and aplanatic achromatic condensers previously seen in FIGS. 3a through 3c.

FIG. 5 shows a prior art optical train adjusted for Koehler illumination, particularly illustrating the conjugate aperture planes, $S_1$–$S_4$.

FIG. 6 shows the prior art optical train previously seen in FIG. 5 adjusted for Koehler illumination, particularly illustrating the conjugate field planes $I_1$–$I_2$.

FIG. 7a is diagram of brightfield microscopy where central light passes though, around and/or surrounds the specimen under microscopic observation.

FIG. 7b is diagram of darkfield microscopy where central light is blocked and where only oblique rays strike the specimen under microscopic observation.

FIG. 7c is a ray trace diagram of darkfield illumination showing that, when all un-deviated rays of the zero'th order have been blocked, oblique rays, now diffracted by the specimen, proceed on to the image plane and form an image of the specimen.

FIG. 8 is an optical schematic diagram of a prior art transmission microscope using (i) a condenser and (ii) a light source.

Figure 9:
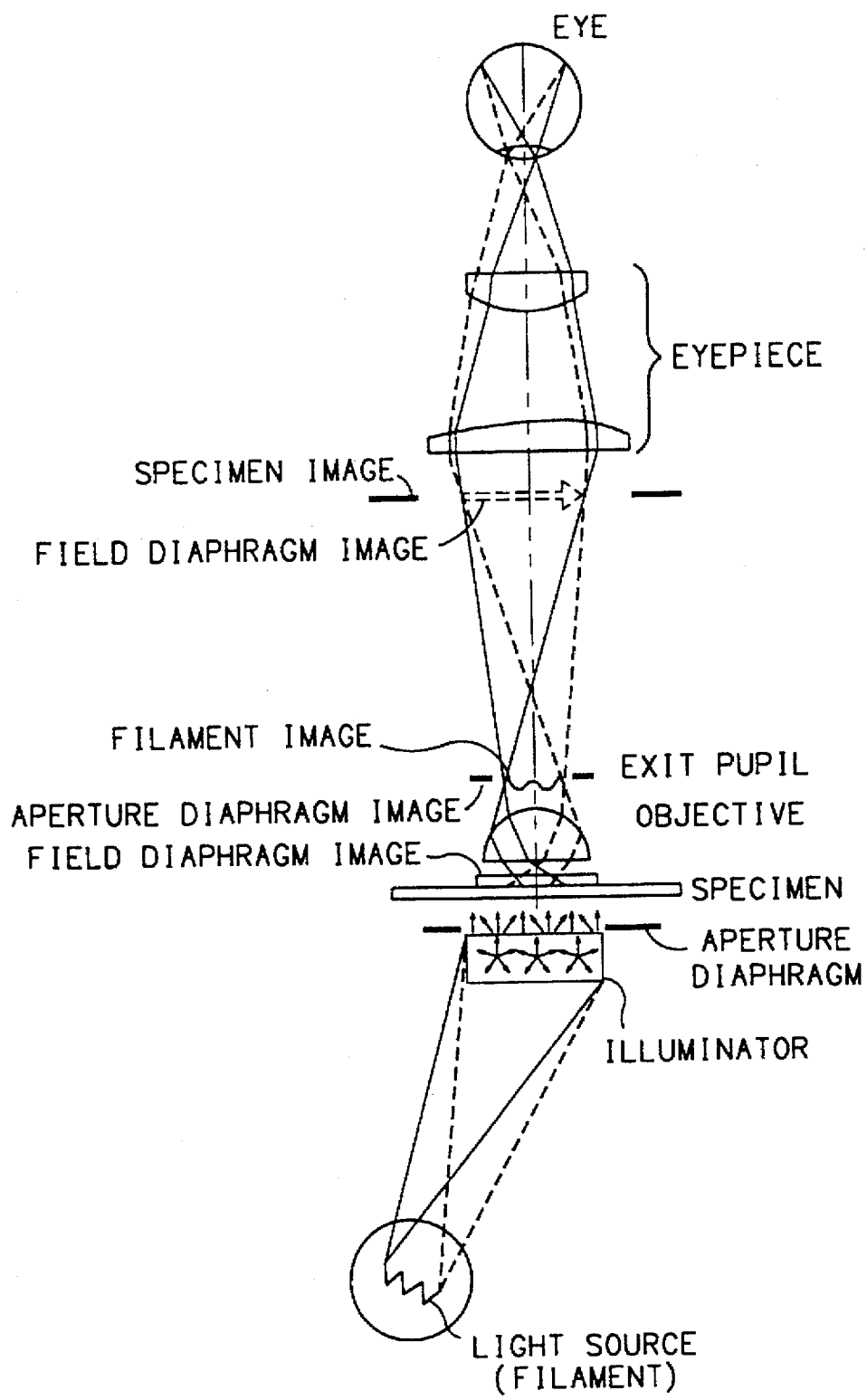

FIG. 9 is an optical schematic diagram of the transmission microscope, including the light source, previously seen in FIG. 8 now in use with an illuminator element of the present invention; the condenser previously seen in FIG. 8 now being completely eliminated.

Figures 10, 11:
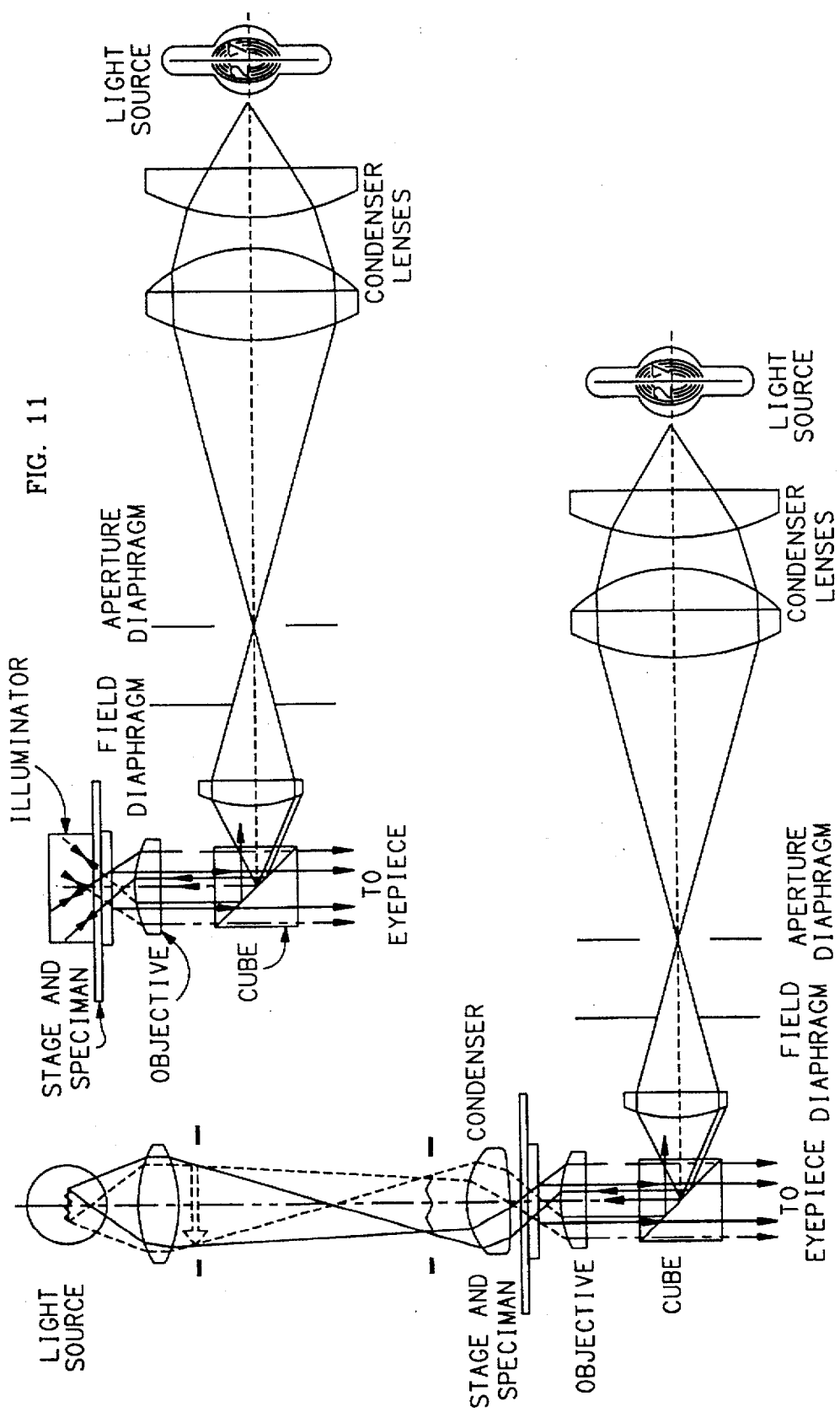

FIG. 10 is an optical schematic diagram of a prior art epi-fluorescent microscope using (i) two condensers and (ii) a light source.

FIG. 11 is an optical schematic diagram of the epi-fluorescent microscope, including the light source, previously seen in FIG. 10 now in use with an illuminator element of the present invention; one condenser previously seen in FIG. 10 now being completely eliminated.

Figure 12A:
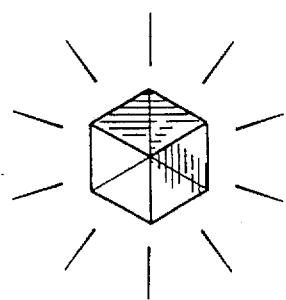
Figure 12B:
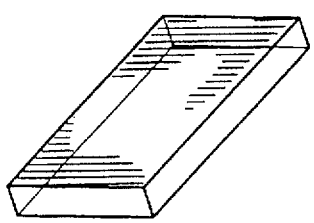
Figure 12C:
Figure 12D:
Figure 12E:
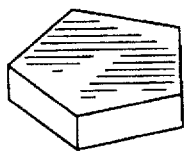
Figure 12F:
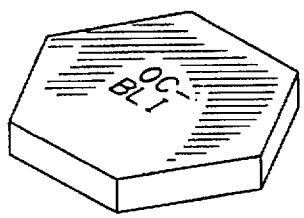
Figure 12G:
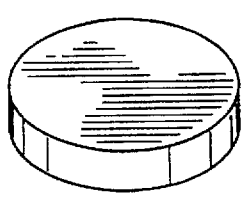
Figure 12H:
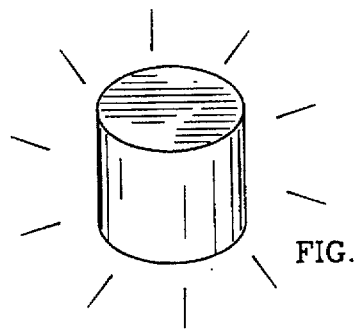
Figure 12I:
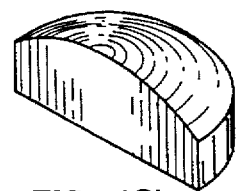
Figure 12J:
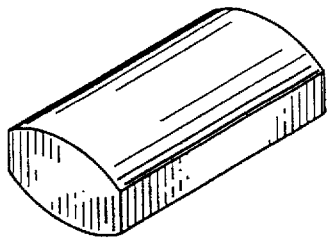
Figure 12K:
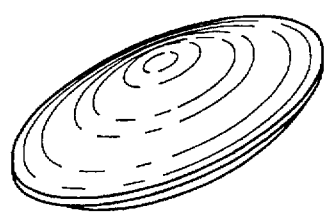
Figure 12L:
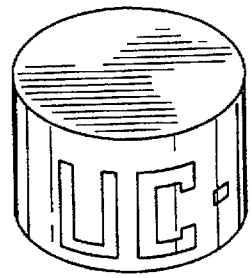
Figure 12M:
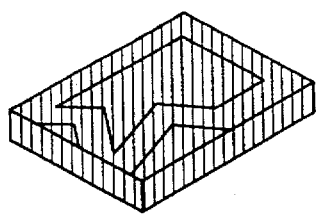
Figure 12N:
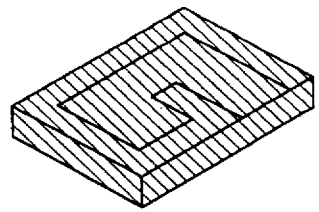
Figure 12O:
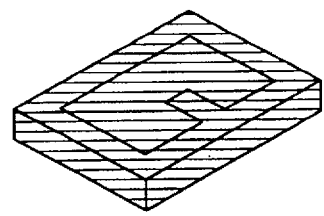

FIG. 12, consisting of FIGS. 12a through 12o, are diagrammatic representations, shown at approximately twice real scale, of various shapes and forms of illuminator elements in accordance with the present invention.

Figure 13A:
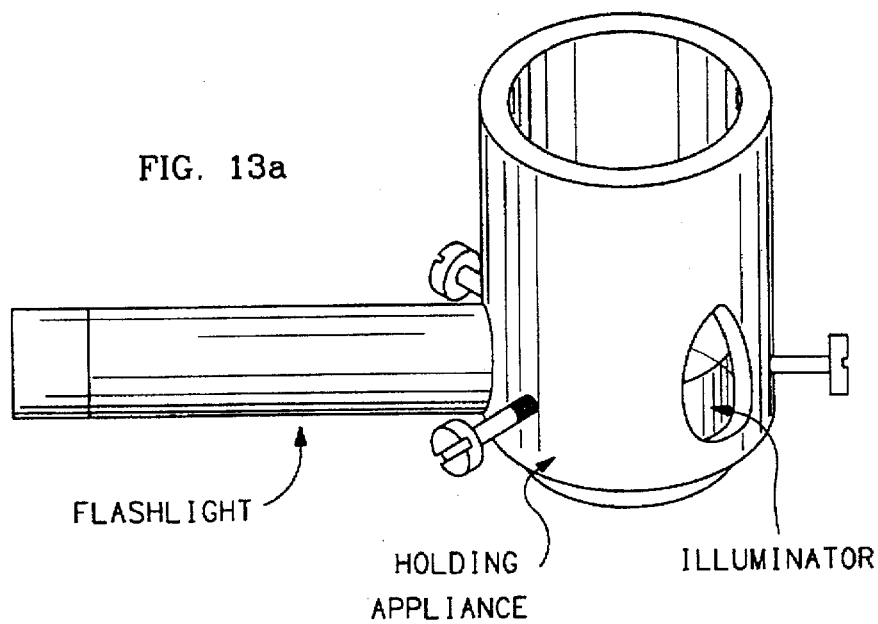
Figure 13B:
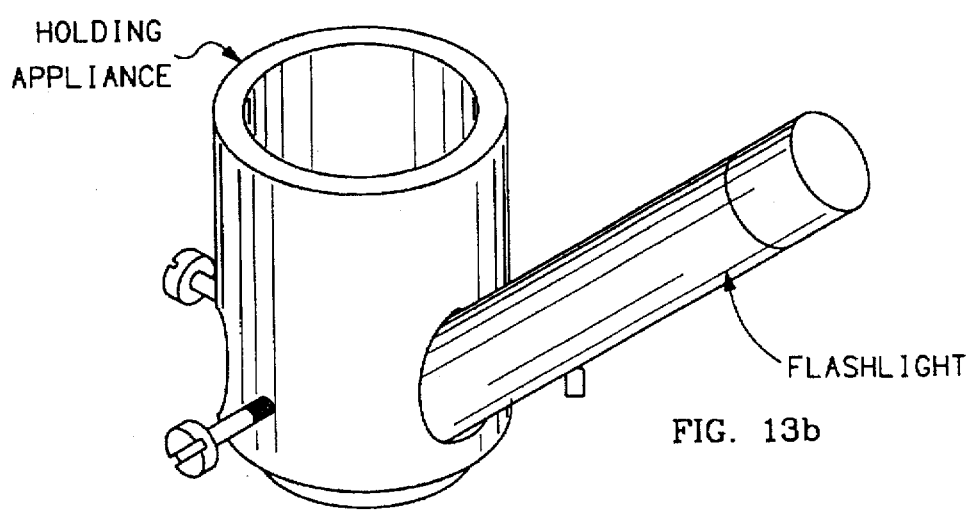

FIG. 13, consisting of FIG. 13a and FIG. 13b, are diagrams of a fluorescent illuminator element of the present invention having the substantial form of FIG. 12h held within two different variants of an appliance that also holds a primary source of light, particularly in the form of a pen light, that serves to excite the fluorescence of the illuminator element.

Figure 14:
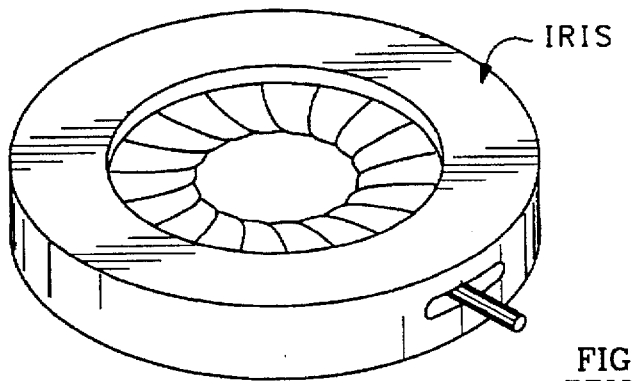

FIG. 14 is a diagram of a prior art microscope iris that is usefully employed in combination with an illuminator element of the present invention, including but not limited to that particular fluorescent illuminator element which is held within that particular appliance that is shown in FIG. 13b.

Figure 15:
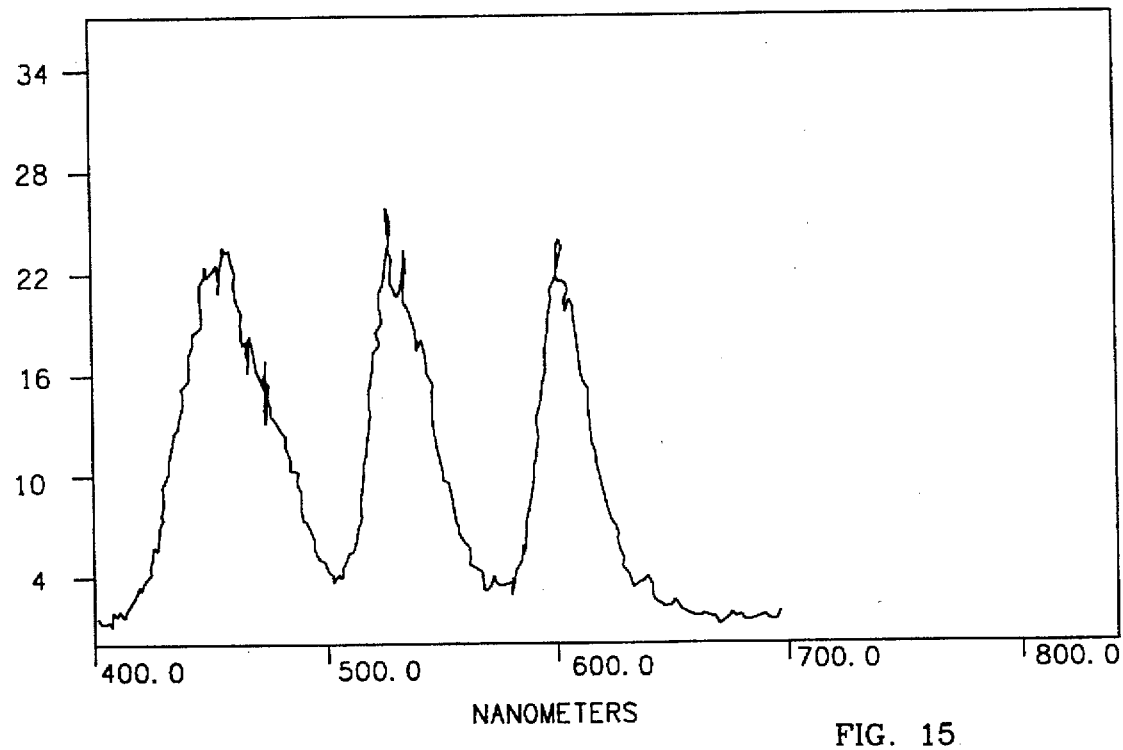

FIG. 15 is a graph showing an exemplary fluorescent spectra of pseudo-white light produced by three particular fluorophores that are used in an exemplary illuminator element in accordance with the present invention.

Figure 16A:
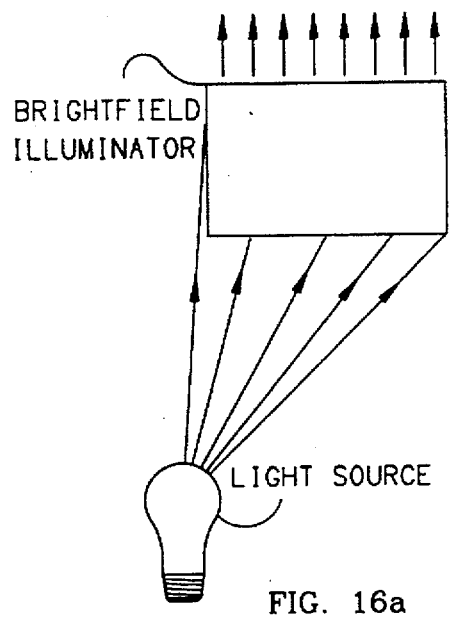

FIG. 16a is a diagrammatic representation of a brightfield illuminator element in accordance with the present invention, the brightfield illuminator element producing a relatively even magnitude of illumination at its top surface, which surface is positionally disposed towards the specimen under observation.

Figure 16B:
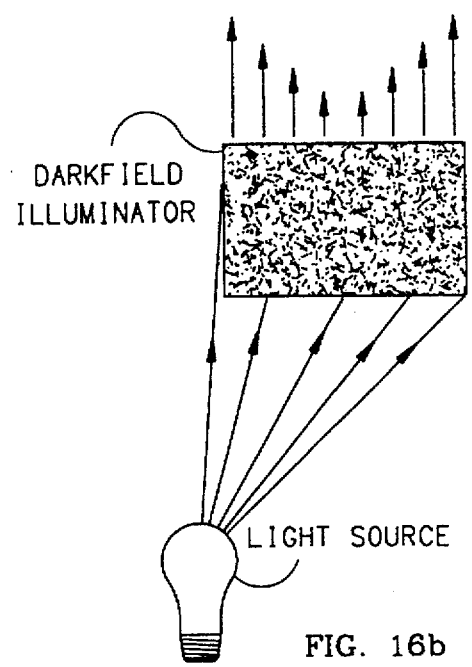

FIG. 16b is a diagrammatic representation of a darkfield illuminator element in accordance with the present invention, the darkfield illuminator element producing a relatively more intense illumination at the peripheral, as opposed to the central, regions of its top surface, which top surface is positionally disposed towards the specimen under observation.

FIG. 17, consisting of FIG. 17a through FIG. 17c, is a table of fluorophores, also called fluorochrome chemicals, that are generally suitable for use in construction of illuminator elements in accordance with the present invention.

FIG. 18a is a table of the parameters of the creation of those color photomicrographs that are shown (printed, in grey tone) in drawings FIGS. 20–25.

FIG. 18b is a table of the parameters of construction of the particular illuminator elements used to produce those color photomicrographs that are shown (printed, in grey tone) in drawings FIGS. 20–25.

FIG. 19 is a table of the color descriptions of the color photomicrographs of FIGS. 20–25, which color photomicrographs are shown only in grey tone by process of printing within the issued patent; certain of the colors within those ones of the color photomicrographs that are produced by illuminator elements in accordance with the present invention spectrographically showing and possessing (i) pure hues of the type associated with primary colors, (ii) lightness and brightness, and (iii) full color saturation; certain of the colors within those ones of the color photomicrographs that are produced by illuminator elements in accordance with the present invention subjectively appearing vivid and vibrant.

FIG. 20a is a color photomicrograph, printed in a grey tone rendition within the issued patent, obtained with the prior art microscope and condenser pair previously seen in FIG. 8; the photomicrograph showing an exemplary specimen consisting of a non-stained cross-section of a young mouse mounted upon a microscope slide.

FIG. 20b is a color photomicrograph, printed in a grey tone rendition within the issued patent, obtained with an embodiment of an illuminator element in accordance with the present invention containing light-scattering bodies, and by use in the manner of FIG. 9 of both the same transmission microscope and the same specimen previously used to produce FIG. 20a, the FIG. 20b intentionally being caused to be of a strikingly different color than FIG. 20a (reference the table of FIG. 18b) while still comparing highly favorably in image quality.

FIG. 20c is a color photomicrograph, printed in a grey tone rendition within the issued patent, obtained with a darkfield fluorescent embodiment of an illuminator element in accordance with the present invention, and by use in the manner FIG. 9 of both the same transmission microscope and the same specimen previously used to produce FIGS. 20a and 20b, the FIG. 20c intentionally being caused to be of a different coloration than either FIG. 20a or FIG. 20b (reference the table of FIG. 19) while still comparing highly favorably in image quality.

FIG. 21a is a color photomicrograph, printed in a grey tone rendition within the issued patent, obtained with the prior art microscope and condenser previously seen in FIG. 8; the photomicrograph showing an exemplary specimen consisting of colored diatoms mounted upon a microscope slide.

FIG. 21b is a color photomicrograph, printed in a grey tone rendition within the issued patent, obtained with a "white" light fluorescent embodiment of an illuminator element in accordance with the present invention by use in the manner of FIG. 11 with an epi-illumination microscope and with the same specimen previously used to produce FIG. 21a, the FIG. 21b intentionally being of a similar colors to FIG. 21a (reference the table of FIG. 19) while comparing highly favorably in image quality.

FIG. 21c is a color photomicrograph, printed in a grey tone rendition within the issued patent, obtained with a "green" light fluorescent embodiment of an illuminator element in accordance with the present invention by use in the manner of FIG. 11 of the same epi-illumination microscope that was previously used to produce FIG. 21b, and with the same specimen that was previously used to produce FIGS. 21a and 21b, the FIG. 21c now highly visually discriminating certain diatoms colored green (reference the table of FIG. 19) while maintaining a highly favorable overall comparison in image quality.

FIG. 22a is a color photomicrograph, printed in a grey tone rendition within the issued patent, obtained with the prior art transmission microscope and condenser previously seen in FIG. 8; the photomicrograph showing an exemplary specimen consisting of PTK muotic stained cells mounted upon a microscope slide.

FIG. 22b is a color photomicrograph, printed in a grey tone rendition within the issued patent, obtained with an embodiment of an illuminator element containing both light-scattering bodies and fluorophores in use in the manner of FIG. 9 with the same transmission microscope, and with the same specimen, that were previously used to produce FIG. 22a, the FIG. 22b intentionally being of a strikingly different color than FIG. 22a (reference the table of FIG. 19) while comparing highly favorably in image quality.

Figure 23A:

FIG. 23a is a color photomicrograph, printed in a grey tone rendition within the issued patent, obtained with the prior art transmission microscope and condenser previously seen in FIG. 8; the photomicrograph showing an exemplary specimen consisting of a stained plastic section mounted upon a microscope slide.

Figure 23B:

FIG. 23b is a color photomicrograph, printed in a grey tone rendition within the issued patent, obtained with the same prior art transmission microscope and condenser previously used to produce the photomicrograph of FIG. 23a; the photomicrograph showing the same exemplary specimen of a stained plastic section mounted upon a microscope slide that was previously shown in FIG. 23a, the principle difference in photomicrographs between FIG. 23a and FIG. 23b being the numerical aperture of the condenser (reference FIG. 18a).

Figure 23C:

FIG. 23c is a color photomicrograph, printed in a grey tone rendition within the issued patent, obtained with an embodiment of an illuminator element in accordance with the present invention containing light-scattering bodies by use in the manner of FIG. 9 of the same transmission microscope, and of the same specimen, previously used to produce FIGS. 23a and 23b, the FIG. 22c intentionally being of a strikingly different color than FIGS. 23a and 23b (reference the table of FIG. 19) while comparing highly favorably in image quality.

Figure 24A:
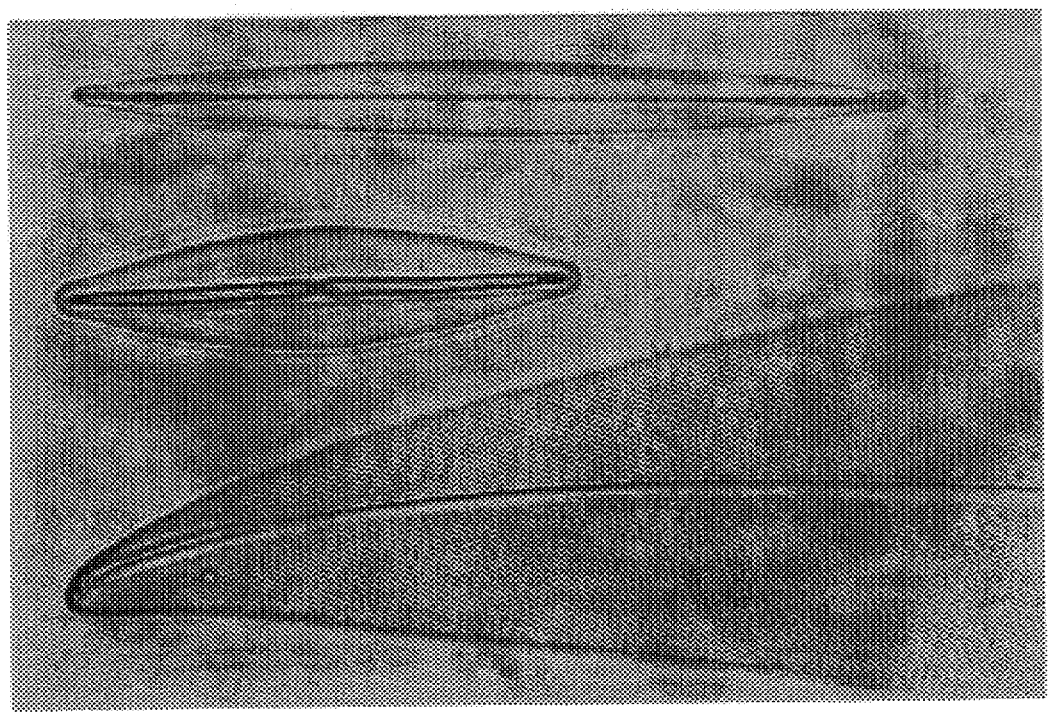

FIG. 24a is a color photomicrograph, printed in a grey tone rendition within the issued patent, obtained with the prior art transmission microscope and condenser previously seen in FIG. 8; the photomicrograph showing the exemplary specimen of a standard diatom mounted upon a microscope slide.

FIG. 24b is a color photomicrograph, printed in a grey tone rendition within the issued patent, obtained with an embodiment of the illuminator element of the present invention containing both light-scattering bodies and fluorophores by use in the manner of FIG. 9 of the same transmission microscope, and also of the same specimen, previously used to produce FIG. 24a; the FIG. 24b now highly discriminating the standard diatom (reference the table of FIG. 19) while comparing highly favorably in overall image quality.

FIG. 25a is a color photomicrograph, printed in a grey tone rendition within the issued patent, obtained with the prior art transmission microscope and condenser previously seen in FIG. 8; the photomicrograph showing the exemplary specimen of a stained plastic section mounted upon a microscope slide.

FIG. 25b is a color photomicrograph, printed in a grey tone rendition within the issued patent, obtained with the same prior art transmission microscope and condenser previously used to produce the photomicrograph of FIG. 25a and showing the same exemplary specimen of a stained plastic section mounted upon a microscope slide previously shown in FIG. 25a, the principle difference in photomicrographs between FIGS. 25a and 25b being that the cover slip is now dirty, which dirt contamination is visible as horizontal streaks.

FIG. 25c is a color photomicrograph, printed in a grey tone rendition within the issued patent, obtained with an embodiment of an illuminator element in accordance with the present invention containing light-scattering bodies by use in the manner of FIG. 9 of the same transmission microscope, and of the same specimen, previously used to produce FIGS. 25a and 25b, and also by use of the same dirty cover slip used to produce FIG. 25b; the FIG. 25c showing the narrow depth of field of an image which is obtainable by use of an illuminator element of the present invention, which image is superior in avoiding spurious diffracted light occurring from, inter alia, dirty cover slips.

Figure 26:
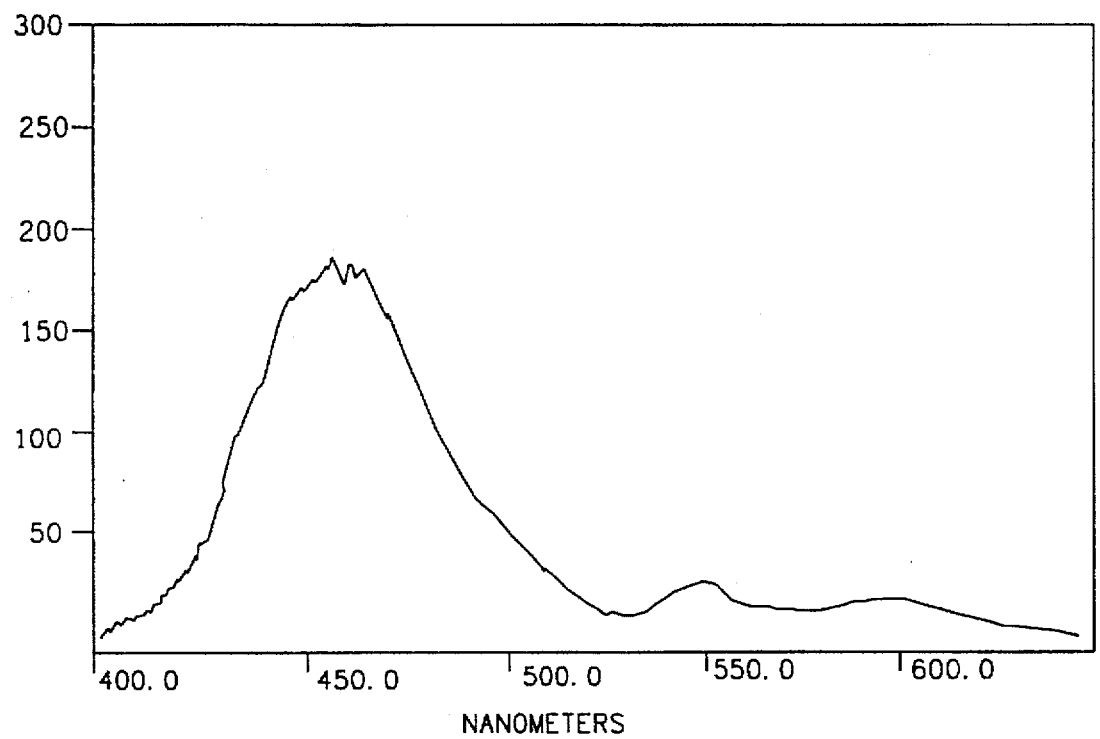

FIG. 26 is a graph showing an exemplary emission spectrum of a preferred polymer used in construction of illuminator elements in accordance with the present invention.

Figure 27:
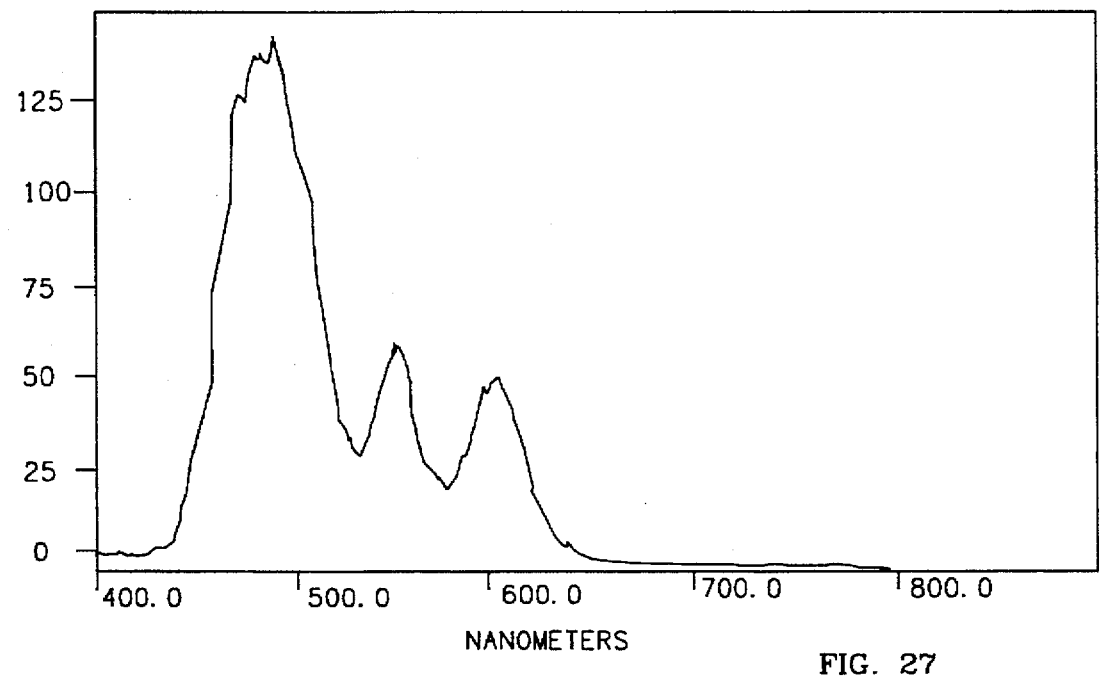

FIG. 27 is a graph showing an exemplary spectrum of emission of a liquid plastic, before polymerization, used in construction of illuminator elements in accordance with the present invention.

Figure 28:
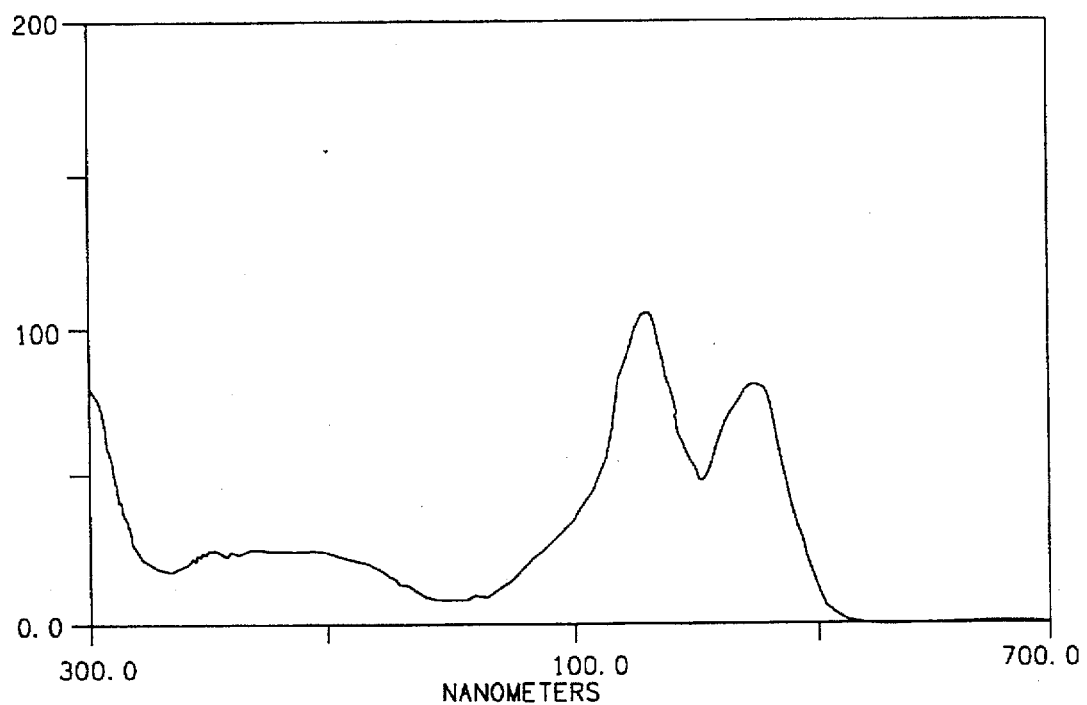

FIG. 28 is a graph showing an exemplary spectrum of emission of a particular brightfield illuminator element containing three fluorophores, which illuminator element is exemplary of those brightfield illuminator elements in accordance with the present invention that produce multiple colored lights.

Figure 29:
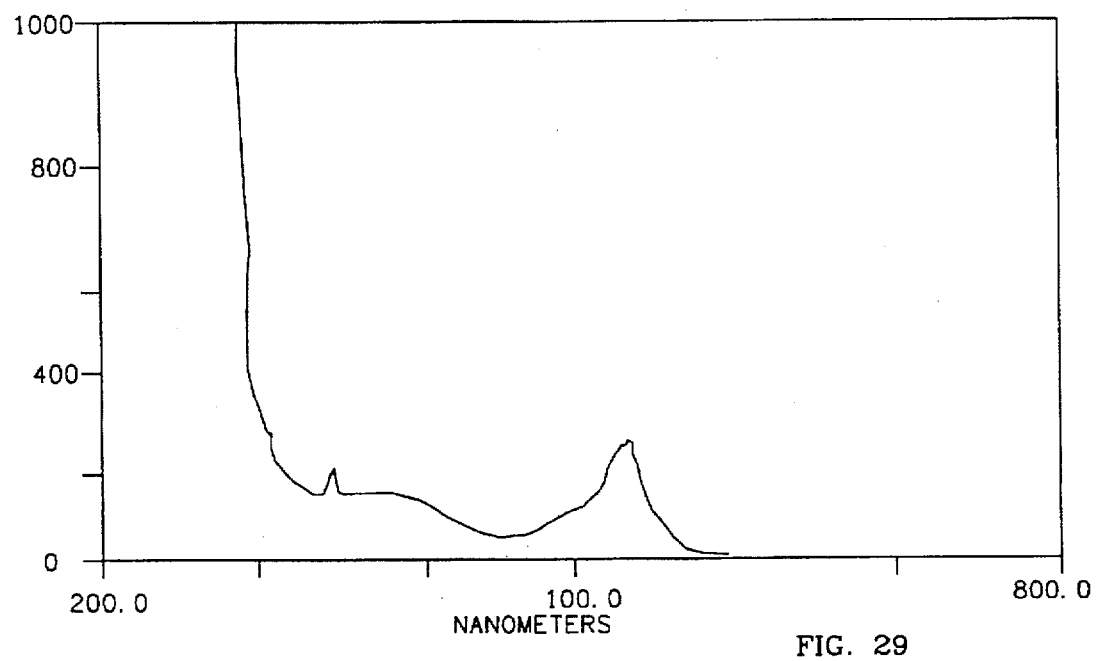

FIG. 29 is a graph showing an exemplary spectrum of emission of a particular darkfield illuminator element containing three fluorophores and light-scattering bodies, which illuminator element is exemplary of those darkfield illuminator elements in accordance with the present invention that produce multiple colored lights.

DESCRIPTION OF THE PREFERRED EMBODIMENT

1. Principles of Prior Art Illumination Relative to The Illuminator Elements of the Present Invention As discussed in the subsection 2.1 General Background, of the section 2. Description of the Prior Art, of the BACKGROUND OF THE INVENTION portion of this specification, the cone of illumination of a prior art microscope is diagrammatically shown in FIG. 1. Both a substage condenser and a diaphragm are properly adjusted so that the cone of illumination completely fills the aperture of the microscope objective. Similarly, FIG. 2 is a diagram more completely showing the image-forming ray paths that are traced from ends of lamp filament of a prior art microscope. Conjugate foci are the field diaphragm, specimen plane, intermediate image plane (entrance pupil of eyepiece) and, with the camera in place, the film plane.

Also as discussed in the subsection 2.1 General Background, of the section 2. Description of the Prior Art, of the BACKGROUND OF THE INVENTION portion of this specification, prior art condensers of the abbe, aplanatic and aplanatic achromatic types are respectively shown in FIGS. 3a through 3c. The cones of light transmitted by the prior art abbe, aplanatic and aplanatic achromatic condensers seen in FIGS. 3a through 3c are respectively shown in FIGS. 4a through 4c.

As discussed in the sub-subsection 2.2.2 Principles of Koehler Illumination, of subsection 2.2 Detail Background, of section 2. Description of the Prior Art, of the BACKGROUND OF THE INVENTION portion of this specification, the various lenses of a prior art microscope are arranged as shown in FIGS. 5 and 6 for Koehler illumination. These lenses are focused as follows.

First, the collector lens ($L_s$) focuses an image of the light source onto the condenser iris diaphragm ($D_c$). Second, the condenser lens ($L_c$) focuses an image of the field diaphragm ($D_s$) in the plane of the specimen. Third, the objective lens, the ocular, and the refractive elements of the eye (or camera) together focus an image of the specimen onto the retina of the observer's eye (or the camera image plane).

These adjustments give rise to the two sets of optical paths and the image planes represented in FIGS. 5 and 6. Together, the two sets of optical paths and the image planes characterize Koehler illumination. A still more detailed discussion of each set of optical paths and image planes is discussed in the above-mentioned sub-subsection 2.2.2 Principles of Koehler Illumination.

Likewise, brightfield and darkfield illumination by use of condensers is well understood. A ray trace diagram of prior art brightfield microscopy where central light passes though, around and/or surrounds the specimen under microscopic observation is shown on FIG. 7b. A ray trace diagram of darkfield microscopy where central light is blocked and where only oblique rays strike the specimen under microscopic observation is shown in FIG. 7b. Finally, a ray trace diagram of darkfield illumination showing that when all a un-deviated rays of the zero'th order have been blocked then oblique rays, now diffracted by the specimen proceed on to the image plane and form an image of the specimen, is shown in FIG. 7c.

A ray trace diagram of a prior art transmission microscope in use for observing a specimen is shown in FIG. 8, and an equivalent ray trace diagram for a prior art epi-fluorescent microscope is shown in FIG. 10. The diagrams of FIGS. 8 and 10 are particularly intended to be juxtaposed relative to, and compared with, the respectively corresponding ray trace diagrams of FIGS. 9 and 11 showing illuminator elements in accordance with the present invention in operational use.

The present invention, replacing as it does the condenser of a microscope, will be seen to derive the essential optical characteristics of Koehler illumination, and of brightfield and darkfield illumination, without the expense, or difficulty, of adjusting condensers to realize the optical paths variously shown in FIGS. 1–8 and 10.

2. Function and Usage of Illuminator Elements in Accordance With the Present Invention An illuminator element in accordance with the present invention is made from (i) spatially distributed light sources carried in or upon, and normally within, (ii) a stable matrix that is suitably sized and shaped so as to suitably be positioned closely proximate a specimen under observation.

2.1 Isotropic Illumination

The matrix, and its typically contained spatially distributed light sources, must be sized and shaped so as to suitably be positioned closely proximate to the specimen under observation. Only in this manner may the specimen be substantially isotopically illuminated by the light source. The positional relationship between the specimen, the isotropic light source (the illuminator element in accordance with the present invention) and the objective lens of the microscope is this: the specimen is situated between the isotropic light source (the illuminator element) and the objective lens. An illuminator elements in accordance with the present invention so positioned is shown in each of FIGS. 9 and 11, where it is identified simply as an "ILLUMINATOR".

The "substantial isotropic illumination" of the specimen is normally accomplished by placing the illuminator element in direct contact with the specimen, or at least in contact with a microscope slide on which the specimen is mounted (normally at the side towards the objective lens of the microscope and spaced apart from the illuminator element, but permissively on the opposite side). The illuminator element may, however, stand off a bit from the specimen, normally by only a fraction of a millimeter, if so desired. This slight distance of separation may serve, for example, to reduce contact contamination between the microscope slide (or the specimen itself) and the illuminator element.

However, image quality degrades with increasing separation between the specimen and the illuminator element. Conversely, image quality, and particularly resolution, improves with the proximity of the specimen to the illuminator element. This relationship is due to the fact that the intensity, angle and uniformity of plane-wave illumination from an isotropic light source comprised of spatially distributed emitters of light is optimal closest to the source. In fact, because the source transfer function of an illuminator element in accordance with the present invention is, unlike that of a condenser, independent of frequency, an illuminator element of the present invention can, theoretically, be superior to any prior art light-source-and-condenser in the resolution of small, closely-spaced objects!

As the distance between specimen and source increases the homogeneity, and plane-wave character, of the illuminating light progressively degrades at the plane of the sample. At some increasingly large distance, typically several millimeters, from the specimen, the illuminator element will cease to provide illumination of sufficient quality so as to form a reasonable image. Although mis-adjustment of the positioning of the illuminator element by failing to place it in sufficient proximity to the specimen is unlikely, it is to be noted that such mis-adjustment reveals itself clearly and unambiguously in the observed image, and is neither latent nor poorly detectable as has been the mismatch, or mis-adjustment, of a prior art light-source-and-condenser.

Additionally, and as will be seen from the many permissible physical shapes of the illuminator elements—examples of which are shown in FIG. 12—, an illuminator element typically presents a flat, and more typically an optically flat, surface disposed towards the specimen. However, such surface need neither be flat nor even smooth. Accordingly, it will be recognized that for some shapes of illuminators, and rarely also for some relatively thick specimens, it may be impossible to place a (flat) illuminator element uniformly tight against a (substantially flat) specimen. This separated, or spaced parallel, placement of the illuminator element and specimen does not unduly interfere with the operation of the illuminator element. It will, however, be understood that, in the spirit of the invention, that the "substantial isotropic illumination of the specimen" can only be obtained from an illuminator element—itself an isotropic light emitter—that is positioned closely proximate to the specimen.

Meanwhile, an isotropic light source is, by dictionary definition, one that lacks predetermined axes, presenting equal characteristics along all axes and in all directions. The sun, and a common fluorescent light bulb, are both isotropic light sources. In order for illumination to be isotropic it must come from all directions without distinction or differentiation. Unless contained inside a luminous sphere, only a physically small body can approximate being perfectly isotopically illuminated, and then only by close proximity to an isotropic light source.

A portion of a microscope slide, and all or most of a thin specimen mounted thereon, may be, and is, in accordance with the present invention "substantially", or "approximately", isotopically illuminated. "Substantially isotopically illuminated" as used in this specification means, when referring to the illumination of a specimen, that a specimen (and any microscope slide upon which the specimen may be mounted) are positioned so close to an isotropic light source that no shadow(s) are visible—including upon the sides, or shoulders, of the specimen—when the specimen is viewed through the microscope.

The illuminator element is a source of light extending over four pi ($4\pi$) steradians, or a complete sphere. Because this light source is large and close relative to the specimen region of interest (i.e., the specimen region under microscopic observation), straight lines, or rays, can be traced between the specimen and nearly a full two pi ($2\pi$) steradians, or a complete hemisphere of solid angle, of the illuminator element light source. Due to a typical difference in refractive index between the illuminator element and the specimen (or the microscope Slide, or the cover slip), so much of the of the light illumination from the illuminator element as exceeds the critical angle will not pass out from the illuminator element and into the specimen. This light that is reflected at an internal interface boundary, or surface, of the illuminator element is hypothesized to result in a "pooling" of light in the illuminator element at its surfaces, including at that one of its surfaces that interfaces to the specimen.

This hypothesized operation may contribute to the brightness of the illuminator elements, which brightness is generally eminently satisfactory for microscopy even when the illuminator elements are themselves externally illuminated, as will be seen, with a common pen-light-type flashlight having no great brightness. It should, however, be understood that the "pooling" of light within the illuminator elements is only a hypothesis, and that this and much else of the theory and the ascribed attributes of the present invention—particularly including the apparent production of isotropic light by the illuminator elements and the hypothesized mechanisms therefore—are discussed only so that the invention may be better considered and understood, and not so as to be limiting of Applicants' invention as taught and claimed.

The illumination of a specimen that is obtained by use of an illuminator element in accordance with the present invention is clearly much different, whatsoever the theory behind the generation of this illumination and howsoever this illumination is described, than is the directional light illumination of a specimen within the prior art. The lengthy discussion of isotropic illumination in this sub-section has been necessitated by the limitations of words to describe the exact nature of the illumination transpiring at all points of interest, and in order to make as definitive as is possible the precise type of illumination that is, to the best understanding of the inventors, both produced and used in the conduct of microscopy in accordance with the present invention.

2.1 The Production and Use of Isotropic Illumination During Microscopy

In accordance with the present invention, one, preferred, source of spatially isotropic light is a fluorescent material contained within a matrix. A fluorescent material is, by dictionary definition, capable emitting electromagnetic radiation resulting from and during the absorption of excitation radiation from an external source thereof.

In accordance with the present invention, the fluorescent material is preferably contained in a polymer matrix in the shape of, typically, a small disk, cylinder or cube. The matrix is of size and shape so as to suitably be positioned closely proximate to a specimen—which specimen is normally (but not necessarily) mounted upon a microscope slide—that is to be observed by and through a microscope. So positioned, upon and during absorption of the excitation radiation from the external source by the element's fluorescent material, this fluorescent material illuminates the specimen with emitted electromagnetic radiation in the form of fluorescent light. This fluorescent radiation is isotropic: it is emitted from the fluorescent material everywhere within the element in random directions, and it exits the faces of the element, including through the face opposite the specimen, in a uniform, wide-angle distribution. The fluorescent radiation is suitably intense so as to permit observation of the specimen by, and with, the microscope.

The element is commonly adapted for use with an optical microscope. Because it is positioned closely proximate to the specimen that it serves to illuminate with light, its illumination of the specimen is (i) automatically aligned, and (ii) automatically matched to the numerical aperture of the microscope's objective lens, with (iii) many of the characteristics of Koehler illumination being achieved.

Accordingly, an illuminator in accordance with the present invention completely supplants the condenser of an optical microscope, and completely obviates the labor of adjusting the light source and the condenser of the microscope.

The fluorescent material is preferably in the form of one or more fluorescent dyes each of which has an associated emission spectrum. T(e fluorescent material is more preferably in the form of several different fluorescent dyes. Each dye is responsive to the same radiation from a single external radiation source for emitting light at an associated emission spectrum. The several dyes collectively produce an emission spectra that is preferably of a pseudo-white, "engineered" light.

The fluorescent material is preferably further combined in the matrix with a scattering material that serves to scatter and to disperse the light emitted by the fluorescent dyes.

The matrix is preferably in the form of a polymer plastic or glass body, typically in the shape of a coin or disk, or else an elongate parallelepiped body similar to a microscope slide. At least that surface of the element's body that serves to transmit light onto the adjacent specimen is normally optically polished so that it does not interfere with, nor diminish, the isotropy of the light. This surface is typically the circular face of the coin- or cylinder-shaped body, or a face of a cube or a parallelepiped body. The opposite face is also typically polished for (i) aesthetic symmetry, (ii) to permit visual, non-microscopic, viewing of the specimen completely thorough the body of such elements as are translucent or transparent, and/or (iii) to permit external excitation radiation (should it be delivered into the element through this opposite face and it need not be so delivered even in part through this face) to be, if partially reflected as well as being refracted into the element, so reflected at a determinable regular angle. In other words, in some microscopy and microscopic photography, it is not desired to have extraneous light in the room, for example a laboratory, where the microscope is situated; no matter how irrelevant such light may be to the specimen illumination. The illuminator elements of the present invention are normally of regular shape not because they have to be, but because the optical properties of such regularly shaped elements may be more readily understood and controlled by the user.

The preferred embodiment of an illuminator element in accordance with the present invention for use with an optical microscope is both straightforward of construction and relatively economical, costing only a few United States dollars each, circa 1994. It is accordingly difficult to see, at first blush, how such a compact and inexpensive item could adequately suffice to completely supplant microscope condensers costing hundreds and thousands of dollars.

3. Genesis of the Illuminator Elements in Accordance With the Present Invention

In order to understand how an illuminator element of the present invention has come to do so much so usefully from so little structure, it is useful to consider the genesis of the invention. The present invention did not spring into existence full blown in its present form. Instead, it evolved from an earlier embodiment that was similarly appearing and similarly constructed. The early embodiment of the present invention was designed to be illuminated by radiation, when positioned closely proximate to the specimen, only with light that had already passed in an optical path through the objective of the microscope and through the specimen, impinging only then upon the fluorescent material. This type of light path is characteristic of an epi-fluorescent microscope. (The "fluorescence" that is commonly being referred to in an "epi-fluorescent microscope" is, of course, that of the specimen.) The radiating light was thus converted to fluorescent light by which the specimen was observed.

In this early embodiment of the illuminator the illuminating radiation passed through the objective of the microscope before it was converted by the fluorescent material of the illuminator into the light by which the specimen might be (microscopically) observed. This path served to make that the stimulated fluorescence, or illuminating light, completely filled the aperture of the microscope objective. The optical characteristics of the objective were effectively conferred upon the illuminator element, making both (i) the alignment, and (ii) the matching of the numerical aperture of the objective and the illuminator, automatic! Moreover, Koehler-like conditions (or their equivalent in non-light microscopy) were achieved because the radiation excitation of the illuminator and its light emission were geometrically coincident.

It was only when initial versions of illuminator elements in accordance with the present invention were perfected that successor devices were developed. The successor illuminator elements particularly perfected the fluorescent light emitters, and, preferably, combined such fluorescent materials also with an additional, scattering, material in the matrix, in order to produce electromagnetic radiation, normally light, sufficiently intense so as to permit observation of the specimen by, and with, a common pre-existing microscope. The successor illuminator elements included darkfield and well as brightfield elements (to be explained). Accordingly, it may be understood that the mere juxtaposition by happenstance of any random piece of pre-existing fluorescent material, such a piece of fluorescent plastic, relative to a specimen under microscopic observation would not likely have produced the beneficial results now finely wrought by the exemplars of the present invention.

4. Use of Illuminator Elements in Accordance with the Present Invention With, For Example, Both Transmission and Epi-Fluorescent Microscopes An illuminator element in accordance with the present invention in use with an existing prior art transmission optical microscope is shown in FIG. 9. An illuminator element in accordance with the present invention—which may or may not be the selfsame identical illuminator element as is shown in FIG. 9 —in use with an existing prior art epi-fluorescent optical microscope is shown in FIG. 11. It may be immediately noticed that the condensers shown in FIGS. 8 and 10 are eliminated. The light source of FIG. 9 may, or may not be, the light source shown in FIG. 10. The existing epi-fluorescent light source (which is not a source of fluorescent light but is only a bright, typically halogen or xenon or mercury, light source) shown in the prior art microscope of FIG. 10 is intended to be that light source that is also shown in FIG. 11—but this need not be the case.

An illuminator element in accordance with the present invention most particularly does not have to be used with these particular microscopes, and is suitable for general use with all optical and optical-type microscopes (i.e., microscopes of ultraviolet and infrared radiation). Indeed, usage with microscope having the particular simplified optical trains shown in FIGS. 9 and 11 may well be but a fraction of all uses. However, just as the illuminator element of the present invention had its genesis in the context of conventional epi-fluorescent microscopy (as explained in the preceding section), it is useful to think about the light paths of conventional standard and epi-fluorescent microscopes, shown in FIGS. 8–11, when first thinking about the nature, qualities, source and/or path of the electromagnetic radiation—typically light radiation—that serves to excite the predominant (non self-energized), and particularly the fluorescent and/or scattering, embodiments of the illuminator element.

The basic (i) placement, (ii) energizing by an external primary light source, and (iii) use of the isotropic light illumination produced by the illuminator elements is straightforwardly shown in both FIGS. 9 and 11. However, a first concept to be understood is that restrictions on the (i) placement of the external, primary, light source relative to both the illuminator element and the microscope are very liberal, and almost non-existent. It is sufficient only that the external light source be placed so as to (i) shine sufficient light onto the illuminator element while (ii) avoiding putting extraneous light into the optical path of the microscope in any manner by which it will become detectable at the microscope's eyepiece (reference FIGS. 8 and 9 for the eyepiece). The placements of the primary light source in both FIGS. 9 and 11 satisfy this criteria. However, so also does the placement of the flashlight light source in each of FIGS. 13a and 13b—regardless of what type of optical microscope these flashlights and associated illuminator elements (called ILLUMINATORs in FIGS. 13a and 13b) are used with.

There are also certain criteria—not visible in nor apparent form FIGS. 9 and 11—for the appropriate frequency(ies) of the (i) energizing, and (ii) illuminating (light) radiation. Consider that one major type of illuminator element in accordance with the present invention consists essentially of fluorescent material. This is a material that, by dictionary definition, emits electromagnetic radiation at a first frequency or frequencies in response to, and during, the absorption of radiation at a different second frequency or frequencies arising from some other source.

Whatsoever the type of the microscope with which this type of illuminator element is used, observation is performed at, and with, only the radiation of the first frequency or frequencies: radiation of the second frequency or frequencies is both unused for, and must be non-conflicting with, this observation. The microscope, and its objective, is suitable, by definition, to focus the first frequency or frequencies. Sometimes, in embodiments of the present invention particularly for use with an epi-fluorescent microscope where the excitation radiation comes through the microscope prior to exciting the fluorescent material of the illuminator element, the microscope, or at least its objective lens, must also suffice to focus the radiation of the second frequency or frequencies.

Consider an example to illustrate this last point: an illuminator element of the present invention may excited by radiation passing in the illumination path of an epi-fluorescent optical microscope. The fluorescent material of the illuminator element would produce visible light first-frequency radiation in response to absorption of second-frequency radiation. However, this second-frequency radiation need not be visible, and could be invisible. The produced visible light radiation is, by the very definition of an optical microscope, of a frequency range suitable for illuminating a specimen that is viewed though the microscope. Importantly, the invisible radiation which travels though the microscope and to which the fluorescent material is responsive is also of a frequency, or range of frequencies, that is (are) suitable to be manipulated by the optical microscope, or at least by the microscope's objective lens. In other words, in the case of an illuminator element usable with an optical microscope, the invisible radiation is still light radiation, although perhaps outside the range of detection by the eye, film, or whatever currently serving as the detector of the microscope.

The illuminator element for use with an epi-fluorescent microscope is, as is always the case, suitably sized and shaped so as to be positioned closely proximate to a specimen under observation. So positioned, radiation of a second frequency will, after optionally passing in an optical path through the objective of the microscope and through the specimen, impinge upon the fluorescent material. It is therein converted to radiation of the first frequency, by which first-frequency radiation the specimen is observed.

Of course, and illuminator element in accordance with the present invention is usable in other than an epi-fluorescent microscope—witness the transmission microscope of FIG. 9. A concept to be grasped is simply that the frequency(ies) of the excitation radiation (light) may, or may not, equal, or substantially equal, in accordance with the physics of fluorescence, the frequency(ies) of the illumination radiation (light). This does not show up on the Figures, where all rays look the same. It may, however, be a consideration for some applications of illuminator elements in accordance with the present invention. For example, flash excitation of an illuminator element with radiation outside a sensitivity range of a certain film might not require either shielding or shuttering of the film in a darkened laboratory, presenting the possibility of building an image—possibly of a dynamic occurrence—by multiple exposures.

Another, crucial, concept to grasp is that, for all embodiments of the invention—including those where the second-frequency radiation passes through the objective of an epi-fluorescent microscope before it is converted by the fluorescent material of the illuminator element into the first-frequency radiation by which the specimen is (microscopically) observed—the stimulated fluorescence, or first-frequency radiation, completely fills the aperture of the microscope objective! In the epi-fluorescent microscope configuration of FIG. 11 the optical characteristics of the objective are effectively conferred upon the illuminator element, making automatic both (i) alignment and (ii) matching of the numerical aperture of the objective and the illuminator. In any configuration—whether those of FIG. 9 or FIG. 11 or otherwise—Koehler-like conditions (or their equivalent in non-light microscopy) are achieved.

Accordingly, it is somewhat crude, and potentially limiting, to think of illuminator elements in accordance with the present invention as simply "light sources", of "glowing bodies", or some other appellation which, while true, may fail to capture the sophistication, and elegance, of the real thing. Instead of thinking imprecisely, a due consideration of what is really going on by use of the illuminator elements of the present invention will suffice to provide one definition of such elements. The illuminator elements have and present a great multiplicity of light sources randomly distributed in space. This great multiplicity of light sources produces a corresponding great multiplicity of light wave fronts in random directions. Some ones of these random-direction wave fronts as arise from the great multiplicity of spatially-randomly-distributed light sources intercept the specimen in its position proximately located to the illuminator, therein serving to illuminate the specimen evenly with a substantially isotropic light.

Thus when other, more universal, embodiments of the illuminator element of the present invention are hereinafter discussed in detail, it should not be presumed that, because the range of radiation to which each such device is sensitive and which each such device produces, is preset, that either or both of these ranges are somehow limited, and must be of some preconceived nature such as "light" or "visible light". Indeed, it will be feature of the present invention, as hereinafter explained, that it is designed in various embodiments to produce, from selectively preset input radiation stimulus (stimuli), selectively preset, "engineered", radiation outputs.

5. General Construction of an Illuminator Element in Accordance with the Present Invention Consider the typical size and shape of an illuminator element usable with an optical microscope. A typical illuminator element is formed in the shape of a disk, normally of a size about 10 mm diameter and 2–5 mm in thickness (i.e., smaller in diameter than a United States dime, and of roughly the same thickness as a stack of 2–5 dimes). It is typically so formed by process of molding, normally of liquid polymer plastic or glass. Such an illuminator element is illustrated in FIG. 12h.

O.e, major, type of the typically-shaped, disk, illuminator element consists essentially of (i) one or more fluorescent chemicals (alternatively called "fluorochromes", or "fluorophores") as its active, light-producing agents plus, potentially and preferably, (ii) light-scattering particles of one or more types, held stably in a polymer matrix. Each fluorescent chemical has an associated fluorescence spectrum. Several fluorescent chemicals may collectively produce a fluorescence spectra that is substantially a pseudo-white light. The colored or pseudo-white light(s) produced by the illuminator element serve to illuminate the specimen.

The fluorescent light output of these chemicals is the reason that light rays are illustrated to emanate from the illuminator element illustrated in FIG. 12h.

In one particular embodiment of this type of illuminator element the fluorescent chemicals are three in number, each of which produces one of three primary colors. The typically several fluorescent chemicals are normally all sensitive to a single radiation excitation, typically light excitation that is substantially of a single frequency. In actual use in microscopy, the fluorescent chemicals and are typically so excited with a single frequency of radiation. The exciting radiation may be a visible or an invisible light, and if invisible is normally ultraviolet light.

The principles of the present invention clearly extend to microscopes, and microscopy, using other than visible light. In accordance with the present invention, the frequency range at which observations will be performed in, and with, a particular type of microscope must first be identified. Next one of more chemicals—each generally to be called a fluorescent chemical where such term is understood not to be limited to light radiation—that is sensitive to an excitation radiation to produce light radiation within the observational frequency range must be identified. If the illuminator element is to be used with an epi-fluorescent microscope as is diagrammed in FIG. 11, then the frequency of the excitation radiation used to excite the fluorescent chemical(s) of the illuminator element is typically (i) outside the observational frequency range of the microscope, but (ii) suitably focused by the objective of the particular epi-fluorescent microscope.

In operational use, the illuminator element with its contained fluorescent chemical(s) in all cases located next to the specimen, with the specimen between the illuminator element (and its contained fluorescent chemical(s)) and the objective of the microscope. The radiation to which the fluorescent chemical(s) is (are) sensitive is directed to intercept this (these) fluorescent chemical(s) at its (their) location(s) within the illuminator element. The stimulated radiation emission of the fluorescent chemical(s) will illuminate the specimen, and is then focused by the objective lens.

6. Detail Construction of an Illuminator Element in Accordance with the Present Invention In the construction of one preferred embodiment of an illuminator element in accordance with the present invention, fluorescent molecules (fluorophores) are combined with two co-polymers to produce a fluorophore-polymer unit that releases light upon exposure to a primary radiation, normally a light radiation, source. The emitted light illuminates the specimen—avoiding the use of all microscope condensers and condenser light sources. The illuminator element of the present invention is simple to use, cheap, serves to eliminate most image artifacts, provides resolution comparable to standard microscopy, and provides automatic numerical aperture matching to all objectives.

The illuminator element (i) is made from a material that is capable of randomizing incident radiation, if not also converting such radiation from a first to a second frequency, and (ii) is positioned closely proximate to a specimen under observation by a microscope. If the illuminator element so serves to convert the incident radiation, then it is the second frequency radiation by which the specimen is observed.

The illuminator element is typically in the shape and size of a small disk. The element is normally made from "material" consisting essentially of one or more fluorescent compounds held stably in a polymer matrix. The positioning of the illuminator element "closely proximate" the specimen under observation typically serves to place the illuminator element in direct contact with the specimen. The "microscope" is typically an optical microscope.

The illuminator element thus serves as an "illuminator" of the specimen, which is why it is co called. The illuminator element preferably illuminates the specimen with (i) visible fluorescent light, and more particularly with each of three primary colors of visible light (normally red, green and blue colors), generated in response to (ii) an appropriate, typically invisible, single-frequency radiation excitation. However, the illuminator element need not illuminate the specimen with visible light, nor with any particular color(s) thereof—it being understood that the radiation frequency-shifting principles of the invention are applicable to specimen illumination in other than visible or colored light.

A major advantage of the illuminator element in accordance with the present invention is its ability to produce one or more predetermined color(s) (i.e., radiation frequencies) at which a specimen is illuminated from, and by use of, one only primary illumination source. Color(s) selection(s) is (are) made by choosing appropriate fluorescent compounds having the desired fluorescence spectra.

A major advantage of specimen illumination in accordance with the invention is that when the specimen is in focus to the objective of a microscope then so also will a Koehler-like illumination (Koehler, 1893; Dempster, 1944) illumination of the specimen be obtained. The normally difficult and time consuming task of adjusting a condenser-objective pair of a microscope illumination stage in order to obtain (i) Koehler illumination and (ii) matched numerical apertures (N.A.) is completely eliminated!

7. Principles of Operation

The optical path of a prior art transmission microscope equipped with a single specimen illumination light source and a condenser is schematically illustrated in FIG. 8. The optical path of a prior art inverted epi-fluorescent microscope equipped with two light sources and a condenser is schematically illustrated in FIG. 10. In this prior art inverted epi-fluorescent microscope source #1 provides transmitted light for wide field microscopy, source #2 emits light for fluorescence excitation, and a cube holds bandpass and dichroic filters for separation of excitation and emission signals.

In the method of the present invention, the condensers of both types of prior art microscopes, and the light source #1 of the prior art epi-fluorescent microscope, are completely replaced by a small "illuminator element" placed directly on top of the specimen. See FIGS. 9 and 11. The illuminator element is typically (but not necessarily) in the shape of a disk of about 10 mm diameter and 2–5 mm height, and is so illustrated in FIGS. 9 and 11 In its embodiment for use with an epi-fluorescent microscope (i.e., in FIG. 11) the minimum height of the illuminator element should be about three times (×3) the working distance of objective lens. The illuminator element is preferably made from a polymeric material mixed with one or more fluorescent compounds to form a stable, homogeneous system. The top and bottom faces of the illuminator disk are preferably, but not necessarily, both (i) polished and (ii) co-parallel.

In usage both with a prior art transmission microscope as is illustrated in FIG. 9, and with a prior art epi-fluorescent microscope as is illustrated in FIG. 11, light from an excitation lamp falls upon the illuminator element from any angle that is not along the optical axis of the microscope. It normally so falls obliquely upon the illuminator element. In the case of the epi-fluorescent microscope (shown in FIG. 11), light from the fluorescence excitation lamp (source #2) passes through the objective and specimen in the same manner as in conventional fluorescence microscopy. However, after passing through the specimen, excitation light stimulates fluorescence in the illuminator.

Fluorescent light is isotopically emitted from all the surfaces of the illuminator element, which isotropic light emission is intended to be represented for one surface only—the surface facing the specimen—in FIGS. 9 and 11 by the arrows, or vectors of light, that proceed from the illuminator onto the specimen in, and from, multiple random directions. The illuminator element forms an emitted, isotropic, secondary light beam that illuminates the specimen for wide field image formation. The isotropic secondary illumination cone completely fills the aperture of the objective lens. Thus, the optical characteristics of the objective lens are essentially conferred upon the illuminator element—resulting in automatic alignment and objective-illuminator numerical aperture (N.A.) matching! In addition, substantial Koehler, or near-Koehler, conditions of illumination (discussed in greater detail in section 9., following) are achieved. This is particularly easy to see in the epi-illumination microscope configuration of FIG. 11 since the source #2 excitation and the illuminator element emission are geometrically coincident.

The illuminator element does not care how, nor from where, it receives the primary excitation radiation. As may be seen in FIG. 13, common incandescent light sources held by relatively crude holders in position so as to shine upon the illuminator elements will suffice to provide this primary excitation radiation. These common external light sources crudely held generally permit the illuminator element to produce its secondary fluorescent light emission in quite as satisfactory a manner as do primary light sources that are (i) brighter, (ii) spectrally more pure, (iii) better collimated, (iv) more expensive, or (v) superior in any manner whatsoever.

However, it must be admitted, the conventional epi-fluorescent microscope, in particular, provides in its pre-existing structure a very simple, and convenient, way to provide primary excitation light to the illuminator element. Moreover, the characteristics of this light can readily be varied. This can be useful in the development of illuminator elements (a task normally undertaken by the manufacturer, and not the user, thereof). For example, a set of filters allows excitation light to pass through the illuminator and prevent image plane exposure to source #2. Due to the tremendous variety of fluorophores and filters available for fluorescent microscopy, it is possible to create almost any combination of excitation/illumination pair.

In order to produce a pseudo-white-light illumination and full color images, (i) a 365 nm wavelength primary excitation light source has been preferred for use with (ii) preferred illuminator elements in accordance with the present invention having blue, green and red-emitting fluorophores embedded in the polymer matrix is preferred. FIG. 15 illustrates the fluorescence emission spectra of a first preferred embodiment of an illuminator element that is (i) so illuminated, and (ii) that contains each of these three fluorescent chemicals. The number of possible embodiments of the illuminator elements will turn out to be almost endless, as is suggested by the table of FIG. 17, and by those further fluorescent emission spectra of still other embodiments of illuminators in accordance with the present invention as will later be seen in FIGS. 25–28. For the moment, and by observation of FIG. 15, it is sufficient to understand that light emitted from an illuminator element which light may appear as white to the eye is, in fact, a sum of several distinct colored emission spectrum.

All fluorophores are stable and have high fluorescence quantum yields, permitting the use of low-intensity excitation sources. When paired with low power objectives, a pinhole or field diaphragm placed between the illuminator and the specimen increases image contrast. The use of an adjustable iris between an illuminator element, such as happens to be held along with a flashlight in a holding appliance in FIG. 13$b$, is shown in FIG. 14.

FIG. 12, consisting of FIGS. 12$a$ through 12$o$, show exemplary physical forms and shapes of several different illuminator elements. The illuminator elements of FIGS. 12$a$ and 12$h$ "sparkle" by virtue of their fluorescent light emission under normal ambient room lighting. Some of the illuminators are substantially transparent to visible light, others are translucent colored bodies, some are translucent, and still others are opalescent. A illuminator element may marked with indicia—including by embossing or molding—on its top (as in FIGS. 12$f$, 12$m$, 12$n$ and 12$o$) or side surfaces (as in FIG. 12$l$) without deleterious effect on its function. The illuminator elements shown in FIGS. 12$m$ thorough 12$o$ are respectively three-dimensionally contoured with the English letters "R", "G" and "B" as might denote, for example, the respective provision of Red, Green and Blue light by these illuminator elements 12$m$–12$o$.

8. Construction of the Preferred Embodiments 8.1 Materials

The major, fluorescent-light-emitting, embodiment of an illuminator in accordance with the is present invention is preferably constructed from (i) a polymer host and (ii) fluorescent dyes. The polymer host is preferably copolymer of polymethylmethacrylate (alternatively called methylmethacrylate) and poly-2-hydroxymethyl methacrylate (alternatively called 2-hydroxymethyl methacrylate) in proportion 3:1 by volume, and more precisely in a proportion of 70 ml. to 30 ml. by volume.

The preferred fluorescent dyes in support of black and white photomicrography is rhodamine 6G. Rhodamine 6G has a fluorescent absorbance maxima $\lambda_{abs}(max)=528$ nm, and a fluorescent emission maxima $\lambda_n(max)=555$ nm). The amount of rhodamine 6G used is preferably that amount as will establish an optical density (O.D.) of the rhodamine 6G at an excitation wavelength 365 nm in the mixture to be within a range of 0.3–0.5 per 1 cm. (Optical density is the standard measure of quantifying an amount of an optically active substance such as a fluorophore.)

For pseudo-white light illumination in support of color photography, a mixture of four fluorophores is preferable:

A first fluorophore is coumarin 152; added to a predetermined optical density in the mixture. Coumarin 152 has a fluorescent absorbance maxima $\lambda_{abs}(max)=394$ nm, and a fluorescent emission maxima $\lambda_n(max)=496$ nm.

A second fluorophore is rhodamine 110—$\lambda_{abs}(max)=498$ nm, $\lambda_n(max)=520$ nm. Rhodamine 110 is also added to a predetermined optical density in the mixture, and normally to the same optical density as the coumarin 152.

A third fluorophore is sulforhodamine 640—$\lambda_{abs}(max)=578$ nm, $\lambda_n(max)=605$ nm. It is again added to a predetermined optical density in the mixture, and normally to the same optical density as the coumarin 152 and the rhodamine 110.

A fourth, and final, fluorophore is the same rhodamine 6G ($\lambda_{abs}(max)=528$ nm, $\lambda_n(max)=555$ nm.) as was used in the monochromatic illuminator (see above). It is again added to a predetermined optical density in the mixture, and normally to the same optical density as is each of the coumarin 152, the rhodamine 110, and the sulforhodamine 640.

For example, and by way of the creation of the particular embodiment of an illuminator element for which the emission spectrum was seen in FIG. 10, the optical density (O.D.)

of Coumarin 152 at the standard preferred excitation wavelength (365 nm) was set to 0.3 per 1 cm, and the concentrations of all other dyes were adjusted to get the same fluorescence intensity as from Coumarin 152.

A practitioner of the photochemical arts will understand that the amount of each dye used to obtain this optical density may be extrapolated from commonly-available information on fluorescent and other dyes. For example, a table may show that the amount of Coumarin 152 necessary to realize an O.D. of 5.0 at a particular wavelength is 6.5 mg./100 mL.; that the amount of rhodamine 110 required to realize the same O.D. is 2.6 mg./100 mL.; that the amount of sulforhodamine 640 required to realize the same O.D. is 2.2 mg./100 mL.; and that the amount of rhodamine 6G required to realize the same O.D. is 2.4 mg./100 ml. Proportionate amounts are required to obtain other Optical Densities (O.D.).

Accordingly, the overall formulation—by combined volume and weight measure whichever is easiest for the corresponding liquid or solid material—for that embodiment of an illuminator element for which the emission spectrum is shown in FIG. 10 is:

| | |
|---|---|
| polymethylmethacrylate | 70 ml. |
| poly-2-hydroxylmethyl methacrylate | 30 ml. |
| coumarin 152 | .39 mg./100 ml. |
| sulforhodamine 640 | .152 mg./100 ml. |
| rhodamine 110 | .156 mg./100 ml. |
| rhodamine 6G | .144 mg./100 ml. |

The polymer plastics are readily available from chemical supply houses. The preferred fluorophores, and many hundreds if not thousands of others (extending well beyond the common species listed in the table of FIG. 17) are available, inter alia, from Molecular Probes, Inc. telephone (503) 465–8353.

The table of FIG. 17 generally shows fluorophores, or fluorochromes—all of which are known in the prior art—that are suitable for use in the construction of fluorescent-type illuminator elements in accordance with the present invention.

8.2 Preparation

Preparation of the illuminator elements is relatively straightforward. A solution of dyes is mixed with the polymerization initiator 2,2'-azobis(2-methyl-propionitrile). This prepared solution is added to, and mixed to homogeneity with, a polymer host stock solution. The preferred concentration of initiator was 3 mg/ml per final volume or reaction mixture.

The obtained composite material was phased into glass form, vacuumed and cured in a mold at a thermostatically-controlled temperature of 50° C. during 24 hours.

The molded and formed polymer block with homogeneously dispersed mixture of fluorophores is removed from the form, typically cut to size, and then preferably polished to optical quality (at least on the surface that will face the specimen).

8.3 Cost of the Preferred Embodiments of the Illuminators

The cost of materials, ranges depending on number and price for fluorophores used, from 20¢ to 75¢ U.S., circa 1994. The cost of utilities including vacuum line, electricity, etc. used in assembly is estimated to be $1.00 U.S. circa 1994.

The cost of labor is estimated to be $1.00.

The cost of miscellaneous is estimated to be 25¢ to 80¢.

The total cost per unit is thus approximately $3.00 per illuminator element, with economies of scale to be expected.

8.4 A Matched illuminator and Specimen Stain

An illuminator element having an illumination light output that is more intense at certain frequency or frequencies may serve to better resolve a specimen that is dyed with one or more dyes that transmit the frequency or frequencies (while absorbing other frequencies).

One example of such an illuminator having a light output that is tailored to a particular specimen stain may be constructed for use with the very common biological specimen stain eosin. Eosin is pink in color, having a $\lambda_{(abs)}$ max=525 nm. For contrast enhancement and "blue" and/or "red" emitting fluorophores can be used in making an associated illuminator. For example, the same "blue" and "red" component fluorophores may be used as are used in the making of the illuminator producing the preferred pseudo-white light. Namely, the blue is produced by coumarin 152 having a fluorescent absorbance maxima $\lambda_{abs}(max)=394$ nm, and a fluorescent emission maxima $\lambda_n(max)=496$ nm. The "red" is produced by sulforhodamine 640 having a $\lambda_{abs}(max)=578$ nm and a $\lambda_n(max)=605$ nm. Both fluorophores are to a predetermined optical density in the mixture, and normally to the same optical density.

8.5 Emission Spectra of the Preferred Embodiments of the Illuminators

A graph showing an exemplary emission spectrum of a preferred polymer, without more, used in construction of illuminator elements in accordance with the present invention is shown in FIG. 25. The particular polymer for which the emission spectrum is shown is a combination of (i) methyl methylmethacrylate and (ii) 2-hydroxymethacrylate in approximate proportion 3:1 by volume, and more exactingly in proportion 70 ml. to 30 ml. The polymer is excited with light that is substantially at a single frequency of, showing a very sharp peak of emission at, 366 nanometers. The x, or horizontal, axis of all the graphs of FIGS. 25–29 is in nanometers wavelength of the emitted light radiation. The vertical scale is for relative comparison of the intensities of emission at the different wavelengths only, there being no absolute quantitative scale (at least not as is useful in the present observations) for the intensity of fluorescent light. As may be seen from the graph of FIG. 25, the polymer has some fluorescence in of itself, and shifts the 366 nanometers excitation light to substantially a single broad emission peaking at about 450 nanometers.

A graph showing an exemplary spectrum of emission of (i) a liquid plastic consisting of two monomers, before polymerization, in combination with (ii) three fluorophores, as are used in construction of a particular illuminator elements in accordance with the present invention is shown in FIG. 26. The two monomers are (i) methyl methylmethacrylate and (ii) 2-hydroxymethacrylate in approximate proportion 3:1 by volume, and more exactingly in proportion 70 ml. to 30 ml. The three fluorophores, or fluorochromes, that are added are (i) coumarin 152 to an optical density of 0.3/cm, or approximately 6.5 mg. per 100 ml.; (ii) rhodamine 110 to an optical density of 0.3/cm, or approximately 2.6 mg. per 100 ml.; and (iii) rhodamine 610 to an optical density of 0.3/cm, or approximately 2.4 mg. per 100 ml. The mixture is again excited with light that is substantially at a single frequency of, showing a very sharp peak of emission at, 366 nanometers.

It will be recalled that coumarin 152 has an emission spectrum of $\lambda_{abs}(max)=394$ nm, $\lambda_n(max)=496$ nm; that rhodamine 110 has an emission spectrum of $\lambda_{abs}(max)=498$ nm, $\lambda_n(max)=520$ nm. From this information, and without prior knowledge of the emission spectrum of rhodamine 610 (which emission spectrum is, however, well known), and astute observer can determine from observation of FIG. 26 that rhodamine 610 has a peak emission at, surprise, approximately 610 nanometers. In other words, the emission spectra graphed in FIG. 26 clearly shows the constituent fluorophores each with its associated spectrum that, along with the spectrum of the monomers, go to make up the composite spectra of FIG. 26.

A graph showing an exemplary spectrum of emission of the same particular brightfield illuminator element previously seen in FIG. 26 after polymerization is shown in FIG. 27. The polymer, now a solid body and no longer a liquid, obviously still contains the three fluorophores. The contribution of the monomers (the (i) methyl methylmethacrylate and (ii) 2-hydroxymethacrylate) to the emission spectra has changed significantly upon their polymerization. The emission spectrum of each of the fluorophores has not significantly changed. The intensity of the emission spectra at lower nanometers wavelengths—which intensity was dominant before polymerization in the graph of FIG. 26—is not less than the peaks at approximately 520 nm. resultant from rhodamine 110 and at 610 nm. resultant from rhodamine 610. The emission peak at 496 nanometers from the coumarin 152 is still visible, but not so prominent as the emission peak so of the other two fluorophores. The relative strengths of all peaks may clearly be adjusted as desired or required in the production of colored light(s) in support of microscopy.

A graph the spectrum of emission of an exact equivalent body as gave rise to the graph of FIG. 27—in other words the polymerized body with the three fluorophores—save only that titanium dioxide ($TiO_2$) is now added—typically to the amount of 10 mg. per 100 ml. A darkfield illuminator has been made. Regardless of where upon the surface of the darkfield illuminator fluorescent light is emitted, and howsoever such light varies in intensity over the surface, it is immediately obvious from an inspection of the graph of FIG. 28 that the relative intensity at varying frequencies (as well as the relative intensity at various spatial positions relative to the illuminator) has been much affected. The lower wavelength fluorescent emission of the coumarin 152 is either (i) but relatively poorly reflected by the $TiO_2$ and/or (ii) but poorly self-absorbed. In fact, it is condition (ii) that prevails. Meanwhile, both varieties of the rhodamine are good self-absorbers of their own fluorescent emissions.

With some thought, it will be recognized that the teaching of the graph of FIG. 28 is fairly complex. Inclusion of light-scattering bodies—especially in densities that promote the realization of a darkfield illuminator element—also serves to change the frequency mixture of the emitted light. One fluorophore may be better, or worse, at self-absorbing its own emission(s), or the emission(s) of another fluorophore. The entire mixture becomes a "witches brew", with considerable planning and skill being useful in the selection, and the blending, of plural fluorophores and also reflecting bodies to obtain illumination light output of the desired spectral characteristics.

8.6 Brightfield and Darkfield Illuminator Elements

A diagrammatic representation of a brightfield illuminator element in accordance with the present invention is shown in FIG. 16a. The arrows at shown at only a single, top, surface of the brightfield illuminator element are intended not to represent the directions of the light emissions, which emissions are directionally isotropic and random (compare, for example, FIGS. 9 and 11), but only that the brightfield illuminator element produces a relatively even magnitude of illumination at its top surface. (Accordingly, the meaning of these arrows is different than those ray trace arrows shown to proceed from the external light source, or light bulb, to the illuminator element in the same FIG. 16a.) It is this top surface that is, arbitrarily in FIG. 16, the surface that is positionally disposed towards the specimen under observation.

Conversely, a diagrammatic representation of a darkfield illuminator element in accordance with the present invention is shown in FIG. 16b. The darkfield illuminator element produces a relatively more intense illumination at the peripheral, as opposed to the central, regions of its top surface. This is again intended to be illustrated by the varying length of the arrows exiting the top surface.

The construction of a darkfield illuminator element was shown as ILLUMINATOR TYPE #1 in the table of FIG. 18Zb, and the appearance of a specimen observed under the illumination of such a darkfield illuminator element was shown in FIG. 20c.

9. Comparison to Koehler Illumination

As stated in section 5 of the SUMMARY OF THE INVENTION portion of this specification, the specimen illumination obtainable with the illuminator elements of the present invention directly fulfills many of the requirements, and is analogous to satisfying certain remaining requirements, of Koehler illumination. Yet it is not precise to say that the illumination provided by the illuminator element of the present invention is precisely Koehler illumination because Koehler illumination deals with the requirements of the different, traditional, illumination of a specimen by use of condensers.

From section 2.2 of the BACKGROUND OF THE INVENTION portion of this specification, it will be recalled that a first criteria of Koehler illumination is that the field should be homogeneously bright. This criteria is completely met by the illuminator elements of the present invention.

The second criteria of Koehler illumination is that the working numerical aperture of the condenser and the size of the illuminated field can be regulated independently. There is, of course, no condenser used, required or desired with the illuminator elements of the present invention, which completely replace condensers. The size of the illuminated field can, however, be regulated independently of anything else. Accordingly, this criteria of Koehler illumination is deemed to be partially met by the illuminator elements of the present invention because the numerical aperture of an illuminator element is fixed.

The third criteria of Koehler illumination is that the specimen should be illuminated by a converging set of plane wave fronts, each arising from separate points. This was previously obtained by imaging of the light source in the condenser aperture. Now, with the illuminator elements of the present invention, the planar wave fronts of light arise from sources, such as chromophores or light-scattering bodies, that are spatially distributed. Accordingly, this criteria of Koehler illumination is manifestly met by the illuminator elements of the present invention.

The fourth and fifth criteria of Koehler imaging are really expressions of results. Koehler imaging gives rise to the maximum lateral resolution and very fine optical sectioning, which yields maximum axial resolution. Meanwhile, the front focal plane of the condenser becomes conjugate with the rear focal plane of the objective lens, a condition needed for optimal contrast enhancement of the finer specimen details. These results are non-analog/us to the illumination, and the illuminating devices, of the present invention. Accordingly, Koehler illumination cannot be directly compared in this regard.

The sixth and final, criteria of Koehler illumination is that any flare arising from the microscope optics and their barrels is reduced without any vignetting. The illuminator elements of the present invention fully accomplish this also.

10. Performance, and Applications, of the Preferred Embodiment

FIGS. 20 through 25 show certain microscopic specimens as observed through a same one transmission, and a same one epi-illumination, microscope both with, and without, usage of the illuminator elements of the present invention. Despite the fact that, as reproduced by process of printing in grey tome, it is perhaps the resolution, and the point transfer function, of the printed photographs that is most readily observed and assessed, the photographs are primarily directed to showing the versatility of the illuminator elements of the present invention, and only secondarily to the quality of images producible by such elements. This is because the ease of selected color illumination presented by the illuminator elements of the present invention is a greater departure from the prior art than the quality of images obtainable, which image quality is represented only to be commensurate with, and not better than, the image quality obtainable with the skilled use of the best proper condensers.

Furthermore, and in actual fact, none of the eight photomicrographs obtainable by use of prior art condensers that are within FIGS. 20-25 use a condenser of a numerical aperture that is perfectly matched to the objective lens. See the table of FIG. 18a. The actual condensers used in these eight photographs are therefore not the perfectly "proper" condensers. This has not been done so as to degrade the quality of the images produced by prior art means, which degradation is scarcely observable in enlarged photographs of finest quality and not at all in the printed renditions of the photographs. Instead, the condensers, and the specimens, and the light sources, and the microscopes used are all intended to be typical of a "first-line" modern American laboratory having a relatively high average range of equipments. To this extent, and although a general estimate of the high quality of the images obtainable by use of the illuminators of the present invention may be gained by inspection of the FIGS. 20-25 (even as reproduced by printing), the photomicrographs of the FIGS. 20-25 must be regarded as making a primarily qualitative, as opposed to a quantitative, showing of the optical characteristics of the present invention in actual practice.

The parameters of all the microscopic observations as resulted in all the colored photographs (now reproduced in the issued patent grey tone by process of printing) of FIGS. 20-25 are contained in FIG. 18a. Because color is so important to the present invention, but cannot be seen in the FIGS. 20-25 as are reproduced in the issued patent in grey tone by process of printing, the separate table of FIG. 18b permits convenient reference to the colors of most things visible in the FIGS. 20-25. It will be understood, of course, that only a viewing of the original color photographs will suffice for a comparative assessment of the image quality, and colors, of FIGS. 20-25 that are hereinafter described only in words.

The images of several samples in FIGS. 20-25 were acquired using both the illuminator elements of the present invention and conventional condensers. FIG. 18b summarizes the data on (i) whether an individual photomicrograph is derived by Prior Art (PA) condensers or by illuminator elements of the Present Invention (PI). The magnification and numerical apertures of the objectives —ranging from 10x, N.A.=0.3; to 100x, N.A.=0.9—are given where appropriate. Both phase (PH3, standing for phase contrast #3) and bright field (BR.F.) images are shown. In FIGS. 23 and 24 the "Y" indicates the use of an oil immersion objective.

"BLU. COL. COR" refers to blue color correction by use of a blue filter. "NDF" means "Neutral Density Filter". The "PINHOLE", actually a pinhole placed in aluminum foil, is a well-known means of increasing contrast in microscopic observations.

The illuminator elements of the present invention were used in and with completely conventional optical microscopes. "TRANS" stands for a transmission microscope, as was diagrammed in FIGS. 8 and 9. In particular, an Olympus® (Olympus is a registered trademark of Olympus Optical Co. Ltd., Japan) microscope type BH2 was used. "EPI" stands for an epi-illumination microscope, as was diagrammed in FIGS. 10 and 11. In particular, a Zeiss® (Zeiss is a registered trademark of Carl Zeiss, Switzerland; represented in the USA by Carl Zeiss, Inc., Thornwood, New York 10594) Axivert 10 epi-fluorescent microscope with was used.

In the two photomicrographs (FIGS. 21b and 21c) derived by use of an illuminator element with an epi-fluorescent microscope (the aforementioned Zeiss Axivert 10), the external light illumination was supplied in a random off-axis direction from the epi-fluorescent light source, which was of high quality. However, in all other photomicrographs made by use of illuminator elements a bench-top halogen light source, or some incandescent external light source, was used without distinction.

The three photomicrographs of FIG. 20 generally show the vivid and striking colors obtainable with illuminator elements in accordance with the present invention, as well as the overall quality of an image obtainable with an illuminator element relative to an image obtained with prior art condensers.

A printed grey tone rendition of a color photomicrograph obtained with the same prior art transmission microscope and condenser pair previously seen in FIG. 8 is shown in FIG. 20a. The photomicrograph is of an exemplary specimen of a non-stained cross-section of a young mouse mounted upon a microscope slide.

A printed grey tone rendition of a color photomicrograph obtained with an embodiment of an illuminator element in accordance with the present invention containing light-scattering bodies is shown in FIG. 20b. This photomicrograph was obtained in the manner of FIG. 9 by use of the same transmission microscope and the same specimen previously used to produce FIG. 20a. The light arising at an illuminator element type 6 (reference FIG. 18b) is passed though an iris the aperture of which is set to provide the desired intensity of illumination. The light reflecting bodies within the illuminator element type 6 that is used to produce FIG. 20b (and all others wherein an illuminator containing light-scattering bodies is used) are particles of titanium dioxide.

FIG. 20b is intentionally caused to be of a strikingly different color than is FIG. 20a. Namely FIG. 20a is brown, as is an consequence of the color spectrum of the illuminating light, whereas FIG. 20b is grey, as is again a consequence of the spectrum of the illuminating light scattered by the illuminator element type 6. Reference FIG. 18b. The image of FIG. 20b compares highly favorably in quality to the image of FIG. 20a, although of a different color.

A printed grey tone rendition of a color photomicrograph, obtained with a darkfield fluorescent embodiment of an illuminator element type 1 (reference FIG. 18b) in accordance with the present invention is shown in FIG. 20c. The image was obtained in the manner of FIG. 9 by use of the same transmission microscope and the same specimen previously used to produce FIGS. 20a and 20b. The FIG. 20c is intentionally to be of a different coloration than either FIG. 20a or FIG. 20b by consequence of its illumination with a fluorophore-containing darkfield illuminator element type 1. This darkfield illuminator element type 1 contains a high a concentration of the same fluorophores as were used in the brightfield "pseudo-white" illuminator type 3, only now to an Optical Density of 5.0. Reference FIG. 18b. The appearance, and color, of the image produced by darkfield illumination is considerably different, but the image of FIG. 20c still compares highly favorably in quality to the image of FIG. 20a.

The photomicrographs of FIG. 21 are collectively directed to showing how objects of a certain color, namely green diatoms, may be highlighted against their background by illumination with a correspondingly colored light, namely green light.

A printed grey tone rendition of a color photomicrograph obtained with the same prior art transmission microscope and condenser pair previously seen in FIG. 8 is shown in FIG. 21a. The photomicrograph is of an exemplary specimen of colored diatoms mounted upon a microscope slide.

A printed grey tone rendition of a color photomicrograph, obtained with a "white" light fluorescent embodiment of an illuminator element type 3 (reference FIG. 18b) in accordance with the present invention—used in the manner of FIG. 11 with an epi-illumination microscope—is shown in FIG. 21b. The specimen observed is the same specimen previously used to produce FIG. 21a. FIG. 21b is intentionally caused of a similar colors to FIG. 21a (reference FIG. 18b) while comparing highly favorably in image quality.

Another printed grey tone rendition of a color photomicrograph, now obtained with a "green" light fluorescent embodiment of an illuminator element type 5 (reference FIG. 18b) in accordance with the present invention, is shown in FIG. 21c. The illuminator element type 5 is again used in the manner of FIG. 11 with the same epi-illumination microscope previously used to produce FIG. 21b, and with the same specimen previously used to produce FIGS. 21a and 21b. FIG. 21c now highly visually discriminates certain diatoms that are colored green (reference the table of FIG. 18b). Meanwhile, a highly favorable overall comparison in image quality to FIG. 21a is maintained.

A printed grey tone rendition of a color photomicrograph—obtained with the prior art transmission microscope and condenser previously seen in FIG. 8—is shown in FIG. 22a. The exemplary specimen shown is of PTK myotic stained cells mounted upon a microscope slide.

For comparison with FIG. 22a, FIG. 22b is printed grey tone rendition of a color photomicrograph that was obtained with an embodiment of an illuminator element type 4 containing both light-scattering bodies and fluorophores (reference FIG. 18b) by use in the manner of FIG. 9 of the same transmission microscope, and of the same specimen, previously used to produce FIG. 22a. In particular, the light-scattering bodies are particles of titanium dioxide and the fluorophores are the same three previously used, now to an optical density of 0.3 (reference FIG. 18b). FIG. 22b is intentionally caused to be of a strikingly different color than FIG. 22a (reference FIG. 19) while comparing highly favorably in image quality.

Both FIGS. 23a and 23b were obtained by use of prior art apparatus including condensers. A printed grey tone rendition of a color photomicrograph, obtained with the prior art transmission microscope and condenser previously seen in FIG. 8, of an exemplary stained plastic section mounted upon a microscope slide is shown in both FIGS. 23a and 23b. The difference between the color photomicrographs of FIGS. 23a and 23b—both of which are of the same subject and both of which were obtained by use of prior art apparatus—is that the numerical aperture of the condenser is more closely matched to the numerical aperture of the objective lens (as it desirably should be) in the photomicrograph of FIG. 23b—which is of better quality. Reference FIG. 18a.

Conversely, FIG. 23c was obtained by use of an illuminator element type 6 (reference FIG. 18b) in accordance with the present invention. A color photomicrograph—of which a printed grey tone rendition (only) is shown in the printed patent—was obtained by use in the manner of FIG. 9 of the illuminator element type 6 containing light-scattering bodies, and particularly particles of titanium dioxide. The same transmission microscope and the same specimen previously used to produce FIGS. 23a and 23c was again used. The FIG. 23c is intentionally made to be of a strikingly different color than FIGS. 23a and 23b (reference FIG. 19) while comparing highly favorably in image quality.

A color photomicrograph—printed in grey tone (only) in the printed patent—obtained with the prior art transmission microscope and condenser previously seen in FIG. 8, and showing an exemplary specimen of a standard diatom mounted upon a microscope slide, is shown in FIG. 24a.

For comparison, a color photomicrograph—printed in grey tone in the printed patent—that was (i) obtained with an illuminator element type 4 of the present invention containing both light-scattering bodies and fluorophores, (ii) by use in the manner of FIG. 9 (iii) of the same transmission microscope (iv) with the same specimen previously used to produce FIG. 24a, is shown in FIG. 24b. The color photomicrograph of FIG. 24b now highly discriminates the standard diatoms (reference the table of FIG. 19) while comparing highly favorably in overall image quality to the photomicrograph of FIGS. 24a.

The photomicrographs of FIGS. 25 collectively show that the illumination provided by an illuminator element in accordance with the present invention permits microscopic observation in a beneficially narrow (shallow) depth of field.

A color photomicrograph—rendered in grey tone (only) in the printed patent—obtained with the prior art transmission microscope and condenser previously seen in FIG. 8, and of an exemplary stained plastic section mounted upon a microscope slide, is shown in FIG. 25a.

Another, similar, printed grey tone rendition of a color photomicrograph, obtained with the same prior art transmission microscope and condenser previously used to produce the photomicrograph of FIG. 25a, and again showing the same exemplary stained plastic section mounted upon a microscope slide, is shown in FIG. 25b. The principle difference in photomicrographs between FIGS. 25a and 25b is that the cover slip is dirty in FIG. 25b, which dirt contamination is visible as horizontal streaks.

Particularly for comparison with FIG. 25b, FIG. 25c shows printed grey tone rendition of a color photomicrograph, obtained with an embodiment of an illuminator element type 6 (reference the Table of FIG. 18b) in accordance with the present invention containing light-scattering bodies by use in the manner of FIG. 9 with the same transmission microscope and the same specimen previously used to produce FIGS. 25a and 25b. Moreover, the same dirty cover slip used to produce FIG. 25b is again used in producing the image of FIG. 25c. The beneficial lack of any showing of dirt contamination as horizontal streaks (or otherwise) in FIG. 25c is due to the narrow depth of field of an image obtainable with an illuminator element of the present invention. Such an image is superior in avoiding spurious diffracted light occurring from, inter alia, dirty cover slips.

The color photomicrographs of FIGS. 20–25 generally show (in a manner that is only suggested by the grey-tone, monotone, printed reproductions of these color photomicrographs) that the microscope performance obtainable with illuminator elements in accordance with the present invention is but very slightly inferior, if at all, to the performance obtainable with the same microscope using a very-expensive condenser of the best available quality.

In summary, advantages of the illuminator are as follows. The illuminator accords simplicity of use. It offers the same or better resolution and comparable contrast to condenser images. It accords for the elimination of image artifacts, e.g. cover slip dirt, or airy disks. The illuminator is low cost. It accords automatic matching to the numerical aperture of all objective lenses.

The illuminator of the present invention is usable in all applications of conventional light microscopy, particularly including by pathologists in hospitals and laboratories, by researchers in cell biology, and by microbiologists.

11. Future Modifications

In accordance with the preceding explanation, variations and adaptations of the illuminator in accordance with the present invention will suggest themselves to a practitioner of the optical and optical materials arts.

For example, chemicals and/or other material that does not interfere with the function of the illuminator elements may be added to the matrix. Such chemicals and materials may serve, when appropriately analyzed, as an indication of origin, and authenticity, of a particular illuminator element.

In order to improve performance, cost effectiveness and/or service to particular applications, several modifications of the basic illuminator elements in accordance with the present invention are possible. Some of these are:

The geometry of the illuminator may be optimized for either and/or for both of (i) the reception of primary radiation from an external light source, or (ii) the coupling of illumination onto a particular specimen. For example, a horn-shaped cavity in the illuminator element, the opening of which cavity was directionally disposed towards the external light source, would cause, by multiple reflections, that almost all of the light from the external light source would enter into the illuminator.

Selective surfaces of the illuminator element may be mirrored.

The choice of fluorophores, or of combinations of fluorophores, within an illuminator element may be optimized for illumination according to characteristics of specimen (staining, own fluorescence, thickness, etc.).

A special holder is possible for using an illuminator element with upright microscope. A low power mercury lamp may be used for epi-illumination with "non-epi" microscopes.

Finally, many variations are possible on the darkfield illuminator element, and in the range between the brightfield and the darkfield illuminator elements. The central core of an illuminator element, for example an elongate "plug" to a cylindrically-shaped illuminator element, could be filled with various fluorophores and/or light-absorbing dyes. Meanwhile, the surrounding volume could be filled with fluorophores of a contrasting color and/or light-scattering bodies. Although the specimen would still be bathed in directionally isotropic light, such light would not be of the identical color from all directions. Specimen features absorbing one color light might throw a shadow in one direction; specimen features absorbing a complimentary color light might throw a shadow in the other direction. The height, or size, of the plural, and plural-colored, specimen features might thus usefully be compared in a manner not obtainable with simple brightfield illumination.

In accordance with these and other possible variations and adaptations of the present invention, the scope of the invention should be determined in accordance with the following claims, only, and not solely in accordance with those particular embodiments within which the invention has been taught.

What is claimed:

1. An illuminator element for use with an optical microscope and a source of radiant energy, the illuminator element comprising:

an illumination body serving as a source of spatially isotropic light, the body containing a multiplicity of minutely-sized substantially-non-directional light-sourcing bodies, at least some of which receive radiant energy from a source of radiant energy external to the body, the collective bodies sourcing light by any of (i) absorption and emission, and (ii) reflection, spatially distributed within a stable matrix, relatively much larger than are the minutely-sized bodies, that is suitably sized and shaped so as to be positioned sufficiently closely proximate to a specimen under observation by an optical microscope so that the collective bodies illuminate the specimen so substantially spatially isotopically that no shadows are visible through the microscope;

wherein the lack of shadows means that isotropic light from the illumination body serves, when the illumination body is close to the specimen, to illuminate the specimen so completely that light rays received into the microscope from the specimen during the observation will not show any such partial darkness or obscurity in the specimen as would indicate that illumination of the specimen by the illumination body had been by less than spatially isotropic light, meaning light that is without distinction as to direction.

2. The illuminator element according to claim 1 wherein the spatially isotropic illuminating light is substantially only at single predetermined narrow of range frequencies as constitutes a single color.

3. The illuminator element according to claim 1 wherein the spatially isotropic illuminating light is substantially only at a plurality of predetermined narrow ranges of frequencies each of which ranges constitutes a single color.

4. The illuminator element according to claim 1 wherein the spatially isotropic illuminating light substantially only at the plurality of predetermined narrow ranges of frequencies is a pseudo-white light.

5. The illuminator element according to claim 1 wherein the source of spatially isotropic light comprises:

a great multiplicity of substantially-non-directional substantially-molecular-size light sources; evenly spatially distributed within a stable matrix suitably sized and shaped so as to be positioned closely proximate to the specimen under observation by the microscope;

wherein the even distribution of the light sources coupled with their substantial lack of any preferred direction produces the substantially spatially isotopic illumination of the proximate specimen.

6. The illuminator element according to claim 5 wherein at least one of the great multiplicity of light sources comprises:

a luminescent light source emitting light.

7. The illuminator element according to claim 5 wherein the at least one luminescent light source derives an energy of its light emission from within the stable matrix.

8. The illuminator element according to claim 7 wherein the at least one luminescent light source comprises:

a radioluminescent light source deriving its energy of light emission from a decay of radionuclides that are within the stable matrix.

9. The illuminator element according to claim 7 wherein the at least one luminescent light source comprises:

a chemiluminescent light source deriving the energy of light emission from a chemical reaction that transpires within the stable matrix.

10. The illuminator element according to claim 5 wherein at least one luminescent light source derives an energy of its light emission from energy that is externally supplied to the stable matrix.

11. The illuminator element according to claim 5 wherein at least one luminescent light source deriving the energy of its light emission from energy that is externally supplied to the stable matrix so derives energy from light radiation that is externally supplied to the stable matrix.

12. The illuminator element according to claim 11 wherein the at least one luminescent light source comprises:

a fluorescent light source.

13. The illuminator element according to claim 5 wherein at least some of the great multiplicity of light sources comprise:

a multiplicity of light-scattering bodies randomly evenly distributed within the spatial matrix;

wherein a non-isotropic light externally supplied to the illuminator element is randomly scattered multiple times between random ones of the multiplicity of light-scattering bodies within the stable matrix so as to exit the stable matrix as the substantially spatially isotropic light regardless that the externally supplied light is not itself isotropic.

14. An illuminator element for use with a light microscope and a source of radiant energy, the illuminator element comprising:

a multiplicity of minutely-sized substantially-non-directional light-sourcing bodies, at least some of which receive radiant energy from a source of radiant energy external to the body, the collective bodies sourcing light by any of (i) absorption and emission, and (ii) reflection, spatially distributed within a stable matrix of a body, relatively larger than are the minutely-sized bodies, that is suitably sized and shaped so as to be positioned closely proximate to a specimen under observation by a microscope in order that the multiplicity of bodies illuminate the specimen substantially spatially isotopically;

wherein the specimen is illuminated so substantially isotopically by the multiplicity of light-sourcing bodies for and during its observation through the light microscope that no shadows are visible through the microscope.

15. The illuminator element according to claim 14 wherein the multiplicity of light-sourcing bodies are substantially evenly distributed within the stable matrix of the larger body.

16. The illuminator element according to claim 15 wherein the multiplicity of light-sourcing bodies are substantially evenly randomly distributed within the stable matrix of the larger body.

17. The illuminator element according to claim 14 wherein the stable matrix of the larger body is translucent to the illumination.

18. The illuminator element according to claim 14 wherein the stable matrix of the larger body is transparent to the illumination.

19. The illuminator element according to claim 14 wherein the at least one of the multiplicity of light-sourcing bodies comprises:

a chromophore, defined as a chemical group that gives rise to color in a molecule.

20. The illuminator element according to claim 19 wherein the chromophore comprises:

a chemical group having the aspect of a color light source, defined as a light source describable in terms of hue, brightness and saturation.

21. The illuminator element according to claim 20 wherein the chemical group having the aspect of a color light source comprises:

a luminescent chemical for emitting colored luminescent light.

22. The illuminator element according to claim 21 for use with an external source of excitation radiation wherein the luminescent chemical comprises:

a fluorescent chemical for emitting fluorescent light responsive to the absorption of excitation radiation from the external source thereof.

23. The illuminator element according to claim 22 wherein the fluorescent chemical comprises:

a fluorophore for emitting fluorescent light having a predetermined optical spectrum, the spectrum having a peak substantially at but a single color.

24. The illuminator element according to claim 23 wherein the fluorophore consists essentially of:

rhodamine.

25. The illuminator element according to claim 23 wherein the fluorescent chemical comprises:

a plurality of fluorophores for emitting fluorescent light at an associated plurality of optical spectrum, a composite emitted light spectra formed by combination of all the plurality of optical spectrum being a pseudo-white light.

26. The illuminator element according to claim 25 wherein the plurality of fluorophores are drawn from the group consisting of rhodamine;

coumarin; and sulforhodamine.

27. The illuminator element according to claim 23 further comprising:

a great multiplicity of light-scattering bodies also held within the stable matrix of the larger body;

wherein the great multiplicity of light-scattering bodies collectively serve to promote the random direction, and isotropy, of the fluorescent light from the light-sourcing bodies that is scattered onto the specimen by action of the light-scattering bodies.

28. The illuminator element according to claim 27 wherein the great multiplicity of light-scattering bodies have a refractive index higher than the stable matrix of the larger body within which stable matrix and larger body both the great multiplicity of light-scattering bodies and the multiplicity of light-sourcing bodies are held.

29. The illuminator element according to claim 27 wherein at least some of the great multiplicity of light-scattering bodies comprise:

titanium dioxide.

30. The illuminator element according to claim 19 wherein the chromophore comprises:

a chemical group having the aspect of a colored object, defined as an object describable in terms of hue, lightness and saturation;

and wherein the illuminator element further comprises:

a great multiplicity of light-scattering bodies also held within the stable matrix of the larger body.

31. The illuminator element according to claim 30 for use with an external source of light wherein the chemical group having the aspect of a colored object comprises:

a colored chemical for absorbing some of the frequencies, and for transmitting other of the frequencies, of the light from the external source thereof;

wherein the chemical assumes the color of the frequencies of the light that it transmits; and wherein the great multiplicity of light-scattering bodies collectively serve to promote the random direction, and isotropy, of the light transmitted by the colored chemical and scattered onto the specimen.

32. The illuminator element according to claim 31 wherein the colored chemical reflects light having a predetermined optical spectrum, the spectrum having a peak substantially at but a single frequency corresponding to a single color.

33. The illuminator element according to claim 32 wherein the colored chemical consists essentially of:

green dye transmitting green light.

34. The illuminator element according to claim 31 wherein the colored chemical comprises:

a plurality of individual chemicals each reflecting light at an associated plurality of optical spectrum, a composite reflected light spectra formed by combination of all the plurality of optical spectrum constituting a pseudo-white light.

35. The illuminator element according to claim 34 wherein the plurality of individual chemicals consists essentially of:

red dye reflecting red light;

blue dye reflecting blue light; and green dye reflecting green light.

36. The illuminator element according to claim 14 for use with an external source of light, which illuminator element already comprises the multiplicity of substantially-non-directional minutely-sized light-sourcing bodies, further comprising:

a multiplicity of light-scattering bodies collectively scattering light received from the external source thereof onto the specimen at a low loss;

wherein the specimen is indirectly, isotopically, illuminated by the external source of light.

37. The illuminator element according to claim 36 for use with a incandescent tungsten external light source wherein the multiplicity of light-scattering bodies comprise:

titanium dioxide.

38. The illuminator element according to claim 36 for use with an external source of daylight wherein the multiplicity of light-scattering bodies comprise:

titanium dioxide.

39. The illuminator element according to claim 14 wherein the larger body comprises:

an optically flat surface positioned flat against a substantially flat specimen.

40. The illuminator element according to claim 14 wherein the stable matrix of the larger body is drawn from a group of transparent materials consisting essentially of polymer plastic; and glass.

41. The illuminator element according to claim 14 further comprising:

an adjustable iris situated between the matrix containing the light source means and the specimen;

wherein the opening of the iris may be reduced in aperture to enhance contrast of the illumination of the specimen by the light source means at a corresponding trade-off in the resolution of the illumination of the specimen.

42. An illuminator for use with a microscope and a source of radiant energy, the illuminator comprising:

a multiplicity of luminescent light-sourcing bodies each for producing luminescent light in a random direction in response to receipt of radiant energy from a source of radiant energy, a collective multiplicity of luminescent light-sourcing bodies serving when all held en masse to produce a spatially isotropic light illumination; contained within a relatively larger body having a stable matrix holding the light-sourcing bodies en masse, the larger body suitably sized and shaped so as to be positioned closely proximate to a specimen under observation through a light microscope in order that the specimen is illuminated for observation through the microscope with spatially isotropic luminescent light from the multiplicity of luminescent light-sourcing bodies.

43. An illuminator for use with a microscope and a source of anisotropic light, the illuminator comprising:

a great multiplicity of light-direction-randomizing bodies, each light-direction-randomizing body of a size on the order of a wavelength of light, each light-direction-randomizing body serving to do one of (i) absorb and emit in a random direction light from the anisotropic source thereof, and re-absorb and re-emit light from others of the great multiplicity of light-direction-randomizing bodies, and (ii) scatter in a random direction light from the anisotropic source thereof, and also from others of the great multiplicity of light-direction-randomizing bodies, the great multiplicity of light-direction-randomizing bodies randomly spatially distributed within a stable matrix suitably sized and shaped so as to be positioned closely proximate to a specimen under observation with the microscope;

wherein the great multiplicity of light sources randomly distributed in space absorb and emit, re-absorb and re-emit, and scatter the anisotropic light from the source thereof into a vast multiplicity of light wave fronts which, when exiting the illuminator at less than a critical angle, are propagating in diverse directions.

44. The illuminator according to claim 43 further for use with a source of light, wherein the great multiplicity of light-direction-randomizing bodies are drawn from the group consisting essentially of:

chromophores; and light-scattering particles;

wherein the chromophores and the light-scattering particles serve to re-direct and randomize light received from the anisotropic external source thereof into the great multiplicity of light wave fronts exiting the illuminator in diverse directions.

45. The illuminator according to claim 43 further for use with a source of light, wherein the great multiplicity of light-direction-randomizing bodies comprise:

luminescent fluorophores;

wherein the fluorophores serve to absorb and emit, re-absorb and re-emit, anisotropic light received from the external source thereof into the great multiplicity of light wave fronts exiting the illuminator in diverse directions;

wherein the luminescent fluorophores also serve to transform in frequency light received from the external source thereof.

46. An illuminator for use with both a source of excitation radiation and a microscope for purposes of illuminating a specimen under observation with the microscope, the illuminator comprising:

a fluorescent chemical for emitting fluorescent light in a random direction responsive to absorption of excitation radiation from a source thereof; spatially distributed and contained within a stable matrix of a body suitably sized and shaped so as to be positioned closely proximate to a specimen under observation through a microscope;

wherein the body that fluorescent chemical illuminates the specimen for observation through the microscope with randomly-directed fluorescent light.

47. The illuminator according to claim 46 wherein the fluorescent chemical is present within the body's stable matrix in only such amount as avoids any such self-quenching of emitted fluorescent light as would result in an unequal intensity of the emitted fluorescent light illuminating the specimen nonetheless that such light is randomly-directed;

wherein the illuminator is called brightfield for producing a fluorescent light output that is everywhere equally intense.

48. The illuminator according to claim 46 wherein the fluorescent chemical is present within the body's stable matrix in such amount as causes a self-quenching of emitted fluorescent light, which self-quenching is detectable as an unequal intensity of the emitted fluorescent light illuminating the specimen nonetheless that such light is randomly-directed;

wherein the illuminator is called darkfield for producing a fluorescent light output that is variable and unequal in illumination of the specimen.

49. An illuminator for use with both a source of light and a microscope for illuminating a specimen under observation with the microscope, the illuminator comprising:

light-scattering bodies for reflecting light at low loss; spatially distributed within a stable matrix suitably sized and shaped so as to be positioned closely proximate to a specimen;

wherein the light-scattering bodies collectively scatter at low loss and in all directions light received from the source thereof;

wherein when the specimen is positioned proximate to the stable matrix containing the light-scattering bodies then it is illuminated for observation through the microscope with isotropic light, which light originally arose from the source thereof was subsequently scattered by the light-scattering bodies;

wherein the specimen is indirectly illuminated by the external source of light.

50. A selective-frequency-range illuminator for use with both a primary source of light over a broad first range of frequencies, and a microscope, the illuminator serving to produce secondary light within a predetermined narrow second range of frequencies, narrower than the first range, for illuminating a specimen that is under observation with the microscope, the illuminator comprising:

luminescent chromophores responsive to received light over a narrow first range of frequencies to emit light only over, and within, a predetermined second range of frequencies, the second range of frequencies being narrower than the first range of frequencies; randomly evenly distributed within a stable matrix suitably sized and shaped so as to concurrently (i) intercept the light over the first range of frequencies from the primary source of light, while (ii) being positioned closely proximate to the specimen under observation with the microscope;

wherein the luminescent chromophores within the stable matrix serve to produce the secondary light within the second range of frequencies responsive to their interception of the light that is within the broad first range of frequencies.

51. A method of illuminating a specimen located on a specimen stage of an optical microscope for observation with the microscope, the method comprising in combination the steps of placing a source of spatially isotropic light so closely proximate to the specimen that the specimen is substantially spatially isotropically illuminated; and observing the specimen as illuminated by the source of isotropic light illumination through the microscope;

wherein the placing to substantially spatially isotropically illuminate the specimen, and the observing of the specimen so substantially spatially isotropically illuminated, are, in combination, such as to make that no shadows are observable on the specimen during the observing.

52. The method according to claim 51 wherein the placing serves to locate the source of spatially isotropic light illumination in contact with one of the specimen, a microscope slide upon which the specimen is mounted, and a cover slip.

53. The method according to claim 51 wherein the source of spatially isotropic light illumination placed proximately to the specimen is an energy-consuming luminescent light source producing spatially isotropic luminescent light illumination, and wherein the method further comprises:

renewing a source of energy serving to energize the luminescent light emission of the luminescent light source as required.

54. The method according to claim 53 wherein the luminescent source placed proximately to the specimen is a fluorescent light source responsive to excitation radiation to emit fluorescent light, and wherein the method further comprises:

providing excitation radiation to the fluorescent light source so as to cause it to emit fluorescent light by which the specimen is observed.

55. The method according to claim 54 wherein the providing excitation radiation to the fluorescent light source comprises:

providing light radiation that has passed through at least a portion of the microscope prior to exciting the fluorescent element.

56. The method according to claim 54 wherein the providing excitation radiation to the fluorescent light source comprises:

providing light radiation that has passed through an objective lens of the microscope prior to exciting the fluorescent element.

57. The method according to claim 54 wherein the step of providing excitation radiation comprises:

exciting the fluorescent element with radiation having a first spectrum so as to cause it to produce light having a second spectrum, by which second-spectrum light the specimen is observable through the microscope.

58. The method according to claim 57 wherein the exciting of the fluorescent element is with light radiation.

59. The method according to claim 58 wherein the exciting of the fluorescent element is with light radiation that is visible.

60. The method according to claim 53 wherein the luminescent source placed proximately to the specimen is a fluorescent light source containing a plurality of different types of fluorophores each of which types is excited by radiation to produce a different associated emission light spectrum, and wherein the method further comprises:

providing excitation radiation to the fluorescent light source so as to cause it to emit at least two different spectrums of fluorescent light collectively forming a composite spectra, by which composite spectra light the specimen is observed.

61. The method according to claim 60 wherein the providing of excitation radiation is from a single source thereof which radiation source produces radiation sufficient to excite fluorescence of both different types of fluorophores simultaneously.

62. The method according to claim 53 wherein the luminescent source placed proximately to the specimen is a fluorescent light source containing a plurality of different types of fluorophores collectively excited by radiation to produce a pseudo-white light emission light spectra, and wherein the method further comprises:

providing excitation radiation to the fluorescent light source so as to cause it to emit the pseudo-white light spectra of fluorescent light by which the specimen is observed.

63. The method according to claim 62 wherein the providing of excitation radiation is from a single source thereof which radiation source produces radiation sufficient to excite fluorescence of the plurality of different types of fluorophores simultaneously.

64. The method according to claim 53 wherein placing not only serves to locate the source of spatially isotropic luminescent light illumination proximately to the specimen but further, additionally, serves to locate a multiplicity of non-absorbing, highly-reflective light-scattering bodies proximately to the specimen for collectively isotropically scattering the luminescent light onto the specimen.

65. A method of illuminating a specimen for observation with a microscope, the method comprising in combination the steps of placing a specimen to be observed on a specimen stage of a microscope;

placing a fluorescent element proximate to the specimen; and causing the fluorescent element to produce electromagnetic radiation by which the specimen is observable through the microscope.

66. A method of illuminating a specimen for observation with a microscope, the method comprising in combination the steps of placing a specimen to be observed on a specimen stage of a microscope;

placing a block consisting essentially of (i) at least one fluorescent dye in a (ii) stable matrix, proximate to the specimen; and illuminating the block with radiation so as to cause the at least one fluorescent dye within the block to emit radiation by which the specimen is observable through the microscope.

67. A method of illuminating a specimen for observation with an optical microscope, the method comprising in combination the steps of placing a specimen to be observed on a specimen stage of an optical microscope;

placing a block consisting essentially of (i) a plurality of different fluorescent dyes each having an associated emission spectrum and collectively having an emission spectra of pseudo-white light, in a (ii) polymer matrix, proximate to the specimen; and illuminating the block with light radiation so as to cause the plurality of fluorescent dyes within the block to emit pseudo-white light by which the specimen is observable through the optical microscope.

68. An illuminator element for use with an electromagnetic radiation microscope, the illuminator element consisting essentially of:

a fluorescent material that is, by definition, capable emitting electromagnetic radiation resulting from and during the absorption of excitation radiation from an external source thereof, in an electromagnetic-radiation-transparent stable matrix for supporting the fluorescent material;

wherein the element is sized and shaped so as to suitably be positioned closely proximate to a specimen to be observed by and through the electromagnetic radiation microscope in order that, upon and during absorption of the excitation radiation from the external source by the fluorescent material of the element, the fluorescent material of the element will illuminate the specimen with emitted electromagnetic radiation suitably intense so as to permit observation of the specimen under this emitted electromagnetic radiation by, and with, the electromagnetic microscope.

69. The illuminator element according to claim 68 further consisting essentially of a material reflecting and dispersing the electromagnetic radiation emitted by the fluorescent material.

70. The illuminator according to claim 68 further comprising:

a source of excitation radiation for illuminating the element and the fluorescent material of the element.

71. The illuminator element according to claim 68 wherein the element is in the shape of a disk.

72. The illuminator element according to claim 71 wherein the disk-shaped element is of a diameter between 2 mm and 20 mm and a thickness between 1 mm and 10 mm.

73. The illuminator element according to claim 68 wherein the element is in the shape of a parallelepiped body.

74. The illuminator element according to claim 73 wherein the parallelepiped-body-shaped element has a first dimensions between 2 mm and 20 mm, a second dimension between 2 mm and 20 mm, and a third dimension between 1 mm and 10 mm.

75. The illuminator element according to claim 68 wherein the fluorescent material consists essentially of fluorescent fluorophores.

76. The illuminator element according to claim 75 wherein the fluorescent fluorophores are of a plurality of types each of which types has an associated fluorescence spectrum.

77. The illuminator element according to claim 76 wherein the plurality of types of fluorescent fluorophores collectively have a fluorescence spectra that substantially appears as white light to human vision.

78. The illuminator element according to claim 68 wherein the element's fluorescent material emits visible light in response to excitation.

79. The illuminator element according to claim 78 wherein the element's fluorescent material illuminates the specimen with each of three primary colors of visible light so as to form a pseudo-white light.

80. The illuminator element according to claim 68 wherein the element's fluorescent material is heterogeneous, illuminating the specimen with plurality of frequencies of electromagnetic radiation in response to radiation excitation that is substantially of only one frequency.

81. The illuminator element according to claim 68 wherein the an electromagnetic-radiation-transparent stable matrix consists essentially of
   polymer.

82. An illuminator element for use with an optical microscope, the illuminator element consisting essentially of
   a fluorescent dye that is, by definition, capable emitting light resulting from and during the absorption of excitation radiation from an external source thereof,
   reflective material for reflecting and dispersing the light emitted by the fluorescent dye; and
   a polymer block, substantially transparent to light, for supporting the fluorescent dye and the reflective material in a matrix;
   wherein the element is sized and shaped so as to suitably be positioned closely proximate to a specimen to be observed by and through the optical microscope in order that, upon and during absorption of the excitation radiation from the external source by the element's fluorescent dye, the element's fluorescent dye will illuminate the specimen with emitted light suitably intense so as to permit observation of the specimen under this emitted light by, and with, the optical microscope.

83. An illuminator element for use with an optical microscope, the illuminator element consisting essentially of
   a fluorescent dye that is, by definition, capable emitting light resulting from and during the absorption of excitation radiation from an external source thereof,
   reflective material for reflecting and dispersing the light emitted by the fluorescent dye; and
   a cylindrically-shaped polymer block, substantially transparent to light, for supporting the fluorescent dye and the reflective material in a matrix;
   wherein the polymer block is sized and shaped so as to suitably be positioned closely proximate to a specimen to be observed by and through the optical microscope in order that, upon and during absorption of the excitation radiation from the external source by the element's fluorescent dye, the element's fluorescent dye will illuminate the specimen with emitted light suitably intense so as to permit observation of the specimen under this emitted light by, and with, the optical microscope; and
   wherein the fluorescent dye is present in such a density so as to cause the fluorescence to be self-quenching, producing a more intense light emission towards the circumference of the cylindrically-shaped polymer block than along an imaginary central axis thereof.

84. An illuminator element for use with an optical microscope, the illuminator element consisting essentially of
   a plurality of different fluorescent dyes each responsive to radiation from an external source thereof for emitting light at an associated emission spectrum, and collectively having an emission spectra of white light,
   reflective material for reflecting and dispersing the light emitted by the fluorescent dyes; and
   a polymer block, substantially transparent to light, for supporting the fluorescent dyes and the reflective material in a matrix;
   wherein the element is sized and shaped so as to suitably be positioned closely proximate to a specimen to be observed by and through the optical microscope in order that, upon and during absorption of the excitation radiation from the external source by the element's fluorescent dyes, the element's fluorescent dyes will illuminate the specimen with emitted white light suitably intense so as to permit observation of the specimen under this emitted light by, and with, the optical microscope.

85. An illumination system for an optical microscope comprising:
   an illuminator means, suitably sized and shaped so as to be positioned closely proximate to a specimen under observation by an optical microscope, for emitting in response to excitation radiation a substantially spatially isotopic light that, when the illuminator means is so positioned closely proximate the specimen, serves to illuminate the specimen substantially spatially isotropically; and
   an excitation radiation source means for providing excitation radiation to the illuminator means so as to cause it to emit the substantially spatially isotropic light.

86. A system for producing magnified images comprising:
   an optical microscope;
   an illuminator means, suitably sized and shaped so as to be positioned closely proximate to a specimen under observation by the optical microscope, for emitting in response to excitation radiation a substantially spatially isotopic light that, when the illuminator means is so placed proximate to the specimen, serves to illuminate the specimen; and
   an excitation radiation source means for providing excitation radiation to the illuminator means so as to cause it to emit the substantially isotropic light when it is positioned proximate to the specimen under observation through the optical microscope.

87. An illuminator element for use with an optical microscope and with a source of excitation radiation, the illuminator element comprising:
   a material that is capable of converting incident excitation radiation into light of a predetermined frequency; borne by
   a stable body suitably sized and shaped so as to be positioned closely proximate to a specimen under observation by an optical microscope;

wherein excitation radiation incident upon the material is converted thereby to light of the predetermined frequency by which predetermined frequency light the specimen is observable through the optical microscope.

88. The illuminator element according to claim 87 wherein the light of the predetermined frequency is isotropic in illumination of the closely proximate specimen, illuminating the specimen for observation evenly and without distinction as to direction;

where the specimen is illuminated for observation without shadows.

89. The illuminator element according to claim 87 wherein the stable body consists essentially of:
polymer plastic.

90. The illuminator element according to claim 87 wherein the stable body is in the shape of a regular geometric solid.

91. The illuminator element according to claim 87 wherein the material consists essentially of
chromophores.

92. The illuminator element according to claim 91 wherein the chromophores consist essentially of
fluorophores.

93. The illuminator element according to claim 92 wherein the fluorophores consist essentially of
a plurality of fluorescent compounds each having an associated fluorescence emission spectrum.

94. The illuminator element according to claim 93 wherein the plurality of fluorescent compounds collectively have a fluorescence spectra that constitutes a pseudo-white light.

95. The illuminator element according to claim 91 wherein the chromophores consist essentially of
pigments.

96. The illuminator element according to claim 91 wherein the chromophores consist essentially of
a plurality of pigments each having an associated light reflection spectrum.

97. The illuminator element according to claim 87 wherein the illuminator serves to illuminate the specimen with visible fluorescent light.

98. The illuminator element according to claim 87 wherein the illuminator serves to illuminate the specimen with each of three primary colors of visible fluorescent light.

99. The illuminator element according to claim 87 wherein the illuminator serves to illuminates the specimen with a plurality of predetermined frequencies of radiation in response to an incident excitation radiation that is substantially of only one frequency.

100. The illuminator element according to claim 87 wherein the illuminator serves to illuminate the specimen with visible fluorescent light in response to an incident excitation radiation that is invisible.

101. A method of illuminating a specimen located on a specimen stage of an optical microscope for and during observation with, and along an optical axis of, the microscope, the method comprising in combination the steps of positioning an illuminator element that is capable of producing from incident radiation a predetermined frequency of light radiation closely proximate to a specimen under observation by an optical microscope; and supplying radiation from a source of radiation to the illuminator element so that the radiation is incident thereon from any direction not along the optical axis of the microscope;

wherein the illuminator element produces from the radiation incident thereon the predetermined light radiation; and observing by the predetermined frequency light radiation through the microscope the specimen.

102. The method according to claim 101 for observing a specimen mounted upon a microscope slide wherein the positioning comprises:

setting the illuminator element in contact with the specimen as mounted upon the microscope slide.

103. The method according to claim 101 for observing a specimen mounted upon a microscope slide wherein the supplying radiation comprises:

illuminating with light from an incandescent light bulb.

104. An illumination system for an optical microscope comprising:

an illuminator means, suitably sized and shaped so as to be positioned closely proximate to a specimen under observation by an optical microscope, for providing in response to broad-spectrum, multi-frequency, excitation radiation a substantially monochromatic light narrowly centered about a single frequency which light serves to illuminate the specimen when the illuminator means is so positioned proximate to the specimen; and an excitation radiation source means for providing the broad spectrum, multi-frequency, excitation radiation to the illuminator means when it is positioned closely proximate to the specimen under observation by the optical microscope.

105. A system for producing magnified images comprising:

an optical microscope;

an illuminator means, suitably sized and shaped so as to be positioned closely proximate to a specimen under observation by an optical microscope, for providing in response to broad-spectrum, multi-frequency, excitation radiation a substantially monochromatic light narrowly centered about a single frequency which light serves to illuminate the specimen when the illuminator means is so positioned proximate to the specimen; and an excitation radiation source means for providing the broad spectrum, multi-frequency, excitation radiation to the illuminator means when it is positioned closely proximate to the specimen under observation by the optical microscope.

106. The system for producing magnified images according to claim 105 wherein the illuminator means comprises:

a material that is capable of converting incident excitation radiation into light of a predetermined frequency; borne by a stable body suitably sized and shaped so as to be positioned closely proximate to a specimen under observation by an optical microscope;

wherein excitation radiation incident upon the material is converted thereby to light of the predetermined frequency by which predetermined frequency light the specimen is observable.

107. To and for use with an optical microscope, a specimen under observation with and through the microscope, and a source of light for illuminating the specimen that is under observation; an improvement comprising:

an illuminator element consisting essentially of a great multiplicity of particles of a first photochromic chemical, which photochromic chemical produces secondary light when appropriately stimulated by a primary light radiation, which particles are each of a size on the order of a wavelength of light, randomly spatially distributed within a matrix of a second material suitably sized and shaped so as to be positioned closely proximate to the specimen under observation with the microscope;

wherein the great multiplicity of particles randomly distributed within the matrix of the second material are appropriately stimulated by primary light radiation from the source of light to produce a corresponding great multiplicity of secondary light wave fronts in random directions;

wherein ones of the random-direction secondary light wave fronts arising from the great multiplicity of spatially-randomly-distributed particles intercept a specimen when the illuminator element is positioned close to the specimen, illuminating the specimen evenly from all directions at which the closely-positioned illuminator element is present.

108. The improvement according to claim 107 wherein the photochromic chemical produces the secondary right by process of fluorescence.

109. The improvement according to claim 107 wherein the photochromic chemical produces the secondary light by process of transmission.

110. To and for use with an optical microscope, a specimen under observation with and through the microscope, and a source of light for illuminating the specimen that is under observation; an improvement comprising:

an illuminator consisting essentially of a great multiplicity of particles of a fluorescent chemical, which fluorescent chemical emits secondary light of a predetermined spectrum when appropriately stimulated by a primary light radiation, randomly spatially distributed within a stable matrix of a second material suitably sized and shaped so as to be positioned closely proximate to the specimen under observation with the microscope;

wherein the great multiplicity of particles randomly distributed in space are appropriately stimulated by primary light radiation from the source of light so as to produce secondary light emission at the predetermined spectrum by which secondary light emission the specimen is observable though the microscope.

* * * * *